United States Patent [19]
Wood et al.

[11] Patent Number: 5,732,279
[45] Date of Patent: Mar. 24, 1998

[54] SYSTEM AND METHOD FOR COMMAND PROCESSING OR EMULATION IN A COMPUTER SYSTEM USING INTERRUPTS, SUCH AS EMULATION OF DMA COMMANDS USING BURST MODE DATA TRANSFER FOR SOUND OR THE LIKE

[75] Inventors: Paul B. Wood; Marc M. Stimak, both of Austin, Tex.

[73] Assignee: Brooktree Corporation, San Diego, Calif.

[21] Appl. No.: 337,924

[22] Filed: Nov. 10, 1994

[51] Int. Cl.⁶ .................................................. G06F 13/00
[52] U.S. Cl. ........................ 395/821; 395/842; 395/500; 395/825
[58] Field of Search .................... 395/500, 842–843, 395/527

[56] References Cited

U.S. PATENT DOCUMENTS

| | | | |
|---|---|---|---|
| 4,313,160 | 1/1982 | Kaufman et al. | 364/260 |
| 4,695,945 | 9/1987 | Irwin | 395/856 |
| 4,727,480 | 2/1988 | Albright et al. | 395/500 |
| 4,755,937 | 7/1988 | Glier | 364/200 |
| 4,821,180 | 4/1989 | Gerety et al. | 395/842 |
| 4,937,861 | 6/1990 | Cummins | 380/2 |
| 4,994,912 | 2/1991 | Lumelsky et al. | 348/441 |
| 5,083,119 | 1/1992 | Trevett et al. | 340/723 |
| 5,103,309 | 4/1992 | Hara | 358/141 |
| 5,129,036 | 7/1992 | Dean et al. | 395/2 |
| 5,150,456 | 9/1992 | Wu et al. | 395/114 |
| 5,192,999 | 3/1993 | Graczyk et al. | 358/85 |

(List continued on next page.)

FOREIGN PATENT DOCUMENTS

| | | | |
|---|---|---|---|
| A 384 257 | 8/1990 | European Pat. Off. | |
| A 510 639 | 10/1992 | European Pat. Off. | |
| 0 597 218 A1 | 5/1994 | European Pat. Off. | G09G 1/16 |
| 0 675 478 A1 | 10/1995 | European Pat. Off. | G09G 1/16 |
| WO 91/18345 | 11/1991 | WIPO | |
| WO 93/21574 | 10/1993 | WIPO | G06F 3/14 |

OTHER PUBLICATIONS

"The 8259A Programmable Interrupt Controller", John Uffenbeck, The 8086/8088 Family: Design, Programming, and Interfacing, John Uffenbeck, pp. 451–467, 1987.

Developer Kit for Sound Blaster™, Hardware Programming Reference, 2nd Edition, Oct. 1993, Creative Labs, pp. 3–1 to 3–29.

Warren Andrews, "PCI promises solution to local-bus bottleneck," *Computer Design*, vol. 31, No. 8, Aug. 1992, pp. 36, 38 & 40.

*Primary Examiner*—Jack B. Harvey
*Assistant Examiner*—Sumati Lefkowitz
*Attorney, Agent, or Firm*—William C. Cray; Susie H. Oh

[57] ABSTRACT

A system and method for providing sound in a computer are disclosed. An audio module for controlling digitized sound I/O is included in a media stream controller. The media stream controller may also coordinate graphics and video which allows multiple media subsystems to be supported from a single bus device. A software application may initiate sound data transfer by sending a conventional DMA mode command to the media stream controller. The media stream controller activates an audio interrupt service routine which processes the request without using a conventional DMA controller. Digital sound data is transferred across a local bus using high speed burst mode block transfer commands and is buffered by the media stream controller in a display memory. Concurrently, the media stream controller may output sound data from the display memory to a sound output device using a double buffering method. Alternatively, the media stream controller may read sound data from a sound input device and store it in the display memory. The audio interrupt service routine may be activated to transfer the sound data in blocks to a software application. After sound data transfer is complete the audio interrupt service routine may reset the count in the DMA controller to provide compatibility with software applications written for DMA mode transfer, and thereby achieve a form of DMA emulation. Thus high speed burst mode block transfer may be used with sound data to free up bandwidth for video, graphics and other uses, and yet still provide compatibility with conventional DMA mode sound I/O.

46 Claims, 9 Drawing Sheets

U.S. PATENT DOCUMENTS

| | | | |
|---|---|---|---|
| 5,229,855 | 7/1993 | Siann | 358/183 |
| 5,243,447 | 9/1993 | Bodenkamp et al. | 345/133 |
| 5,245,322 | 9/1993 | Dinwiddie, Jr. et al. | 345/115 |
| 5,274,779 | 12/1993 | Stewart et al. | 395/425 |
| 5,276,458 | 1/1994 | Sawdon | 345/132 |
| 5,283,819 | 2/1994 | Glick et al. | 379/90 |
| 5,289,584 | 2/1994 | Thome et al. | 395/436 |
| 5,297,231 | 3/1994 | Miller | 395/2.1 |
| 5,305,436 | 4/1994 | Mundkur | 395/162 |
| 5,325,489 | 6/1994 | Mitsushira et al. | 395/842 |
| 5,333,135 | 7/1994 | Wendorf | 370/94.1 |
| 5,333,299 | 7/1994 | Koval et al. | 395/550 |
| 5,355,146 | 10/1994 | Chiu et al. | 345/156 |
| 5,355,391 | 10/1994 | Horowitz et al. | 375/36 |
| 5,367,301 | 11/1994 | Stiltner et al. | 341/144 |
| 5,369,617 | 11/1994 | Munson | 365/219 |
| 5,369,729 | 11/1994 | Norris | 395/2.67 |
| 5,371,518 | 12/1994 | Hannah | 345/200 |
| 5,386,493 | 1/1995 | Degen et al. | 395/2.76 |
| 5,392,407 | 2/1995 | Heil et al. | 395/325 |
| 5,402,147 | 3/1995 | Chen et al. | 345/115 |
| 5,406,306 | 4/1995 | Siann et al. | 345/115 |
| 5,440,336 | 8/1995 | Buhro et al. | 348/13 |
| 5,485,624 | 1/1996 | Steinmetz et al. | 395/775 |
| 5,513,329 | 4/1996 | Pecone | 395/281 |
| 5,515,474 | 5/1996 | Deacon et al. | 395/2.1 |
| 5,519,684 | 5/1996 | Iizuka | 369/93 |

SYSTEM AND METHOD FOR COMMAND PROCESSING OR EMULATION IN A COMPUTER SYSTEM USING INTERRUPTS, SUCH AS EMULATION OF DMA COMMANDS USING BURST MODE DATA TRANSFER FOR SOUND OR THE LIKE

BACKGROUND OF THE INVENTION

1. Copyright Authorization

A portion of the disclosure of this patent document contains material which is subject to copyright protection. The copyright owner has no objection to the facsimile reproduction by any one of the patent disclosure, as it appears in the U.S. Patent and Trademark Office patent files or records, but otherwise reserves all copyright rights whatsoever.

2. Field of the Invention

The field of the present invention relates in general to a system and method for processing commands and transferring data in a computer system. More particularly, the field of the invention relates to a system and method for processing sound I/O commands and transferring sound data or the like across a high speed bus.

3. Background

Personal computers and work stations have evolved rapidly since their introduction nearly twenty years ago. Dramatic advances in processor, display and audio technology have transformed the personal computer into a multimedia appliance, capable of combining color graphics, video, and stereo sound in a single application.

As multimedia applications have developed, there has been an increased need for high speed and high bandwidth data transfers between main memory and input/output (I/O) devices. One approach used in expansion bus systems is direct memory access (DMA). A DMA controller takes over the bus and transfers data without intervention by the central processing unit (CPU). This method of data transfer has become prevalent for sound cards attached to an ISA expansion bus, and there is a large installed base of software applications designed for these sound cards.

However, data transfer across conventional expansion buses has not been able to keep pace with the demands of graphics and video systems used with modern multimedia software applications. Rather, graphics and video systems are increasingly being attached to the local bus where burst mode block data transfer initiated by the CPU supports higher data transfer rates than conventional DMA systems. In addition, local buses typically have a wider data path than expansion buses. However, local buses, such as the VESA local bus and the PCI bus, typically do not provide connections to the DMA controller.

Therefore, conventional sound systems and other systems requiring DMA are incompatible with these high speed local bus systems, and have remained on the expansion bus. It is a disadvantage of these systems that they are unable to take advantage of the higher data transfer rates of local bus systems. This has also led to the development of separate graphics, video, and audio subsystems on different buses having independent controllers with incompatible data types. This may lead to wasted memory space and memory bandwidth, duplicated bus interface logic, and wasted CPU cycles to manage independent subsystems.

What is needed is a system and method for emulating conventional DMA transfers while taking advantage of higher rates provided by other modes of transferring data. What is also needed is a sound system that uses high speed data transfer while maintaining compatibility with the extensive installed base of software applications written for conventional sound systems. Preferably such a system would allow sound data to be transferred across a bus at a high rate of speed to free up bus bandwidth for video and graphics, yet would allow sound data to be played or recorded at a conventional lower frequency. What is also needed is a multimedia system that combines graphics, video, and audio in a single subsystem attached to the local bus or some other high speed I/O bus.

SUMMARY OF THE INVENTION

One aspect of the present invention provides a sound system and method for high speed data transfer that is easily adapted for compatibility with many existing sound cards and software applications. It is an advantage of this and other aspects of the present invention that desired data transfer modes may be used without obsoleting software applications written for existing sound cards. It is a further advantage of this and other aspects of the present invention that bus bandwidth may be freed up for use by other applications. It is a further advantage of this and other aspects of the present invention that modes of data transfer having a higher transfer rate may be used in place of conventional DMA transfer.

Another aspect of the present invention provides a system and method for emulating conventional DMA transfer while using a non-DMA mode of data transfer that allows connection to a non-DMA bus and/or provides a higher data transfer rate than conventional DMA transfer. It is an advantage of this and other aspects of the present invention that bus devices may be developed for a non-DMA bus without losing compatibility with applications designed for conventional DMA transfer.

Yet another aspect of the present invention provides for buffering blocks of sound data or the like for processing. It is an advantage of this and other aspects of the present invention that sound data or the like may be transferred across a bus at a high frequency while being processed by an I/O device at a lower, conventional frequency.

Yet another aspect of the present invention provides an interrupt service routine for processing commands sent to a bus device. Another aspect of the present invention provides an interrupt service routine for converting a command or result from a bus device such that the command or result may be compatibly passed along to a second interrupt service routine designed for a different system. It is an advantage of these and other aspects of the present invention that the complexity of the bus device may be reduced, and that the bus device may be used with interrupt service routines developed for other systems.

Another aspect of the present invention provides a subsystem combining video, graphics and sound. Yet another aspect of the present invention provides a display memory that is used to store sound related data as well as graphics and/or video related data. It is an advantage of these and other aspects of the present invention that multiple, incompatible subsystems for graphics, video and sound may be eliminated. It is another advantage of these and other aspects of the present invention that the number of memories and other components required for graphics, video and sound may be reduced.

BRIEF DESCRIPTION OF THE DRAWINGS

These and other features and advantages of the present invention will become more apparent to those skilled in the art from the following detailed description in conjunction with the appended drawings in which.

DESCRIPTION

Figure 1:
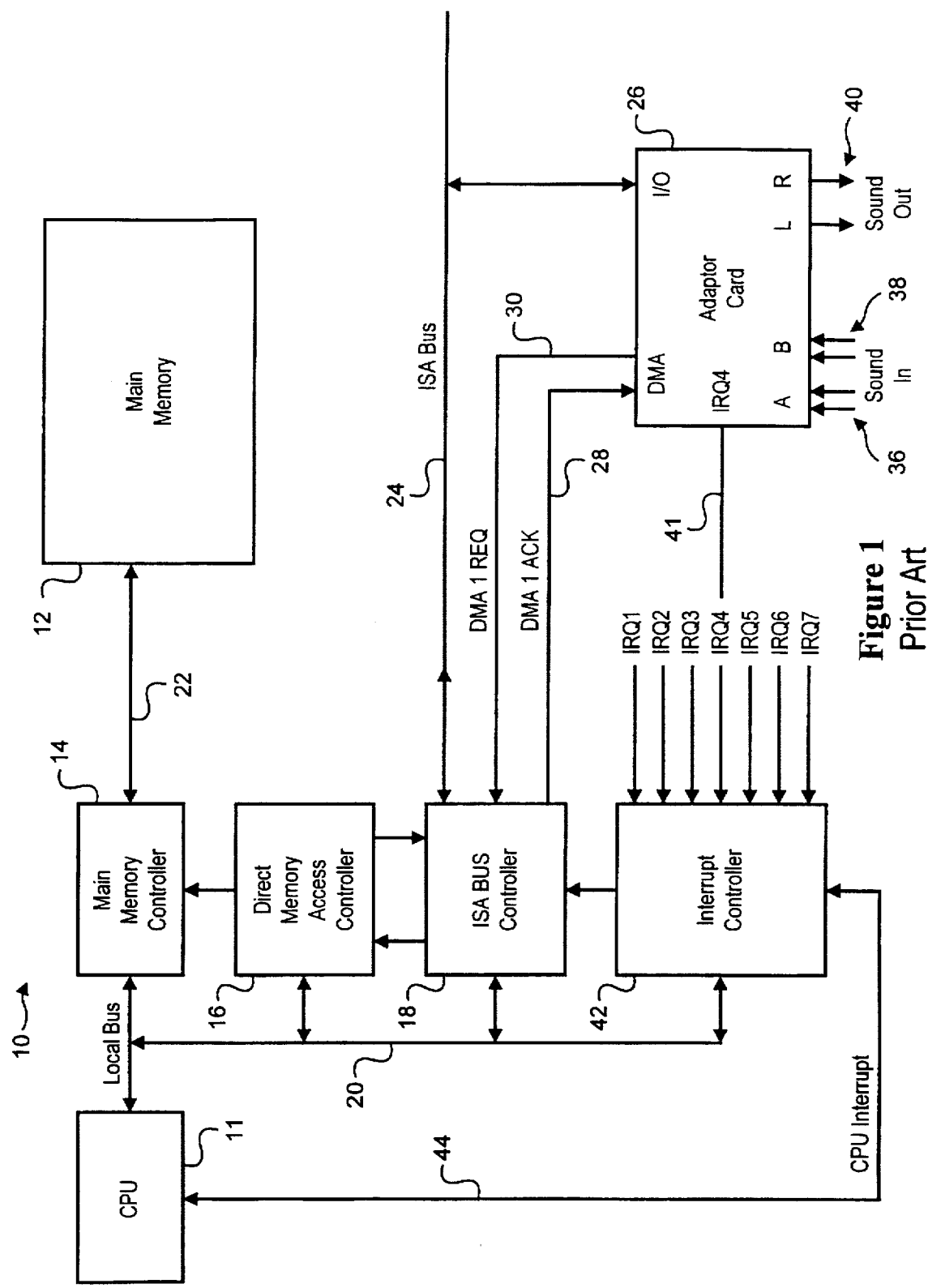
FIG. 1 is a simplified block diagram illustrating a system of the prior art for producing sound in a personal computer.

FIG. 1 is a simplified block diagram illustrating a conventional system, generally indicated at 10, for producing sound in a personal computer. Referring to FIG. 1, this system includes a central processing unit (CPU) 11 and a main memory 12 for storing both executable instructions and data for the system. The system also includes a main memory controller 14, a direct memory access (DMA) controller 16 and a bus controller 18 which is designated as an "ISA" bus controller corresponding to the Industry Standard Architecture (ISA) expansion bus generally provided in the prior art. For a more detailed discussion of the ISA expansion bus and related architecture, see Tom Shanley and Don Anderson, *ISA System Architecture*, PC System Architecture Series Volume 1 (MindShare Press 2nd ed. 1993) (hereinafter "ISA Architecture"), which is hereby specifically incorporated herein by reference. In the system of FIG. 1, the CPU 11, the main memory controller 14, the DMA controller 16, and the ISA bus controller 18 are connected to a local bus 20. A memory bus 22 connects the main memory controller 14 to the main memory 12.

An ISA expansion bus 24 extends from the ISA bus controller 18. The ISA bus includes control lines, address lines and data lines. When a device monitoring the ISA bus recognizes its address on the address lines, it then reads data from the data lines of the bus and takes appropriate actions. A device may also take control of the bus by becoming a bus master. When a device is a bus master, it may assert an address and data on the bus for another device to read. In addition, a device can make requests to the DMA and interrupt controller for special actions. A request to the DMA controller causes a data transfer between main memory and the requesting device on the ISA bus. A request to the Interrupt Controller will generate an interrupt and cause the CPU to execute a corresponding Interrupt Service Routine (ISR) stored in main memory.

Expansion slots are typically provided to allow expansion cards to be added to the ISA bus 24. For instance, FIG. 1 shows a conventional sound card 26 connected to the ISA bus. The sound card 26 is typically designed to be compatible with conventional digitized sound I/O. For more detailed information regarding conventional sound cards, see for example the Developer Kit for Sound Blaster™ Series (Creative Labs 2nd ed. October 1993) which includes a Hardware Programming Reference (hereinafter "Hardware Reference"), a Programmer's Guide, and a Library Reference, each of which is hereby specifically incorporated herein by reference.

The exemplary sound card 26 in FIG. 1 has input lines, commonly designated "sound in", for receiving sound related data from an input device, such as a microphone or the like. These lines are indicated by pairs of lines 36 and 38, designated A and B respectively. The sound card 26 also has a pair of output lines 40, commonly designated "sound out", for outputting sound related data to an output device, such as a speaker or the like. The lines 40 in the pair are respectively designated as "L" and "R" to indicate sound output on a stereophonic basis from left and right channels.

The digitized sound I/O used by such cards ordinarily involves the use of I/O Ports, DMA transfers and interrupts. As shown in FIG. 1, sound card 26 is connected to the ISA bus controller by lines 28 and 30, designated as "DMA 1 ACK" and "DMA 1 REQ" respectively. These lines allow the sound card 26 to request DMA transfers and to receive acknowledgement from the DMA controller. For more information on direct memory access, see ISA Architecture at 367–387, which is hereby incorporated by reference.

As shown in FIG. 1, an interrupt line 41 extends from the sound card 26 to the interrupt controller 42 to allow the sound card 26 to generate interrupt requests. As will be readily apparent to one of ordinary skill in the art, the sound card 26 and associated software may be configured to use any of several interrupt request lines provided by the interrupt controller. In FIG. 1, the interrupt line 41 has been designated IRQ4 for illustrative purposes. Upon receiving an interrupt request, the interrupt controller may communicate with the CPU 11 via line 44. The interrupt controller 42 also has a common connection with the local bus 20. For more information on interrupts, see ISA Architecture at 331–366, which is hereby incorporated by reference.

A software application may produce sound in the system of FIG. 1 by accessing I/O ports on the sound card 26, either directly or through a driver. The sound card 26 is assigned a jumper selectable base address and the various ports used by the card are defined as offsets from that base address. For instance, the base address may be 220 hex. See Hardware Reference at 2—2 and Appendix A, which is hereby incorporated by reference. The sound card 26 of FIG. 1 includes a Reset port (at an offset of 6 hex), a Read Data port (at an offset of A hex), a Write Command/Data port (at an offset of C hex), a Write-Buffer Status port (also at an offset of C hex), and a Read-Buffer Status port (at an offset of E hex).

Before being used by the software application, the sound card 26 is reset by writing to the Reset port and by reading a "ready" byte from the Read Data port. This places the sound card in an initialized default state. Reading data from the sound card is then accomplished by checking the Read-Status port to ensure that there is data to be received from the Read Data port. After the Read-Status port has been checked, the data may be read from the Read Data port. For writing commands or data to the sound card 26, the software first checks the Write-Buffer Status port to ensure that the card is ready to receive commands or data. The commands or data may then be written to the Write Command/Data port. In addition, the interrupt service routine (ISR) used by the software application acknowledges an interrupt by reading the Read-Buffer status port once. Other sound cards may use a separate Interrupt Status port to acknowledge certain interrupts. See Hardware Reference at 2-1 to 2-7, which is hereby incorporated by reference.

Digitized sound I/O is carried out by transferring sound related data between the sound card 26 and the software application. The sound data may be in one of several formats known in the art, including but not limited to, Pulse Code Modulation (PCM) format and compressed Adaptive Delta Pulse Code Modulation (ADPCM) format. This formatted data may be transferred using a variety of techniques, including but not limited to, Direct Mode, Single-cycle DMA Mode, Auto-initialize DMA Mode, High-speed DMA Mode, and ADPCM DMA Mode. See Hardware Reference at 3-1 to 3-10, which is hereby incorporated by reference.

The DMA modes allow data to be transferred to the sound card 26 using direct memory access. When direct memory access is used, the DMA controller temporarily takes control of the bus and transfers data directly between main memory 12 and a specified I/O port. Since the data transfer is handled primarily by the hardware, it is faster than using program instructions to transfer data across the ISA bus. Generally, DMA transfer of sound data to the sound card 26 is handled by setting up a buffer in main memory containing a packet of sound data. The DMA controller is then programmed with the address and length of the buffer, and a command is sent to the Write Command/Data port of the sound card 26 to initiate DMA transfer. After the packet is transferred, the sound card 26 generates an interrupt request, and a corresponding ISR set up by the application software or a driver is executed. The ISR may then set up an additional sound packet for transfer or end the data transfer.

This process will now be described in more detail. However, it will be readily understood that this description is illustrative only, and that the DMA process will vary depending upon the particular type of transfer taking place. For more information on this process, see Hardware Reference at 3-11 to 3-29 which is incorporated herein by reference. Generally, for DMA transfer, the application or a driver first sets up an interrupt service routine (ISR), and enables the corresponding interrupt. To avoid confusion with other ISRs, the ISR set up by the application or driver will be referred to as the Driver ISR; however, it will be understood that a software application may set up this ISR directly and that a driver is not required. Using techniques known in the art, the Driver ISR is set up to be activated by an interrupt request from the sound card 26, and the previous ISR for that interrupt is saved so that it may be restored later.

Next, a buffer is set up in main memory for the data transfer. Due to constraints on conventional DMA controllers, the buffer typically cannot straddle a 64 KB physical page boundary. Thus, sound data may have to be transferred in packets each of which is no greater than 64 KB in size. After a packet is transferred the sound card 26 generates an interrupt, and the Driver ISR causes the next packet to be transferred.

After the buffer is set up, the DMA controller is programmed for the appropriate mode of data transfer (such as single-cycle or auto-initialize). Programming the DMA controller also involves enabling the appropriate DMA channel, and providing the base address and length of the buffer containing the packet in main memory.

Next, the sound card 26 is given a time constant which controls the rate of data transfer. This is accomplished by writing a Set Time Constant command to the Write Command/Data port on the sound card 26 followed by a one byte parameter specifying the time constant, as is known in the art. An I/O command is then sent to the sound card 26 to initiate DMA transfer. This is done by writing an I/O command to the Write Command/Data port on the sound card 26. For examples of I/O commands typically used in sound cards, see Hardware Reference at 6-1 to 6-29 which is incorporated herein by reference.

The sound card 26 then requests DMA transfer by asserting a logical 0 on the DMA 1 REQ line. This represents a request to the DMA controller 16 to obtain data from the base address of the buffer in main memory. Either a byte or a word is transferred, depending upon whether an 8-bit or 16-bit DMA channel is being used. When the sound data is provided, the DMA controller 16 decreases by an integer an internal count of the transfer length and increases by an integer the address used to retrieve data from the buffer.

When the ISA bus 24 receives the sound data, a logical 0 is asserted on the DMA 1 ACK line to indicate that the DMA request is being serviced. The sound card 26 then reads the sound data from the ISA bus 24 and outputs it on an output device, such as a speaker or the like to produce sound represented by the data. Every time the sound card 26 receives data from the ISA bus 24, it decreases a count of the transfer length that is maintained in a packet length register in the sound card 26.

This process is then repeated for subsequent pieces of sound data in the packet, until the count in the packet length register of the sound card 26 reaches zero (0). At this time, the entire packet in the buffer has been transferred, and the sound card 26 generates an interrupt request on its interrupt request line 41. This causes the Driver ISR to be activated. The Driver ISR preserves the machines status and determines whether there are more packets to transfer. If there are more packets of sound data, the ISR sets up a buffer for the next packet, configures the DMA controller, and issues an I/O command to the sound card 26. As is known in the art, this process may be simplified in auto-initialize mode. See Hardware Reference at 3-5 to 3-6, which is incorporated herein by reference.

The Driver ISR then acknowledges the interrupt from the sound card 26, and outputs an EOI (End Of Interrupt) to the Interrupt Controller 42. Then the machine status is restored and an IRET (Return from Interrupt) command is executed. This process continues until there are no more packets to be transferred between the application and the sound card 26. After the application is finished with the sound I/O, it then disables the interrupt and restores the original interrupt service routine.

The conventional system described above has several significant limitations. It requires that sound data be transferred across the ISA expansion bus, which has a limited data transfer rate and a high latency. The data transfer rate is limited by both the bandwidth of the data path (16 bits) and by the complex DMA transfer protocol used in the ISA system. This may be particularly disadvantageous in multimedia systems where a large mount of bandwidth must be allocated for video and graphics, or in other systems requiting large mounts of data to be transferred across a bus in addition to sound data.

To improve block transfer rates for video and graphics systems, local buses such as the VESA Local Bus and PCI Bus, or similar high speed buses using burst mode data transfer have been developed. For a description of high speed bus systems, and a comparison of data transfer rates with expansion buses, see Tom Shanley and Don Anderson, *PCI System Architecture*, PC System Architecture Series Volume 4 (MindShare Press 1994 2nd ed.) (hereinafter "PCI Architecture"), which is hereby specifically incorporated herein by reference. However, conventional ISA-based sound systems and the applications written for them may not be compatible with these high speed buses. This inhibits the development of complete local bus multimedia systems, including video, graphics, and sound, that are compatible with many existing software applications.

It should be noted that, traditionally, graphics, video, and audio subsystems have used separate memory spaces and bus connections as a result of independent controllers with incompatible data types. This may result in wasted memory space and memory bandwidth, duplicated bus interface logic, and wasted CPU cycles to manage independent subsystems. As a consequence, the cost of providing these capabilities has been relatively high.

Figure 2:
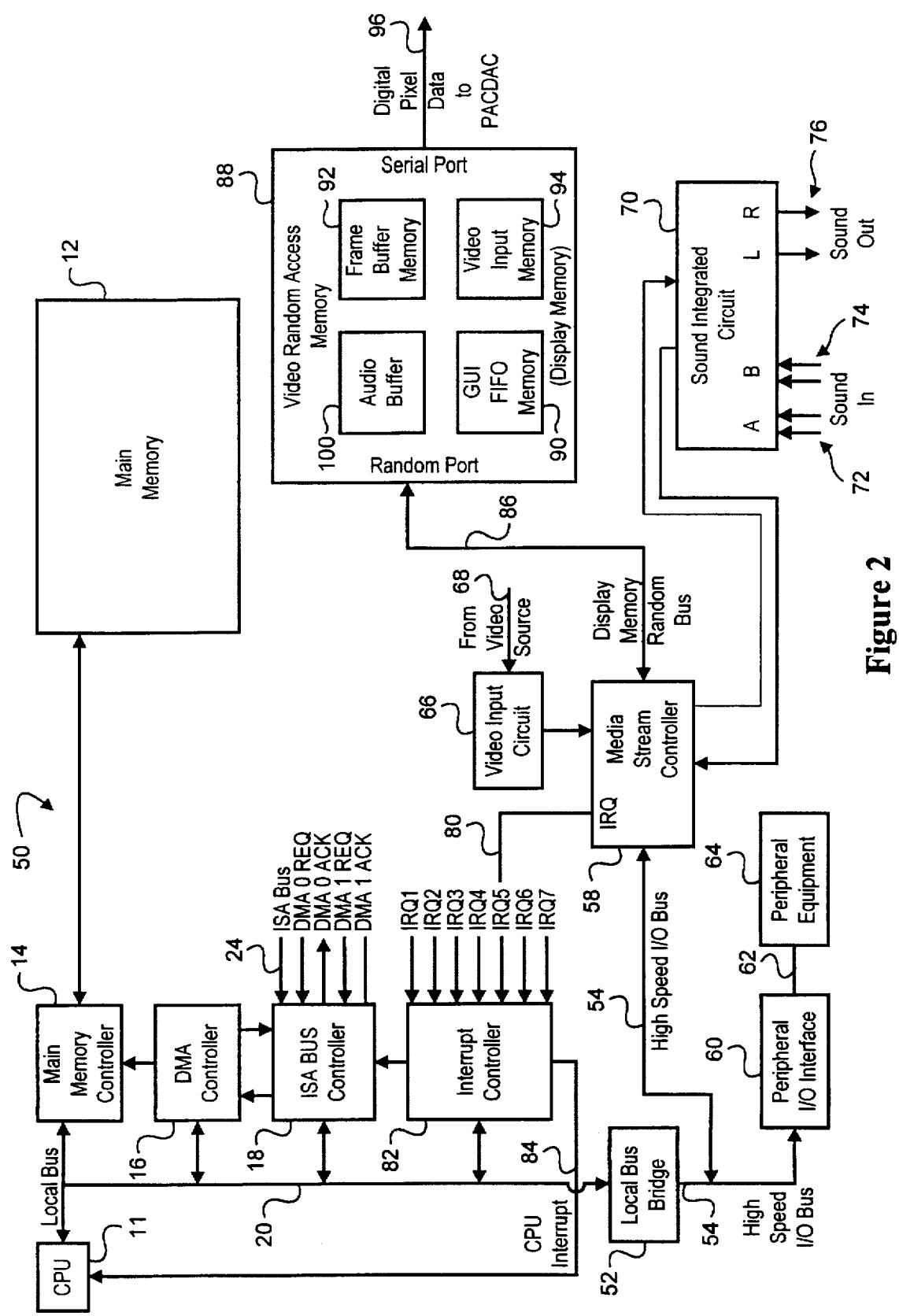
FIG. 2 is a simplified block diagram illustrating a system according to a first embodiment of the present invention.

FIG. 2 generally indicates a system according to a first embodiment of the present invention in block form at 50. The system of the first embodiment includes a number of the same components as the system shown in FIG. 1. These include the CPU 11, the main memory 12, the main memory controller 14, the DMA controller 16, the ISA bus controller 18, the local bus 20 and the ISA bus 24 connected as shown. One skilled in the art will appreciate the interconnection and operation of these components.

The system 50 shown in FIG. 2 also includes a local bus bridge 52 connected to the local bus 20. Preferably, in the first embodiment, the bridge 52 provides a PCI Bus compliant system although other bus systems such as a VESA local bus system may be supported. A high speed I/O bus 54 has a common connection with the bridge 52, with a peripheral I/O interface 60 and with a Media Stream Controller 58. While the high speed I/O bus 54 is coupled to the local bus using a bridge in the first embodiment, other embodiments of the present invention may be adapted to support other methods of connecting to the local bus, such as direct connection, buffered connection or connection through a combined cache/bridge. See PCI Architecture at 12–30, which is incorporated herein by reference. The peripheral I/O interface 60 is in turn connected through a peripheral bus 62 to peripheral equipment 64. The high speed I/O bus 54 in the first embodiment may be a VESA Local Bus or a PCI bus which provides a data bandwidth of thirty two (32) bits in parallel and which may in the future provide as many as sixty four (64) bits in parallel. The peripheral equipment 64 may illustratively be a printer which is operated in accordance with commands from the CPU 11.

Figure 3:
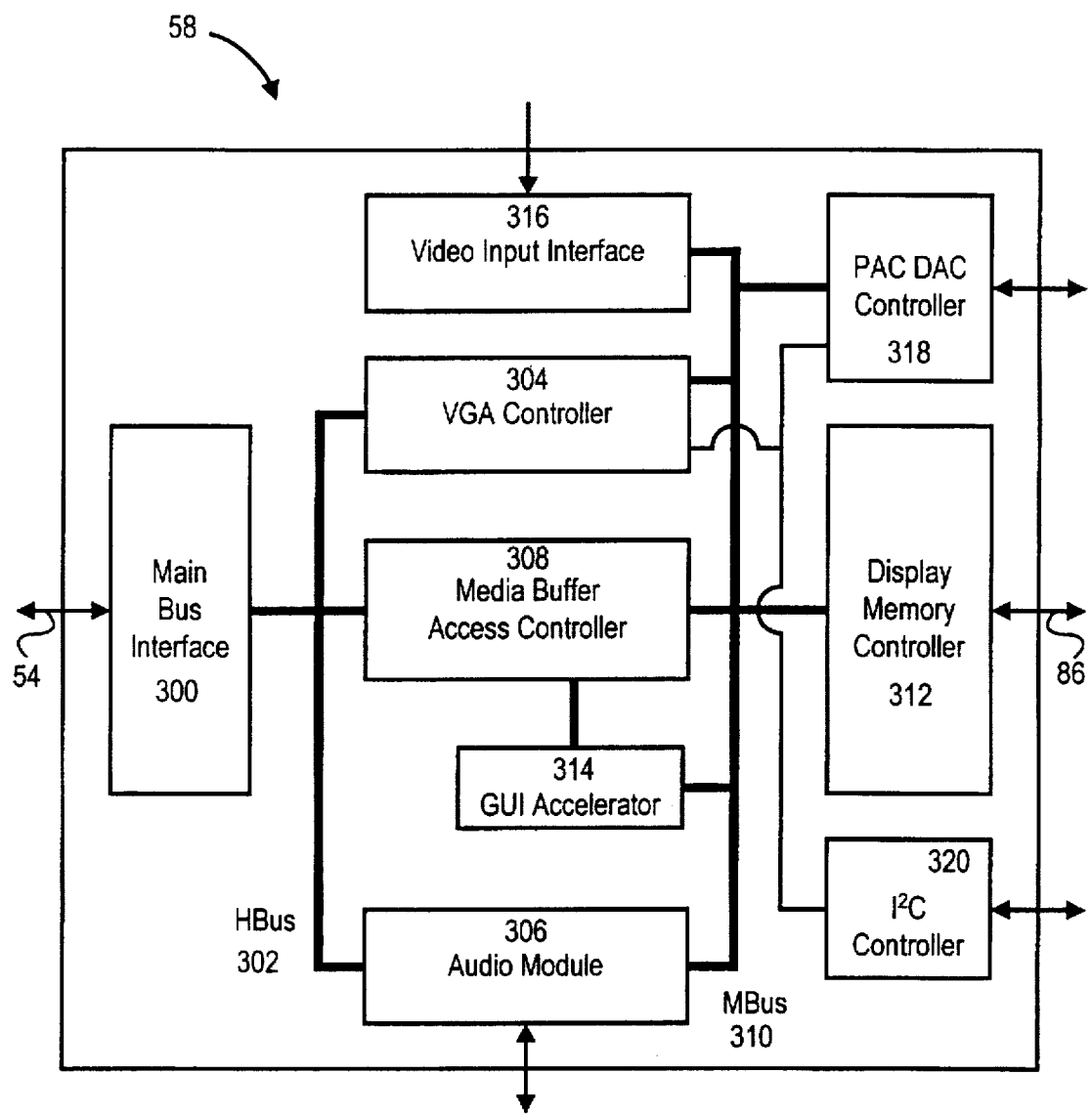
FIG. 3 is a block diagram showing in additional detail one of the blocks shown in FIG. 2, this block being designated as "Media Stream Controller" in FIG. 2.

The high speed I/O bus 54 shown in FIG. 2 is coupled to a Media Stream Controller 58 in the first embodiment shown as a single block in FIG. 2 and as a simplified block diagram in FIG. 3. The Media Stream Controller 58 may be disposed on an integrated circuit chip.

Referring to FIG. 3, the Media Stream Controller 58 of the first embodiment communicates with the I/O bus 54 through a Main Bus Interface 300. The Main Bus Interface is connected to an internal 3-state HBus 302 allowing communication with various functional agents or modules attached to the Hbus. These modules may include a VGA Controller 304 for graphics, an Audio Module 306 for sound, and a Media Buffer Access Controller 308 which may allow data to pass though to a separate display memory through an MBus 310 and Display Memory Controller 312. A GUI Accelerator 314 may also be provided as shown.

Other modules such as flash ROM or Yamaha OPL support may also be added to the Hbus. The VGA Controller 304 may communicate with, and is connected to, a PACDAC Controller 318 and an I²C Controller 320. The PACDAC Controller 318 is also connected to the MBus 310. Each of the modules connected to the MBus may transfer data to or from a separate display memory via MBus 310, Display Memory Controller 312, and a random bus 86. In addition, the Media Stream Controller 58 may communicate with other portions of a multimedia I/O system through the Video Input Interface 316, Audio Module 306, Display Memory Controller 312, PACDAC Controller 318, and I²C interface 320. Preferably, standard interfaces such as AES/EBU and I²C are supported.

A first embodiment of the present invention provides a system which is compatible with many earlier ISA-based sound systems, yet resides on a local bus or other bus providing burst mode or high speed block data transfer. The first embodiment accepts commands in a prior art format, but bypasses the DMA controller for digitized sound I/O transfer. It should be understood, however, that the present invention is by no means limited to providing compatibility with ISA-based sound systems. It will be readily apparent to one of ordinary skill in the art that aspects of the present invention may be applied to provide compatibility with other I/O systems on different buses, including without limitation, the Extension to Industry Standard Architecture (EISA) expansion bus, the Micro Channel expansion bus, and the X-bus (extension to the expansion bus). For a description of these bus systems, see Tom Shanley, *EISA System Architecture*, PC System Architecture Series Volume 2 (MindShare Press 1993 rev. ed.), and PCI Architecture, each of which is hereby specifically incorporated herein by reference. In addition, the present invention may be advantageously applied even where compatibility is not an issue.

Referring to FIG. 2, the Media Stream Controller 58 receives inputs from a video input circuit 66. The video input circuit 66 receives video inputs through a bus 68 from a video source (not shown) which may be constructed in a conventional manner. The Media Stream Controller 58 also receives inputs from, and provides outputs to, a sound integrated circuit 70 which may be constructed in a conventional manner.

The sound integrated circuit 70 receives inputs relating to monaural sound on one of two pairs of lines 72 and 74 or relating to stereophonic sound on both pairs of lines. For example, the sound inputs on the pairs of lines 72 and 74 may be from microphones. The sound integrated circuit 70 may provide a sound output on a pair of lines 76. These lines are respectively designated as L (left) and R (right) to indicate the disposition of speakers for stereophonic sound. Preferably, a standard AES/EBU serial audio interface is used for communication between the Media Stream Controller 58 and sound integrated circuit 70.

A line 80 extends from the Media Stream Controller 58 to one of the input terminals of an interrupt controller 82 corresponding to the interrupt controller 42 in FIG. 1. As will be seen, the interrupt controller 82 has a plurality of input terminals respectively designated as IRQ1–IRQ7 and corresponding to the input terminals IRQ1–IRQ7 of the interrupt controller 42 in FIG. 1. An interrupt line 80 corresponding to the interrupt line 41 in FIG. 1 extends between the Media Stream Controller 58 and the interrupt controller 82. However, a line 80 is shown in FIG. 2 as extending to the IRQ 5 terminal as distinguished from the IRQ 4 terminal in FIG. 1. For the first embodiment, the Media Stream Controller 58 uses a different IRQ input than is used by the conventional ISA sound card of FIG. 1 to activate the Driver ISR. A line 84 corresponding to line 44 in FIG. 1 connects CPU 11 to Interrupt Controller 82.

A display memory random bus 86 is common with the Media Stream Controller 58 and a display memory 88 (also designated in FIG. 2 as a video random access memory). This display memory 88 has different portions. For example, the display memory 88 has a portion 90 designated as a "GUI FIFO memory" for storing commands on an overflow basis. The memory portion 90 and related portions of the system are disclosed in detail in copending application Ser. No. 08/337,939 filed on Nov. 10, 1994 in the names of David C. Baker and Michael D. Asal as joint inventors, titled "System for, and Method of, Processing in Hardware Commands Received from Software without Polling of the Hardware by the Software", assigned of record to the assignee of record of this application, and which is hereby incorporated herein by reference.

The display memory also includes a frame buffer memory 92 for storing graphics data, such as data for a look-up table, and a video input memory 94 for storing video data. A system for storing graphics data and video data in different portions of a display memory is disclosed in detail and claimed in U.S. Pat. No. 5,406,306. The outputs from the frame buffer memory 92 and the video input memory 94 are provided on a line 96 designated as "Digital Pixel Data to PACDAC".

The output on the line 96 may be introduced to a display monitor (not shown) to provide a visual image. The term "PACDAC" is an acronym to indicate a packet based digital-to-analog converter. The PACDAC may also include a random access memory. A PACDAC and related portions of the system are described in detail in copending application Ser. No. 08/214,787 (attorney's file D-2717) filed Mar. 16, 1994 in the names of David C. Baker and Jonathan I. Siann as joint inventors, titled "Multimedia Graphics System", assigned of record to the assignee of record of this application, and which is hereby incorporated herein by reference. The output on line 96 indicates that the binary information in the frame buffer memory 92 may represent positions in a look-up table and that these positions may have binary indications representing pseudo colors. These binary indications are converted to analog values by the digital-to-analog converters to provide the colors at the different pixel positions on the display monitor. As disclosed in U.S. Pat. No. 5,406,306, the video information in the video input memory 92 is converted to a form compatible with the graphics information for the frame buffer memory 92 and this converted video information is shown in the display monitor.

The media stream controller, display memory, and PACDAC may also cooperate to produce a composite video output signal. A composite video subsystem and related portions of the system are disclosed in detail in copending application Ser. No. 08/337,350 filed on Nov. 10, 1994 in the names of David C. Baker, Daniel P. Mulligan, and Eric I. Schell as joint inventors, titled "System and Method for Generating Video in a Computer System", assigned of record to the assignee of record of this application, and which is hereby incorporated herein by reference in its entirety.

A portion of the display memory is also used to provide an audio buffer 100. The audio buffer 100 is preferably a 32 KB buffer in the first embodiment, although other sizes including but not limited to 16 KB or 64 KB could be used. The audio buffer 100 is used to buffer sound data along with certain formatting and control information for the data before it is sent to, or received from, the sound integrated circuit 70. The buffering allows sound data to be transferred between main memory and the audio buffer 100 across the local bus 20 and high speed I/O Bus 54 at a high rate using burst mode data transfer, yet still allows sound data to be played or recorded through the sound integrated circuit at a different frequency. For instance, one word of sound data may be output to the Sound Integrated Circuit 70 every 20 µs even though the data transfer rate across the local and high speed I/O buses is much higher. Thus, the play and record frequency is decoupled from the data transfer rate. By transferring a block of sound data at high speed and by buffering it in the audio buffer, bus bandwidth can be freed up for other uses.

Figure 4:
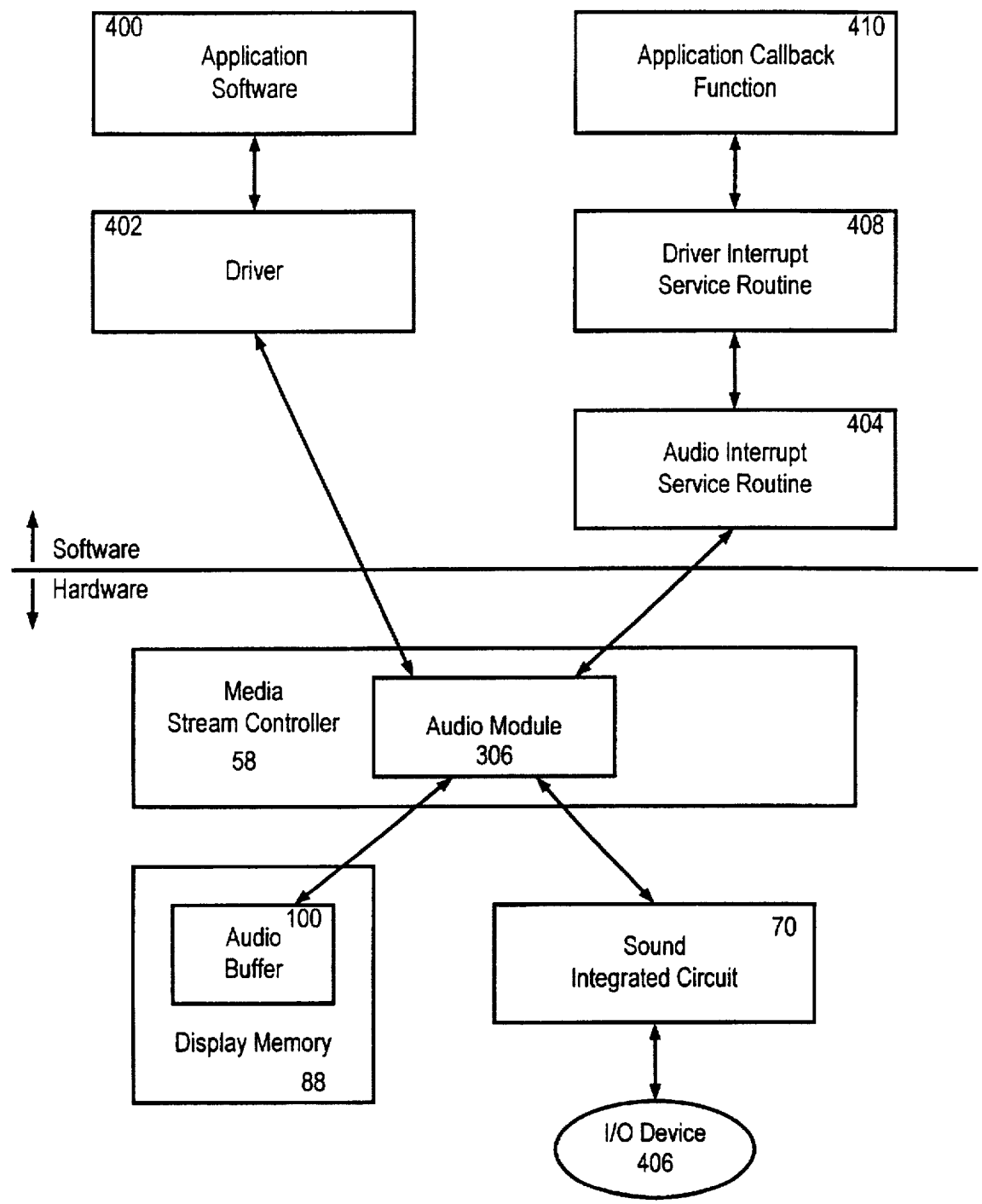
FIG. 4 is a simplified block diagram illustrating how sound is produced in a system according to the first embodiment.

FIG. 4 is a simplified block diagram illustrating how sound is produced in a system according to the first embodiment. Digitized sound I/O is controlled by a software application 400 that sends commands to the Media Stream Controller 58, either directly or through a driver 402 as shown in FIG. 4. To provide compatibility, the first embodiment allows these commands to be sent to the same addresses, in the same format, as is common in typical ISA-based sound systems. The commands may be addressed to an I/O port directly (for instance as an offset of a base address such as 220 h or 240 h) or through addresses that are memory mapped to these ports. The Media Stream Controller 58 will intercept these commands from the high speed I/O Bus 54 and its Main Bus Interface 300 will convert the addresses to internal addresses on the Hbus 302 for the Audio Module 306.

The digitized sound I/O commands and related data transfer are processed primarily by the Audio Module 306 and an Audio Interrupt Service Routine (AISR) 404. The AISR 404 is preferably loaded at boot up as part of the BIOS, and is configured to be activated by an interrupt generated by the Audio Module 306. When the software application 400 sends a command to the Audio Module 306 requesting that a packet of sound data be played, the Audio Module 306 generates an interrupt and the AISR 404 is activated. The AISR 404 reads the command out of registers in the Audio Module 306 and causes part or all of the packet to be transferred through the Media Stream Controller 58 to the Audio Buffer 100 using burst mode block transfer commands executed by the CPU. The Audio Module 306 then transfers the sound data out of the Audio Buffer 100 at the desired frequency, formats it in standard AES/EBU format, and sends it to the Sound Integrated Circuit 70. The Sound Integrated Circuit then plays the sound on an output device 406. When the buffered sound data has finished playing, the Audio Module 306 generates another interrupt to once again activate the AISR 404. If more sound data remains in the packet, the AISR transfers it to the Audio Buffer and the process continues.

Once the entire packet has been played, the AISR generates an effective interrupt which activates the Driver Interrupt Service Routine 408 (or an ISR set up by the application where a driver is not used). Where a driver is used, the Driver Interrupt Service Routine 408 may in turn call an Application Callback Function 410. The effective interrupt is preferably indistinguishable from an interrupt generated by a conventional ISA-based sound card 26. Thus, the Driver ISR 408 and Application Callback Function 410 may operate compatibly with both conventional sound cards and the system of the first embodiment. After being activated by the effective interrupt, the Driver ISR 408 and Application Callback Function 410 may set up additional packets to be transferred or may terminate the digitized sound I/O. If additional packets are sent, the AISR 404 and Audio Module 306 repeat the process described above.

The mechanisms used to allow cooperative processing of digitized sound I/O by the Audio Module 306 and AISR 404 in the first embodiment will now be described in more detail. The processing of digitized sound I/O in the first embodiment uses addresses generally corresponding to registers provided in conventional sound cards. Accesses to these registers are decoded by the main bus interface 300 of the Media Stream Controller 58 and mapped on the Hbus 302 to the Audio Module 306. While the addresses used and the functions performed by accessing them may be compatible with conventional sound cards, the internal structure and operation is specifically designed to allow processing by the Audio Module and AISR in a high speed I/O Bus environment. In particular, an Audio Read Register (ARR) and an Audio Command Register (ACR) may have a conventional portion accessible to a software application for compatibility. They may also have a local portion that is used for the logic and communication of the Audio Module and AISR. In the first embodiment, the ACR and ARR have a separate local portion used for command processing that is not accessed by the application, but is accessed by the AISR. When a value is to be provided to the software application, the value is moved from the local portion of the ARR or ACR to the non-local portion. Table 1 lists the main registers accessible by a software application. The first column lists the address offset for the register. The second column lists the register's name, and the third column lists whether the register allows read (R), or write (W) access.

TABLE 1

| Address Offset | Register Name | Access |
|---|---|---|
| 0x02X6,7 | Audio Reset Register ("Reset") | W |
| 0x02XA,B | Audio Read Register (ARR) | R |
| 0x02XC,D | Audio Command Register (ACR) | W |
| 0x2XC,D | Audio Command Status (ACS) | R |
| 0x02XE,F | Audio Read Status (ARS) | R |

The Reset Register is used to place the Audio Module in an initialized state similar to conventional sound cards. The Reset Register may be implemented in logic rather than using an actual register. In addition to initializing its own logic, the Audio Module sets a reset flag in a status byte of the Audio Command Register (discussed further below) and generates an interrupt to activate the AISR. The AISR then parses the status byte of the Audio Command Register (ACR), detects a reset, and resets its state logic to an initialized state.

The Audio Command Status (ACS) register is read to determine whether the Audio Module is ready to receive a command or data. If the Audio Module is ready, a command or data may be written to the same address, which then functions as the address for the ACR. To read data returned from a command, first the Audio Read Status (ARS) register is read to determine whether the data is ready. If it is ready, the data may be read from the Audio Read Register (ARR).

The processing of digitized sound I/O commands provides the basic mechanism for communication between the Audio Module 306 and the AISR 404 and will now be described in detail. Sound commands are initially received by the Audio Module 306. Depending on the type of command, the Audio Module may process it directly (these commands are referred to as "Passive AM Direct" commands), store its parameters in a register for the AISR to use later (these commands are referred to as "Passive AM Shadow" commands) or generate an interrupt to activate the AISR to process the command (these commands are referred to as "Active AISR" commands). Table 2 illustrates how commands may be categorized for the system of the first embodiment. The first column of Table 2 lists the command code, which is written to the ACR to initiate processing. The second column lists the number and size of parameters for the command, and column three lists the number and size of data parameters returned by the command via the ARR. Column four contains a functional description of the command, and column five indicates how the command is processed by the system of the first embodiment.

TABLE 2

| Cmd | # Parms | Cmd Resp | Functional Descriptions | Processing Method |
|---|---|---|---|---|
| 0x10 | 1byte to 2XC | 0 | Direct mode play | "Active" AISR |
| 0x14 | 2bytes to 2XC | 0 | SCD play mode | "Active" AISR |
| 0x16 | 2bytes to 2XC | 0 | 2-bit ADPCM (Single Cycle) | "Active" AISR |
| 0x17 | 2bytes to 2XC | 0 | 2-bit ADPCM w/ref (Single Cycle) | "Active" AISR |
| 0x1C | 0 | 0 | A/D play mode | "Active" AISR |
| 0x1F | 0 | 0 | 2-bit ADPCM w/ref (Auto-Init) | "Active" AISR |
| 0x20 | 0 | 1 byte from 2XA | Direct record mode | "Active" AISR |
| 0x24 | 2bytes to 2XC | 0 | SCD record mode | "Active" AISR |
| 0x2C | 0 | 0 | A/D record mode | "Active" AISR |
| 0x40 | 1byte to 2XC | 0 | DMA transfer time constant | "Passive" AM Shadow |
| 0x48 | 2bytes to 2XC | 0 | Set transfer size for Auto-Inits | "Passive" AM Shadow |
| 0x74 | 2bytes to 2XC | 0 | 4-bit ADPCM (Single Cycle) | "Active" AISR |
| 0x75 | 2bytes to 2XC | 0 | 4-bit ADPCM w/ref (Single Cycle) | "Active" AISR |
| 0x76 | 2bytes to 2XC | 0 | 3-bit ADPCM (Single Cycle) | "Active" AISR |
| 0x77 | 2bytes to 2XC | 0 | 3-bit ADPCM w/ref (Single Cycle) | "Active" AISR |
| 0x7D | 0 | 0 | 4-bit ADPCM w/ref (Auto-Init) | "Active" AISR |
| 0x7F | 0 | 0 | 3-bit ADPCM w/ref (Auto-Init) | "Active" AISR |
| 0x80 | 2bytes to 2XC | 0 | Pause DMA | "Active" AISR |
| 0x90 | 0 | 0 | HSD Play (Auto-Init) | "Active" AISR |
| 0x91 | 0 | 0 | HSD Play (Single Cycle) | "Active" AISR |
| 0x98 | 0 | 0 | HSD Record (Auto-Init) | "Active" AISR |
| 0x99 | 0 | 0 | HSD Record (Single Cycle) | "Active" AISR |
| 0xA0 | 0 | 0 | Set record mode to mono | "Passive" AM Shadow |
| 0xA8 | 0 | 0 | Set record mode to stereo | "Passive" AM Shadow |
| 0xD0 | 0 | 0 | Halt DMA | "Active" AISR |
| 0xD1 | 0 | 0 | Turn Speaker ON | "Active" AISR |
| 0xD3 | 0 | 0 | Turn Speaker Off | "Active" AISR |
| 0xD4 | 0 | 0 | Continue DMA | "Active" MSR |
| 0xD8 | 0 | 1 byte from 2XA | 00:Spkr OFF, 0xFF Spkr ON | "Passive" AM Direct |
| 0xDA | 0 | 0 | Exit A/D DMA | "Passive" |

TABLE 2-continued

| Cmd | # Parms | Cmd Resp | Functional Descriptions | Processing Method |
|---|---|---|---|---|
| 0xE0 | 1byte to 2XC | 0 | Mode Invert cmd parameter & read | AM Shadow "Passive" AM Direct |
| 0xE1 | 0 | 2 bytes from 2XA | Version check | "Passive" AM Direct |

Direct commands, such as version check (0xE1) and speaker status (0xD8), are processed directly by logic in the Audio Module and do not require any action by the AISR.

Passive shadow commands are trapped by the Audio Module 306 and the relevant information from the command is placed in an Audio DMA Control Register (ADCR). This information can then be read by the AISR when it processes a DMA command (which is Active). The ADCR is accessible by the AISR through memory mapped I/O. The ADCR is a four byte register. The DMA Time Constant is placed in byte 0, the least significant byte (LSB) of the DMA length is placed in byte 1, the most significant byte (MSB) of the DMA length is placed in byte 2, and a DMA Control Status byte is placed in byte 3. The bits in the DMA Control Status byte may be set to tell the AISR whether stereo or mono play and record are being used, and to indicate whether a new DMA time constant or DMA length has been set.

Active commands are trapped by the Audio Module and stored in the local portion of the Audio Command Register (local ACR). The local ACR contains four registers, each 4 bytes long. Each register may contain a command and associated parameters. For each register, byte 0 is used for the command code, byte 1 is used for the first parameter byte (this is set to 0x00 if not used), byte 2 is used for the second parameter byte (this is set to 0x00 if not used), and byte 3 contains an AISR status byte which is described in more detail below.

When a command/data write is initially detected by the Audio Module 306, the data is latched into byte 0 and the Audio Module looks the command up in a table of known commands to determine the number of parameters it should expect. If there are parameters, the Audio Module will wait to receive the parameters. If the command is a shadow command, the parameters will be placed in the ADCR as described above. If the command is active, the parameters, if any, will be placed in bytes 1 and 2 of the local ACR.

Bit flags may also be set in the AISR status byte to indicate to the AISR that certain events have taken place, such as a reset, an interrupt acknowledge (for AID mode), or the detection of an unknown command. It may also contain a local ARR byte pointer (discussed below). When the active command sequence is complete, the Audio Module will generate an interrupt to activate the AISR. The AISR may then access the information in the local ACR register through memory mapped I/O.

The purpose of having four registers in the local ACR is to support the possibility that the Driver ISR (or Application ISR) called by the AISR may disable interrupts and perform active commands. The AISR will not be able to process these new commands until interrupts are enabled. It is believed that for most practical cases in the first embodiment no more than four active commands will be written by the Driver ISR with interrupts disabled. Thus, the 4-deep local ACR will be able to store all of these commands until interrupts are enabled. The 4-deep buffered local ACR registers operate in a "wraparound" fashion when more than one command is received.

Before an application writes a command or data parameter to the Audio Module, it must first check the status of the register by performing a read on 0x2XC. The Audio Module 306 processes these requests directly. Generally, a signal indicating that the register is ready to receive commands or data parameters is returned. During short periods of time between an interrupt request and an acknowledgment from the AISR, a value of not ready may be returned. In addition, if the 4-deep buffered local ACR registers are ever all full, a not ready value will be returned.

The ADCR and local ACR registers provide the basis for command processing in the first embodiment. When a write to 0x2XC is initially detected by the Audio Module 306, the byte is placed in byte 0 of the local ACR. Then the Audio Module identifies the command, determines whether it is a "direct", "active", or "shadow" mode command, and determines the number of additional parameters required. If the command is non-active, the Audio Module interprets and processes the command. This involves either direct processing (such as issuing a command to get speaker status), or shadowing the command in the ADCR for later use by the AISR. If the command is "active", the Audio Module receives the appropriate number of parameters in the local ACR and generates an interrupt request.

The AISR 404 is then activated by the interrupt controller. The AISR reads the flags in the interrupt status word from an Audio Interrupt Register (AIR) to determine that the Audio Module is the source of the interrupt, and to determine what action has taken place. If a known command is detected, the AISR will then proceed with command processing. In addition, appropriate information will be extracted from the ADCR as necessary. The various actions that may be taken to process different commands are illustrated in a computer program listing for a sample AISR attached at the end of this specification in accordance with 37 CFR §1.96. The computer program listing is entitled Appendix A and is incorporated herein by reference. In addition, the AISR processing for DMA mode commands is described in more detail below. If, on the other hand, an unknown command is detected, the AISR 404 will attempt to determine how many bytes the Audio Module 306 should discard before resuming command processing.

Once a command has been processed, data may be returned through the local portion of the Audio Read Register (local ARR). The local ARR in the first embodiment consists of a 3-byte circular buffer for storing data to be returned to an application, as well as a fourth byte set aside to store control information from the AISR that is used by the Audio Module. A pointer to the current byte in the 3-byte circular buffer is maintained in the AISR status byte of the local ACR. When a data value is returned, it is placed in the current byte by the AISR for active commands and by the Audio Module for passive commands. If two bytes are returned, they are placed in consecutive bytes of the circular buffer. When an application performs a read on this register, the current byte of data is placed in the non-local portion of the ARR, and the pointer is automatically updated to the next location. The last byte of the local ARR is not part of the circular buffer. Rather it is used to pass control information from the AISR to the Audio Module. Its function is similar to the AISR status byte of the local ACR which provides status information from the Audio Module to the AISR. Bit flags are set in the control byte of the local ARR to indicate how many bytes to discard if an unknown command has been detected. Additionally, a flag is set to tell the Audio Module 306 when the AISR 404 has generated an effective interrupt for the Driver ISR 408 at the end of a DMA transfer (discussed further below).

Before an application reads data from the ARR, it should check the Audio Read Status (ARS) register. This register provides a value indicating whether data is ready to be read from the ARR. When multiple bytes are returned by a command, a queue of "ready" flags is set. Each "ready" flag is cleared when the corresponding data byte is read from the ARR by the application. For commands that do not return data, the ARS register returns a value of "not ready".

The above registers provide a basic mechanism for communication between the Audio Module 306 and the AISR 404. It will be readily understood by those of ordinary skill in the art that the information maintained in these registers will be dictated by the functions implemented and by the need for compatibility with existing applications. Additional bit flags may be set in status and control bytes of the registers as necessary. The number and behavior of registers may also be modified to suit the particular application. For instance, a second embodiment may use techniques similar to those discussed above to process commands for an audio mixer chip in a manner compatible with conventional mixer chips. An example is illustrated in the computer program listing for the sample AISR attached at the end of this specification and incorporated herein by reference.

OVERVIEW OF OPERATION

Now that the audio sound registers have been described, the transfer of sound data for DMA mode commands will be described in detail. DMA mode commands are handled primarily by two sets of data transfer in the first embodiment—(1) a transfer of data from the main memory to the Audio Buffer, and (2) a transfer from the Audio Buffer to the Sound Integrated Circuit. The first transfer is controlled primarily by the AISR 404 and will be discussed first. The second transfer is controlled primarily by hardware in the Audio Module 306 and will be discussed second. The following description will focus on DMA mode commands for playing sound data in the first embodiment—that is transferring sound data from the main memory to an output device such as a speaker or the like. It will be readily understood that similar techniques may be used to support recording of sound data by transferring data in the opposite direction (from an input device, such as a microphone or the like, to main memory). Both of these techniques are illustrated in the computer program listing for the sample AISR attached at the end of this specification and incorporated herein by reference. Similarly, the techniques described below may be adapted to provide direct mode play and record which are also illustrated in the computer program listing for the sample AISR.

Figure 5:
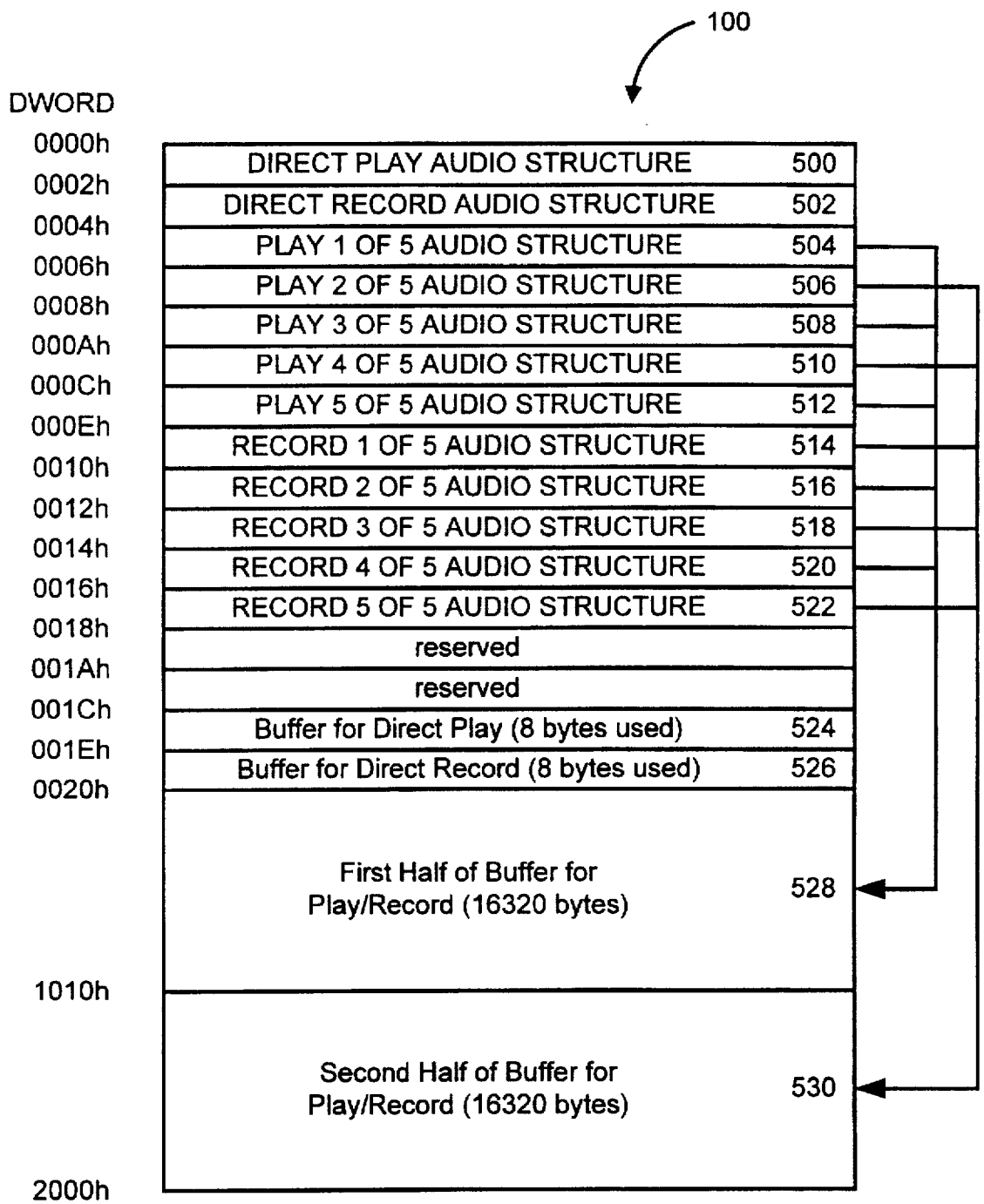
FIG. 5 is a simplified block diagram illustrating the structure of an Audio Buffer according to the first embodiment.

In order to understand the processing of DMA mode commands in the first embodiment, it is helpful to understand the structure of the Audio Buffer 100. The structure of the Audio Buffer for the first embodiment is illustrated in FIG. 5. The Audio Buffer 100 in the first embodiment is a 32 KB buffer in the display memory 88. At the beginning of the Audio Buffer, space is set aside for Audio Structures 500–522 which contain format and control information for the data being transferred. Each Audio Structure consists of two double words. These double words contain information regarding the data block size, the data transfer direction and formatting, as well as some additional information for the data block. Space is also allocated for buffers 524 and 526 to store data being transferred for direct play or record modes.

The rest of the Audio Buffer 100 may be used to buffer data for DMA mode commands. In the first embodiment, 32,640 bits are provided for this purpose. If an application requests a packet to be played that is 32,640 bits or less, the AISR will put the entire packet in this buffer, and the format and control information for the packet will be placed in the PLAY1 Audio Structure 504. It will be recalled, however, that in the ISA based system described above, DMA may be used to transfer a sound packet of up to 64 KB at a time. Therefore, if the packet is larger than 32,640 bits in the first embodiment, a double buffering system is used to transfer the data through the Audio Buffer. Two Play/Record buffers 528 and 530 are set up, each being 16,320 bits. The AISR 404 determines how many 16,320 bit blocks will be necessary to transfer the data and sets up that many Audio Structures in the Audio Buffer 100. A flag is set in the last Audio Structure to indicate that it is the last block in the packet. The AISR 404 then transfers the first 32,640 bits of the sound packet to the Audio Buffer. The format and control information in the PLAY1 Audio Structure 504 are used by the Audio Module to transfer the first 16,320 bits of data (in the first half of the Play/Record Buffer 528) to the Sound Integrated Circuit 70. When this data has been transferred, another block of data from the packet (up to 16,320 bits) is transferred to the first half of the Play/Record buffer 528 by the AISR. This data corresponds to the PLAY3 Audio Structure 508. In the meantime, data may be read out of the second half of the Play/Record buffer 530 to be played by the Sound Integrated Circuit 70. When the data in the second half of the Play/Record buffer 530 has been transferred, a block of data corresponding to the PLAY4 Audio Structure 510 may be transferred to the second half of the Play/Record buffer 530 while the data in the first half (for PLAY3) is being played. This double buffering process continues until the entire packet has been transferred. The number of Audio Structures needed is determined by the number of 16,320 bit blocks required to transfer the entire sound packet. It will be readily understood by those of ordinary skill in the art that five (5) Audio Structures are required to transfer a 64 KB (65,536 bit) packet of sound data. The last buffer will only contain 256 bits. Of course, other sized Audio Buffers could be used. A 16 KB buffer would require as many as nine (9) Audio Structures to transfer a 64 KB sound packet, while a 64 KB buffer would require only two Audio Structures.

SPECIFIC OPERATION

Figure 6:
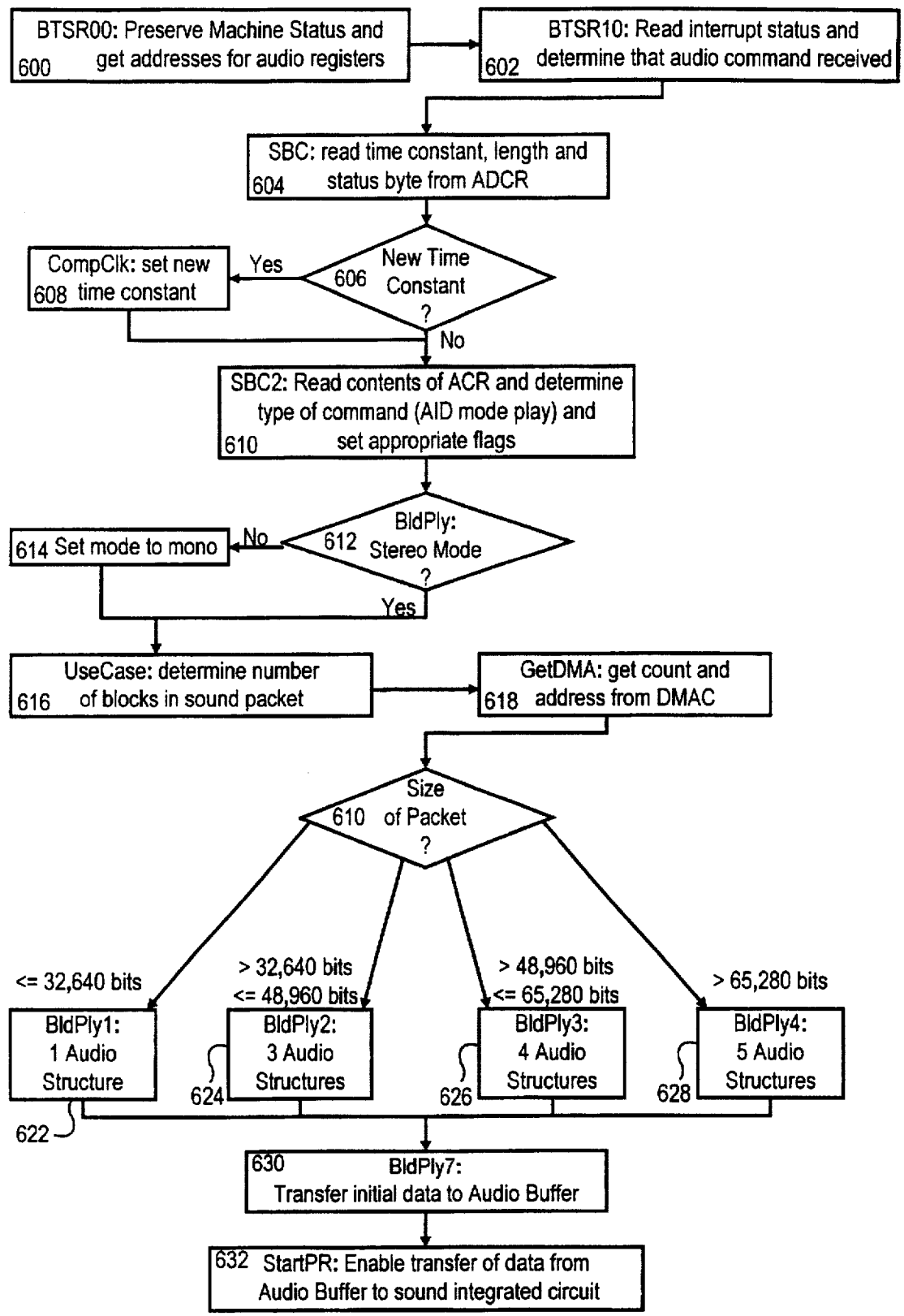
FIG. 6 is a flow char illustrating initial DMA command processing in an Audio Interrupt Service Routine according to the first embodiment.
Figure 7:
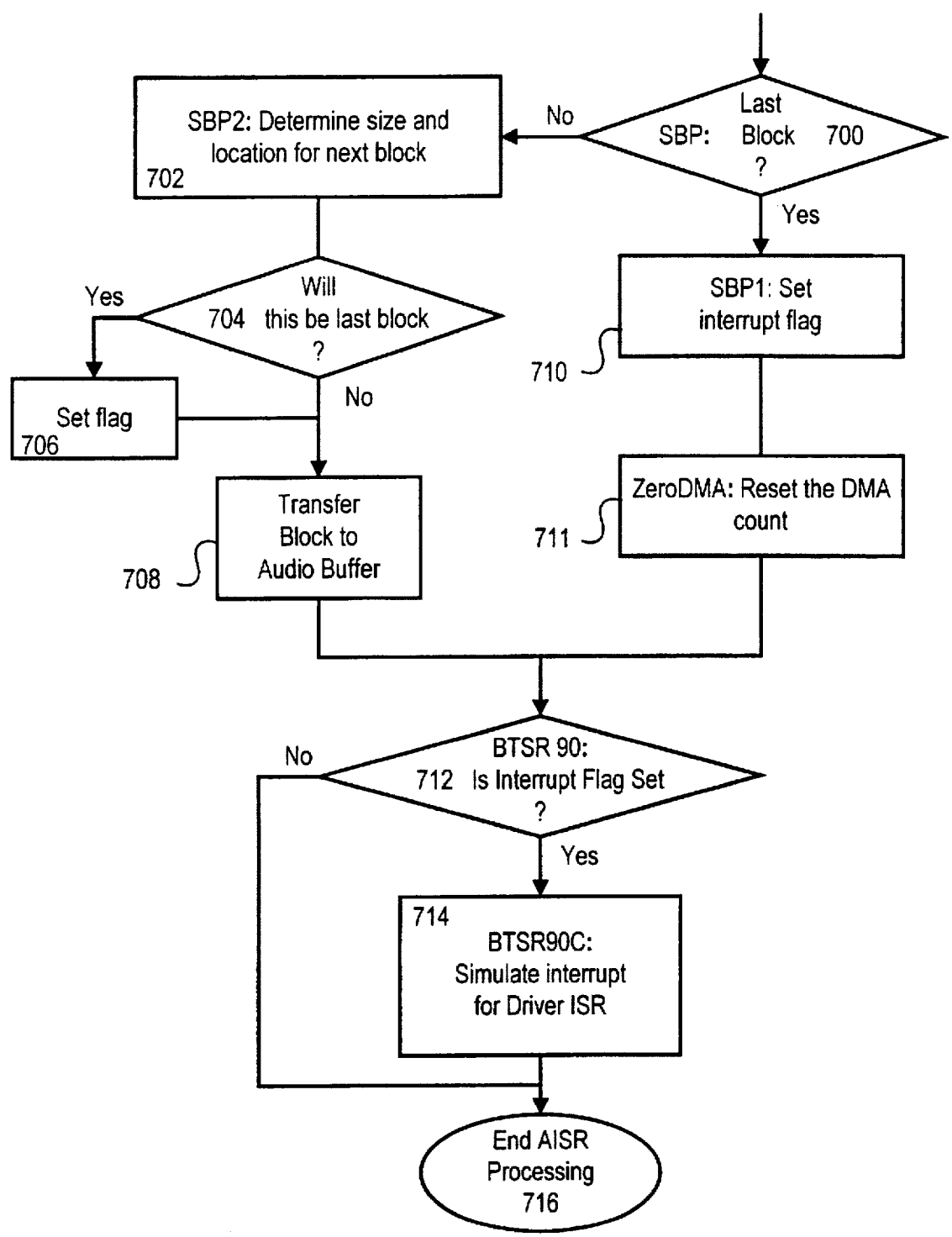
FIG. 7 is a flow chart illustrating secondary DMA command processing in an Audio Interrupt Service Routine according to the first embodiment.

The processing for a sample DMA mode command will now be traced with reference to the computer program listing for the sample AISR attached at the end of this specification and with reference to FIGS. 6 and 7. For illustrative purposes, it will be assumed that an auto-initialize DMA (AID) play mode command (0×1C) is being processed.

As has been discussed previously, the DMA mode commands are initiated by application software 400. The application 400 programs the DMA controller by enabling the DMA channel, providing a base address for the transfer, and by providing a count indicating the number of bytes (or words) to transfer. In addition, the DMA mode is set (in this example the mode would be set to auto-initialize).

The application also sends a command to the Audio Module 306 to set the time constant to control the rate at which the data is sent to the output device. The application may also configure the system to play in stereo or mono. Since auto-initialize mode is being used, the application would also set the transfer size. All of this information is stored by the Audio Module 306 in the ADCR.

The application 400 then sends the AID play mode command (0×1C) to the Audio Module 306. The Audio Module detects the command, places it in the local ACR, and sets a flag in the status byte of the local ACR to indicate that a known command has been detected. Then the Audio Module 306 generates an interrupt to activate the AISR 404, since the AID play mode command is an "active" command.

FIG. 6 is a simplified flow chart illustrating the steps taken by the AISR 404 to process the command. The steps are generally labeled to correspond to the label and procedure names for the corresponding code in the sample AISR computer program listing attached at the end of this specification and incorporated herein by reference. At BTSR00 600, the AISR first saves the state of the machine as is conventional in interrupt service routines. The AISR also sets up the address used to access the audio registers at this point.

At BTSR10 602, the AISR reads the interrupt status from the audio registers and determines the type of interrupt that has occurred. In this case, the AISR determines that an active audio command has been sent to the Audio Module 306. This causes the AISR to jump to the code labeled SBC 604 where the time constant, transfer size, and status byte are retrieved from the ADCR. The status byte is checked to see if a new time constant has been provided as shown in block 606 of FIG. 6. If a new time constant has been provided, the procedure CompClk 608 is called to set the new frequency for sound output. The read of the status byte automatically clears the time constant flag, so this step will be skipped on subsequent calls of the AISR until a different time constant is set.

At SBC2 610, the AISR reads the contents of the local ACR, determines the type of command, and sets appropriate flags to indicate the type of command (in this case 8 bit AID play). Then the procedure BldPly 612 is called. Here the AISR sets up the audio structures in the Audio Buffer. First BldPly sets the mono/stereo mode as illustrated by blocks 612 and 614 of FIG. 6. Then BldPly calls a procedure UseCase 616. This procedure calculates the number of audio structures that will be needed to transfer the sound packet through the Audio Buffer 100. After the AISR returns to BldPly from UseCase 616, a GetDMA 618 procedure is called to get the count and address from the DMA controller. Next BldPly jumps to one of four pieces of code depending on the size of the sound packet as was determined by the UseCase procedure (see block 620 of FIG. 6). BldPly1 622 is used if the packet will fit completely in the Audio Buffer (<=32,640 bits). It configures a single audio structure, and a flag is set to indicate that the transfer will be complete after this block is played. BldPly2 624 is used when three audio structures are necessary (>32,640 bits and <=48,960 bits). BldPly3 626 is used when four audio structures are necessary (>48,960 bits and <=65,280 bits), and BldPly4 628 is used when five audio structures are necessary (>65,280 bits). In each case, the appropriate number of audio structures are configured, and a flag is set in the last audio structure to indicate that the transfer will be complete after that block is transferred.

After the audio structures are configured, the AISR jumps to BldPly7 630 which moves the initial blocks of data into the Audio Buffer 100. Up to 32,640 bits can be moved at this point. Additional sound data will have to be moved to the Audio Buffer on subsequent calls to the AISR 404 using the double buffering technique described previously. The actual data transfer is accomplished using a "rep movsd" assembly language command which repeatedly moves double words of sound data into the Audio Buffer 100 from the main memory address that was retrieved from the DMA controller by the GetDMA 618 procedure. This command causes the CPU to transfer the data across the local bus and high speed I/O bus to the Audio Buffer 100 using high speed burst mode data transfer.

After the initial sound data has been transferred, the StartPR 632 procedure is called. This procedure initializes an audio structure pointer in the Audio Module 306 to point to the PLAY1 audio structure 504 and enables the transfer of data out of the Audio Buffer 100 to the Sound Integrated Circuit 70. It also sets a flag to indicate that DMA transfer is in progress.

The AISR then restores the machine status and chains to the next interrupt service routine for the same level of interrupt to see if any other devices have requested an interrupt. This is the end of the AISR processing until it is reactivated by another interrupt.

The Audio Module 306 then loads the size of the block of data from the PLAY1 audio structure 504 into a counter. The Audio Module 306 then counts through the block of data in the Audio Buffer one sample at a time. Each word is formatted and sent to the Sound Integrated Circuit 70 at the desired frequency. Once the entire block has been transferred, the Audio Module 306 determines whether that was the last block in the packet (based on flags set by the AISR in the PLAY1 audio structure 504). If it is not the last block, the audio structure pointer in the Audio Module 306 automatically increments to point to the next audio structure (in this case PLAY2 506), and the data corresponding to this structure (which is in the second half of the Play/Record buffer 530) begins being formatted and sent to the Sound Integrated Circuit 70. The Audio Module 306 also generates another interrupt to activate the AISR 404. The Audio Module also sets the interrupt status byte in the local ACR to indicate that a block has been transferred as opposed to a new command being received. This is referred to as a primary audio interrupt.

The steps taken by the AISR on the second activation are illustrated in the simplified flow chart of FIG. 7. The AISR first determines that a primary audio interrupt has occurred and jumps to the code labeled SBP 700. The SBP 700 code checks to see if the last block of the packet has been transferred out of the Audio Buffer 100. If the last block has not been transferred, the AISR jumps to SBP2 702 and determines the amount of data left to transfer as well as the location for the next block in the Audio Buffer. If the next block is the last block, a flag will be set as shown in blocks 704 and 706 of FIG. 7. The next block will be transferred into the half of the Play/Record buffer 528 or 530 that was just emptied (see block 708 of FIG. 7). For instance, of the first block of sound data (corresponding to the PLAY1 audio structure 504) was just played out of the first half of the buffer 528, the next block (corresponding to the PLAY3 audio structure 508) will be transferred back into the first half of the Play/Record buffer 528. In the meantime, sound data is being transferred out of the second half of the Play/Record buffer 530 (corresponding to the PLAY2 Audio Structure 506) by the Audio Module 306 to be played by the Sound Integrated Circuit 70. Similarly, after the PLAY2 data has been played, data corresponding to the PLAY4 Audio Structure 510 can be moved into the second half of the audio buffer 530 while data for the PLAY3 Audio Structure 508 is read out of the first half of the Play/Record buffer 528. This double buffering method proceeds until the last block of data is played.

If the AISR determines that the last block in the packet has been played, the SBP1 710 code sets a flag indicating that an interrupt should be generated to tell the Driver ISR 408 that the packet has finished being played. This code also clears the flag indicating that DMA mode transfer is in progress. Then ZeroDMA code 711 is called which resets the count in the DMA controller to the state it would have been in had a DMA transfer actually been performed by the DMA controller. In the first embodiment the count is reset to FFFFFFFF hex. This helps ensure compatibility with applications that use the count of the DMA controller after a DMA transfer. In an alternative embodiment, the count in the DMA controller is decreased after each block transfer to more accurately reflect the amount of data that has been transferred. The count is then completely reset upon the final transfer.

Before the AISR completes processing, code labeled BTSR90 712 is called to check if the interrupt flag is set. If BTSR90 712 determines that the interrupt flag is set, the code at BTSR90C 714 then simulates an interrupt to activate the Driver ISR 408. An "les" assembly language command is used to load a pointer to the Driver ISR 408 and a "call" command is used to execute the code. In this way, the Driver ISR 408 is notified that the transfer of the sound data packet has been completed in a manner generally indistinguishable to the Driver ISR from conventional ISA based sound cards. As with conventional sound cards, the Driver ISR may then request additional packets to be transferred. After the Driver ISR returns, the AISR then restores the status of the machine and chains to the next interrupt service routine.

While the above description focuses upon DMA emulation for playing sound data, it will be readily understood by those of ordinary skill in the art that similar double buffering techniques can be used for recording sound data. For recording data, the AISR sets up the appropriate audio structures and then waits for the respective half of the Play/Record buffer to be filled. Once half of the buffer is filled, an interrupt is generated and the AISR transfers the data to a buffer in main memory. In the meantime, the other half of the Play/Record buffer may be filled with incoming sound data. When the entire packet is transferred to main memory, an effective interrupt is generated for the Driver ISR.

MEDIA STREAM CONTROLLER

Figure 8A:
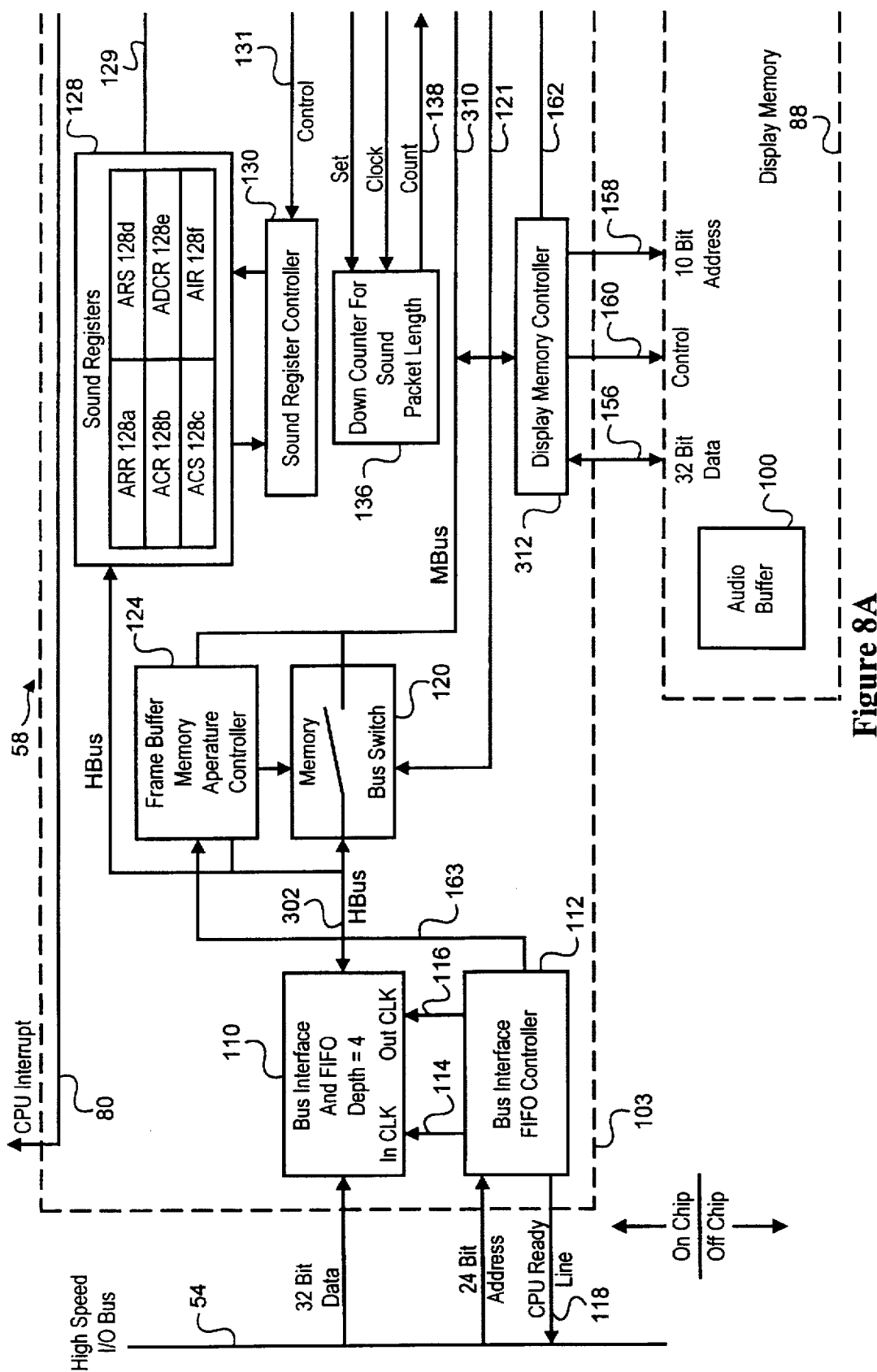
FIGS. 8A and 8B collectively constitute a block diagram showing in additional detail portions of the "Audio Module" block of FIG. 3 as well as related components from the "Multimedia Stream Controller" block of FIG. 3 according to the first embodiment.
Figure 8B:
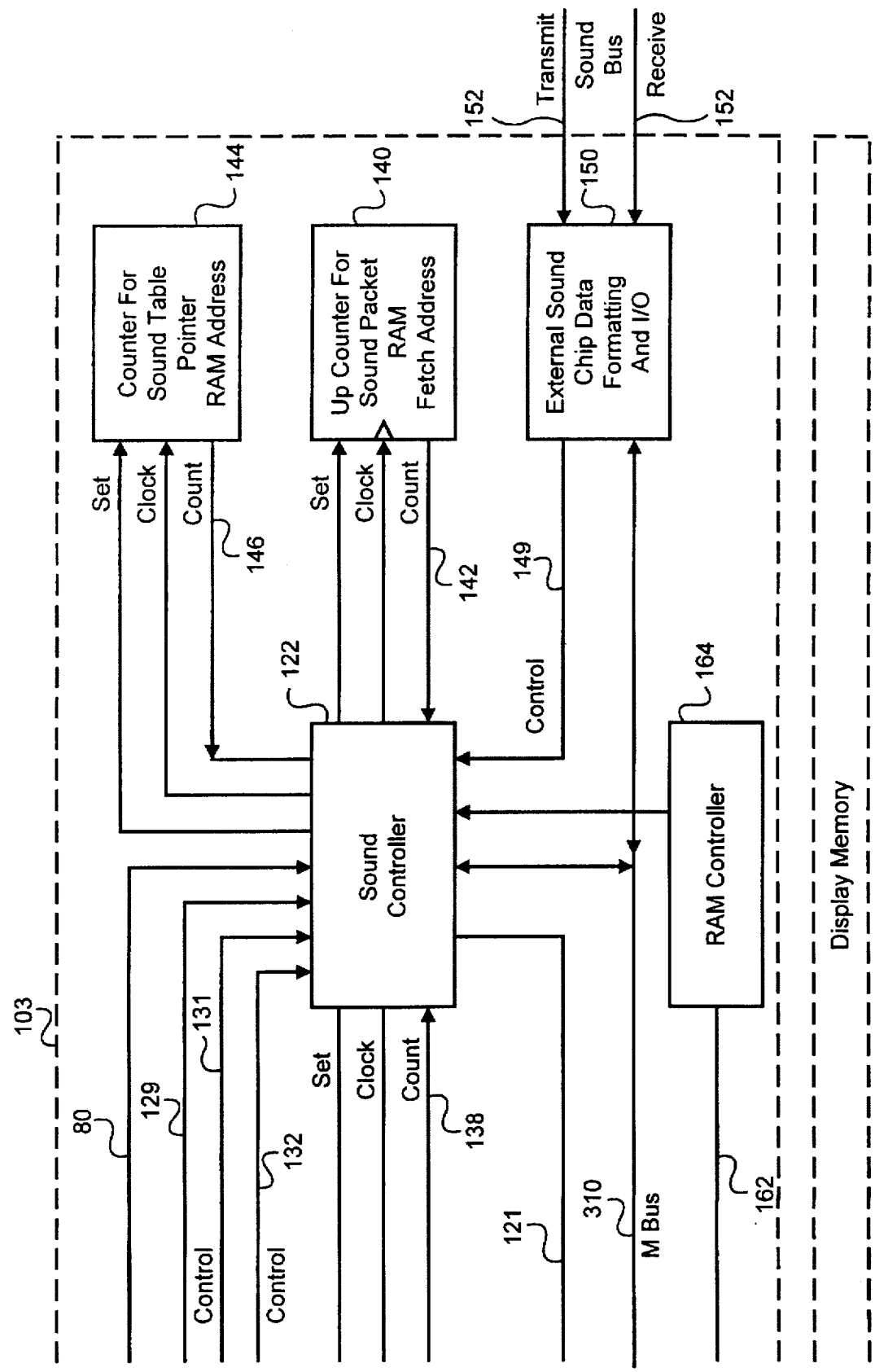

FIGS. 8A and 8B collectively illustrate in additional detail portions of the Audio Module and the Media Stream Controller 58 used for sound processing in the first embodiment as well as the relationship of these portions to the display memory 88. In FIGS. 8A and 8B, the Media Stream Controller 58 is indicated as being enclosed within a rectangle 103 with broken lines. This rectangle may be considered to indicate an integrated circuit chip. An upwardly pointed arrow with a designation of "On Chip" indicates what is in the integrated circuit chip 103. A downwardly pointed arrow with the designation "Off Chip" indicates what is off the integrated circuit chip 103.

A bus interface and FIFO 110 shown in FIG. 8A comprises part of the Main Bus Interface 300 shown in FIG. 3. The FIFO may be formed from a series (e.g., 4) of registers-in a first in—first out relationship. The FIFO 110 may be included in a system for providing commands to the display memory 88. Such a system is disclosed and claimed in copending application Ser. No. 08/337,939 filed on Nov. 10, 1994 in the names of David C. Baker and Michael D. Asal as joint inventors, titled "System for, and Method of, Processing in Hardware Commands Received from Software Without Polling of the Hardware by the Software", assigned of record to the assignee of record of this application, and incorporated herein by reference. The bus interface and FIFO 110 receives from the high speed I/O bus 54 the samples (which may be Dwords, words, or bytes) of sound data in a packet.

The bus interface and FIFO 110 may operate in time synchronization with a bus FIFO controller 112. The data may be moved into the bus interface and FIFO 110 by an input clock on a line 114 and may be moved out of the bus interface and FIFO by an output clock on a line 116. The bus interface FIFO controller 112 receives from the high speed I/O bus 54 the addresses relating to the words of the sound information in a packet. The bus interface FIFO controller provides an output on a CPU ready line 118 when the registers in the bus interface and FIFO 110 are full.

The output from the bus interface and FIFO 110 is introduced through the HBus 302 to the movable-arm of a switch 120. Although the switch 120 is shown as being a mechanical switch, it is preferably a CMOS bus switch. The switch 120 (FIG. 8A) also receives an input through a bus 121 from a sound controller 122 (FIG. 8B). The output of the switch 120 and the output of a frame buffer memory aperture controller 124 are connected through the MBus 310 to a display memory controller 312 (FIG. 8A) which is disposed within the integrated circuit chip 103. An input terminal of the frame buffer memory aperture controller 124 receives the output of the bus interface and FIFO 110 through the HBus 302. Another input of the frame buffer memory aperture controller 124 also receives an input from the output of the bus interface FIFO controller 112 on line 163. The bus switch 120 and frame buffer memory aperture controller 124 comprise part of the Media Buffer Access Controller 308 shown in FIG. 3.

Sound registers 128 also receive the output from the bus interface and FIFO 110 through the HBus 302. The sound registers 128 make up part of the Audio Module 306 and may include, but are not limited to, the registers listed in Table 1. Several registers corresponding to those described previously are also separately designated as ARR 128a, ACR 128b, ACS 128c, ARS 128d, ADCR 128e, and AIR 128f. These registers correspond to the Audio Read Register (ARR) 128a, Audio Command Register (ACR) 128b, Audio Command Status register (ACS) 128c, Audio Read Status register (ARS) 128d, Audio DMA Control Register (ADCR) 128e, and Audio Interrupt Register (AIR) 128f and have the structure and function described previously. As described previously, the ARR 128a and the ACR 128b may have both a non-local portion accessible to a software application in a conventional manner and a local portion which is used primarily for communicating with the AISR. The output from the sound registers 128 passes through a bus 129 to the sound controller 122 (FIG. 8B) which also makes up part of the Audio Module 306. The sound controller 122 is also coupled through a bus 131 to a sound register controller 130 (FIG. 8A) which provides an input to, and receives an output from, the sound registers 128.

The sound controller 122 (FIG. 8B) has a number of connections to a down counter 136 (FIG. 8A) for the sound packet length. A set line extends from the sound controller 122 to the down counter 136 to decrease the count in the down counter by an integer when a signal is provided on the set line. This down count is synchronized with a clock signal on a clock line. An indication of the count in the down counter 136 is provided to the sound controller on a line 138. The down counter 136 is used to determine when a block of data from the Audio Buffer 100 has finished being transferred. The size of each block of data is loaded into the down counter 136 from the Audio Structures in the Audio Buffer 100. As sound words are transferred to the Sound Integrated Circuit 70, the down counter is decreased. When the down counter 136 reaches 0, the sound controller 122 generates an interrupt on line 80 to activate the AISR and starts processing data for the next Audio Structure.

The sound controller 122 (FIG. 8B) also has a number of connections to an up counter 140 for a sound packet RAM fetch address. The up counter 140 is used to count through and consecutively access the words of sound data in the Play/Record buffers 528 and 530 of the Audio Buffer 100. A signal passes through a set line from the sound controller 122 to the up counter 140 to increase by an integer the address in the up counter 140 which is used to access data in the Play/Record buffers 528 and 530 of the Audio Buffer 100. These increases in the up counter 140 are synchronized with a clock signal from the sound controller 122. The up counter 140 outputs its count to the sound controller 122 through a line 142.

Another counter 144 (designated as a counter for a sound table pointer address) has interconnections with the sound controller 122. Signals pass through a set line from the sound controller 122 to the counter 144 in synchronization with a clock signal on a clock line. The counter 144 outputs its count to the sound controller 122 through a line 146. The counter 144 is used to count through the Audio Structures in the Audio Buffer 100. When the down counter 136 indicates that the current block has been transferred, the counter 144 jumps to the next Audio Structure (provided more data remains to be transferred). The length of the block for that Audio Structure is then placed in the down counter 136 and data transfer continues. In the meantime, the AISR may transfer data to or from the half of the Play/Record buffer 528 or 530 that is not being addressed by the counters. Thus, half of the Play/Record buffer is being used to transfer data to or from the Sound Integrated Circuit 70 under the control of the Sound Controller 122 and its various counters (all of which make up part of the Audio Module 306), while the other half of the Play/Record buffer is used to transfer data to or from main memory 12 under the control of the AISR 404.

Control signals extend through a line 149 between the sound controller 122 and an external sound chip data formatting and I/O block 150. The data formatting and I/O block 150 is also connected to the MBus 310. A sound bus 152 is connected to the data formatting and I/O block 150 to transmit or receive sound information. The data formatting and I/O block 150 use the format information stored in the Audio Structures to format the data for the Sound Integrated Circuit 70 before it is sent to be played. A standard AES/EBU formatting may be used. The data formatting and I/O block 150 also converts recorded data received from the Sound Integrated Circuit 70 into the appropriate format before it is placed in the Audio Buffer 100.

A plurality of outputs are provided from the display memory controller 312 (FIG. 8A) to the display memory 88. One of these outputs is coupled to a bus 156 for transferring words of sound data into the display memory 88. Another of these outputs is provided on a bus 158 to indicate addresses. A third of these outputs is provided on a bus 160 to provide control information. The display memory controller 312 receives signals on a bus 162 from a RAM controller 164 (FIG. 8B) which is disposed on the chip 103. The controller 164 has a common connection with the MBus 310 and with the sound controller 122.

When sound data is transferred between the main memory and the Audio Buffer 100, it passes through the bus interface and FIFO 110, the switch 120, and the display memory controller 312.

The bus interface FIFO controller 112 (FIG. 8A) receives from the high speed I/O bus 54 the addresses (24 bits wide) relating to the words of the sound information or data in a packet. These words of sound information or data (32 bits wide) pass into the bus interface and FIFO 110 from the high speed I/O bus 54 in synchronization with a clock signal (with a suitable frequency such as 33 megahertz) on the line 114 from the bus interface FIFO controller 112. After passing through the bus interface and FIFO 110 (a depth of 4 words), the words of the sound information or data in the packet pass to the switch 120.

The switch 120 (FIG. 8A) is normally in the open state. When the frame buffer memory aperture controller 124 receives a command through the bus 163 from the bus interface and FIFO controller 112 that the words of the sound information in a packet are being provided, the controller 124 causes the switch 120 to become closed. The words of the sound information or data in the packet then pass from the bus interface and FIFO 110 through the switch 120, the MBus 310 and the display memory controller 312 to the display memory 88 for recording in the Audio Buffer 100. The operation of the display memory controller 312 in passing such words of sound data in the packet for recording in the display memory 88 is controlled by the RAM controller 164 (FIG. 8B).

As previously described, the bus interface and FIFO 110 (FIG. 8A) has a limited depth, such as four (4) words. Ordinarily, the words of the sound information pass through the bus interface and FIFO 110 at such a rate that the interface and FIFO is not completely full. It may occasionally happen, however, that the interface and FIFO 110 becomes full. When this occurs, the bus interface FIFO controller 112 produces a low voltage on the CPU ready line 118 in FIG. 8A. This prevents the CPU main memory 12 in FIG. 2 from passing any sound words through the high speed I/O bus 54 (FIGS. 2 and 8A) to the bus interface and FIFO 110 (FIG. 8A) until the bus interface and FIFO becomes at least partially empty. However, the bus interface and FIFO 110 becomes almost instantaneously partially empty because of the rapid transfer of the sound packets from the interface and FIFO to the display memory 88.

When sound data is transferred between the Audio Buffer 100 and the Sound Integrated Circuit 70, it passes through the display memory controller 312 and the data formatting and I/O block 150. The formatting and control information in the Audio Structure is pointed to by the sound table pointer address counter 144. In addition, this Audio Structure determines whether sound data is processed from the first half of the buffer for Play/Record 528 (in FIG. 5) or the second half of the buffer for Play/Record 530 (in FIG. 5). For DMA play mode commands, the sound table pointer address counter 144 will count consecutively through the five (5) Play Audio Structures 504–512 (in FIG. 5) until the entire sound packet has been played. For DMA record mode commands, the sound table pointer address counter 144 will count consecutively through the five (5) Record Audio Structures 514–522 until the entire sound packet has been recorded.

While processing an individual block of sound data, the offset into the appropriate half of the Play/Record buffer 528 or 530 for an individual sound word is determined by the up counter 140. The up counter 140 counts through consecutive words in the Play/Record buffer 528 or 530 until the entire block of data has been processed.

The down counter 136 determines when a block of data has finished being processed. The down counter 136 is initially loaded with the size of the block which is stored in the Audio Structure. At each individual sound word, the down counter 136 is decremented. When it reaches zero (0) the entire block has been transferred. At this time, the sound table pointer address counter 144 is incremented to point to the next Audio Structure and the up counter 140 for the sound packet RAM fetch address is reset. The length of the new block is loaded from the Audio Structure into the down counter 136 and processing begins for the new block of sound data. In addition, the sound controller 122 generates an interrupt request for the AISR, since a block of data has been processed. For DMA mode play, the AISR may move a new block into the half of the Play/Record buffer 528 or 530 that was just emptied. For DMA mode record, the AISR may transfer the recorded block out of the half of the Play/Record buffer 528 or 530 that was just filled. As discussed previously, this process continues until the entire sound packet has been processed.

The system shown in FIGS. 8A and 8B has certain advantages when used as part of the Media Stream Controller 58 in the system shown in FIG. 2. One advantage is that it is disposed on the integrated circuit chip 103. Another advantage is that it causes the Media Stream Controller 58 to be compatible with the system of the prior art as shown in FIG. 1. This is desirable, for example, to prevent all of the video games and other software applications written for the system of FIG. 1 from becoming obsolete. This compatibility is established since a software application can still initiate a transfer by sending an indication to the DMA controller 16 in FIG. 2 of the number of words to be recorded in a packet in the display memory 88. Then the AISR can return to reset the count in the DMA controller after the transfer of such words to the display memory and the recovery of such words from the display memory for playing or recording sound. In an alternative embodiment, the AISR may reduce the count in the DMA controller at a desired resolution during the transfer of sound data. Using such a technique would cause the count in the DMA controller to more accurately reflect the amount of data that has been transferred at any given time.

The system shown in FIGS. 8A and 8B is also advantageous because it provides for a transfer of the words of the sound information in a block into the display memory 88 at a relatively rapid rate. This occurs at the same time that the words previously recorded in the display memory 88 in another block are being processed at a substantially constant rate (consistent with the production of optimal sound) to recover the sound represented in such words. Furthermore, by transferring the words of the sound data or information into an individual portion of the audio buffer 100 at a rapid rate, the high speed bus 54 and local bus 20 become available to process other commands while the words of the sound information in the other portion of the audio buffer is still being converted to sound. This also frees up bus bandwidth for other uses such as graphics and video.

Another advantage of the invention is that the words of sound information are stored in display memory 88. The display memory has a large storage capacity. Relatively little capacity is lost by providing a small portion of the display memory 88 for the storage of the words of sound information. Furthermore, the storage of the words of sound information is only temporary since the stored words are processed to recover the sound represented by the indications in such packets.

The temporary storage of the words of sound information in the Audio Buffer 100 of the display memory 88 offers other advantages, particularly since commands and graphics and video information are also stored in the display memory 88. This reduces considerably the number of memories used in the system incorporating this invention. Since memories are relatively expensive, the cost of the system of this invention is considerably reduced compared to the systems of the prior art.

The foregoing description is presented to enable any person skilled in the art to make and use the invention. Descriptions of specific designs are provided only as examples. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

For instance, the system of passive and active commands described above may be used to process sound mixer commands or other commands using an interrupt service routine even when DMA mode data transfer is not desired. By using an ISR for command processing, the hardware may be kept relatively simple and inexpensive. In addition, a similar system may be used for non-sound command processing.

In addition, a buffer other than the VRAM of a display memory may be provided for storing sound words. This may allow a sound system according to the present invention to be developed independently of the graphics and video systems in cases where that may be desirable.

It will also be realized that the techniques of the present invention are broadly applicable and are not limited to any particular bus systems or computer architectures. Aspects of the present invention may be applicable any time it is desirable to support a bus device on a second bus having a second mode of data transfer in a manner compatible with a first bus having a first mode of data transfer.

In addition, the techniques of data transfer, command processing, and double buffering may be applied in numerous situations even where backwards compatibility is not a concern.

While this invention has been described and illustrated with reference to particular embodiments, it will be readily apparent to those skilled in the art that the scope of the present invention is not limited to the disclosed embodiments but, on the contrary, is intended to cover numerous other modifications and equivalent arrangements which are included within the spirit and scope of the following claims.

Attorney Docket No. 11543.701

Appendix A
Computer Program Listing
for Exemplary AISR

PATENT
Attorney Docket No. 11543.701
Inventors: Paul B. Wood; Marc M. Stimak

```
            PAGE 58,132
DMAPROBLEM    equ    1         ; code to get around which DMA channel
ZERODMA1      equ    1         ; set DMA counter after processing int
;COM1         equ    1         ; if defined COM1 else COM2
SIMULATE      equ    1         ; if defined ...for tests with IOTRAP2.exe
;USETABLE     equ    1         ; use table lookup for clk div rather than
                               ; code
                               ; table takes 400 plus bytes extra
;HWFILTER     equ    1         ; read reg for filter else command line
NEWSCTFIND    equ    1         ; find SCT area using config reg
;USESTACK     equ    1         ; for having our own stack..not for BIOS
;SBS_INT      equ    1         ; if secondary audio interrupt expected
IFDEF SIMULATE
RSB_PORTC     equ    024ch
RSB_PORT4     equ    0244h
RSB_INT       equ    7         ,    IRQ=7
ENDIF ;-------------------->SIMULATE TITLE BTSR2.ASM
;****************************************************************
*
;
;   Title:    BTSR2.ASM
;
;   Version:  1.00
;
;
;       This TSR will serve as the interrupt handler for the Audio Module.
;
;       At initialization, a call is made to the 2fh interrupt handler
;       to see if we are installed already. If we are not installed,the
;       Int 2fh interrupt handler is hooked.  The user will enter up to
;       five parameters listed below:
;
;                 SBIO=xxx    where xxx is the hex base IO for the virtual
;                             sound board
;                 SBIRQ=nn    where nn is the decimal IRQ for the virtual
;                             sound board
;                 SBDMA=n     where n is the decimal dma for the virtual
;                             sound board
;                 FILTER=nnn  where nnn is the filter value to be used
;                             for the Audio System
;                 VGAIRQ=nn   where nn is the decimal IRQ for the Audio Module
;
;       After processing the above command line, the 2fh interrupt handler
;       and the VGA interrupt handler is chained.  The TSR then
;       terminates with a DOS terminate and stay resident call.
;
;****************************************************************
*
;                         M A C R O S
;****************************************************************
*
```

Attorney Docket No. 11543.701

```
;-----------------------------------------------------------------------
; This macro builds the audio structures to be loaded into VRAM
;-----------------------------------------------------------------------
        ABuf    macro   ABname,DW1top2,DW1bot2,DW1top1,DW2bot3
        ABname: dd      ((DW1top2+AS_ID) shl 16)+DW1bot2
                dd      ((DW2top1) shl 24)+((DW2bot3-ABbegin) shr 2)
                endm
;-----------------------------------------------------------------------
; This macro is used to output a message during initialization
;-----------------------------------------------------------------------
        OUTMSG  macro   MsgOffset
                mov     si, offset MsgOffset
                call    OutputMsg
                endm
        IFDEF SIMULATE
;-----------------------------------------------------------------------
; These macros are to output test/debug data to another PC via COM1
;-----------------------------------------------------------------------
        DEBUG   macro   Data
                push    eax
                mov     al,Data
                call    Out_Val
                pop     eax
                endm
        DEBUG2  macro   Data
                push    eax
                mov     ax,Data
                xchg    al,ah
                call    Out_Val
                xchg    al,ah
                call    Out_Val
                pop     eax
                endm
        DEBUGR  macro   reg,smallreg
                push    eax
                IFIDNI  <reg>,<AX>
                ELSE
                mov     ax,reg
                ENDIF
                call    Reg_Hex
                IFB     <smallreg>
                mov     al,cs:HexVal+3
                call    Out_Val
                mov     al,cs:HexVal+2
                call    Out_Val
                ENDIF
                mov     al,cs:HexVal+1
                call    Out_Val
                mov     al,cs:HexVal
                call    Out_Val
                pop     eax
                endm
        ELSE    ;---------------------->NOT SIMULATE
;-----------------------------------------------------------------------
; These macros are the dummies for NON-simulated mode of operation
;-----------------------------------------------------------------------
        DEBUG   macro   Data
                endm
        DEBUG2  macro   Data
                endm
        DEBUGR  macro   reg,smallreg
                endm
        ENDIF   ;---------------------->SIMULATE
```

H:\HOME\MM6\BRKTREE\701\BRKTREE.R4(5P1)

Attorney Docket No. 11543.701

```
;*********************************************************************
;    BEGINNING OF CODE and DATA....jump around data
;*********************************************************************
         .386
         ASSUME CS:CODE,DS:CODE
CODE     SEGMENT USE16
BeginC   equ    $                         ; begin of code to save
;*********************************************************************
;    STRUCTURES
;*********************************************************************
;*********************************************************************
;    EQUs for audio structure
;*********************************************************************
;---------------------------------------------------------------------
; Equates for high word of 1st dword of Audio structure
;---------------------------------------------------------------------
AS_LAST      equ   (1 shl 15)        ; Last of structures
AS_INT       equ   (1 shl 14)        ; Interrupt after numb samples
AS_MUTE      equ   (1 shl 9)         ; Silence
AS_STEREO    equ   (0 shl 7)         ; stereo
AS_LMONO     equ   (1 shl 7)         ; left mono
AS_RMONO     equ   (2 shl 7)         ; right mono
AS_BMONO     equ   (3 shl 7)         ; right mono
AS_ID        equ   (1 shl 3)         ; Structure ID
AS_MODEMASK  equ   0FE7Fh            ; to mask out mode
AS_MUTEMASK  equ   not AS_MUTE       ; to mask out silence bit
;---------------------------------------------------------------------
; Equates relative to top byte of 2nd dword of Audio structure
;---------------------------------------------------------------------
AS_REF       equ   (1 shl 4)         ; ADPCM with ref byte
AS_16BIT     equ   (0 shl 1)         ; 16 bit PCM
AS_8BIT      equ   (1 shl 1)         ; 8 bit PCM
AS_4BIT      equ   (5 shl 1)         ; 4 bit ADPCM
AS_3BIT      equ   (6 shl 1)         ; really 2.6 bit ADPCM
AS_2BIT      equ   (7 shl 1)         ; 2 bit ADPCM
AS_PLAY      equ   1                 ; play
AS_REC       equ   0                 ; record
;---------------------------------------------------------------------
; working copy of audio structures for VRAM audio buffer
; ABuf macro generates the Audio Structure Dword 1/2
; NOTE: 1) these must stay in this order or changes to CheckSig must be made
;       2) five audio structures for buffered play/record  are needed
;          (nine would be required for 16k of audio vram)
;---------------------------------------------------------------------
;    DWORDS at start of 32k of audio buffer are audio structures below:
;          (NOTE: RECORD1..5 is similar to PLAY1..5 below)
; dword
;  0000  ┌─────────────────────────────────┐
;        │ DIRECT PLAY AUDIO STRUCTURE     │
;  0002  ├─────────────────────────────────┤
;        │ DIRECT RECORD AUDIO STRUCTURE   │
;  0004  ├─────────────────────────────────┤
;        │ PLAY 1 OF 5 AUDIO STRUCTURE     │
;  0006  ├─────────────────────────────────┤
;        │ PLAY 2 OF 5 AUDIO STRUCTURE     │
;  0008  ├─────────────────────────────────┤
;        │ PLAY 3 OF 5 AUDIO STRUCTURE     │
;  000A  ├─────────────────────────────────┤
;        │ PLAY 4 OF 5 AUDIO STRUCTURE     │
;  000C  ├─────────────────────────────────┤
;        │ PLAY 5 OF 5 AUDIO STRUCTURE     │
;  000E  └─────────────────────────────────┘
```

H:\HOME\MM6\BRKTREE\701\BRKTREE.R4(5P1)

Attorney Docket No. 11543.701

```
;            ┌──────────────────────────────────────┐
;     0010   │ RECORD 1 OF 5 AUDIO STRUCTURE        │
;            ├──────────────────────────────────────┤
;     0012   │ RECORD 2 OF 5 AUDIO STRUCTURE        │
;            ├──────────────────────────────────────┤
;     0014   │ RECORD 3 OF 5 AUDIO STRUCTURE        │
;            ├──────────────────────────────────────┤
;     0016   │ RECORD 4 OF 5 AUDIO STRUCTURE        │
;            ├──────────────────────────────────────┤
;     0018   │ RECORD 5 OF 5 AUDIO STRUCTURE        │
;            ├──────────────────────────────────────┤
;     001A   │ reserved                             │
;            ├──────────────────────────────────────┤
;     001C   │ reserved                             │
;            ├──────────────────────────────────────┤
;     001E   │ buffer for direct play (8 bytes)     │  <-
;            ├──────────────────────────────────────┤
;     0020   │ buffer for direct record (8 bytes)   │  <-
;            ├──────────────────────────────────────┤
;            │ start of buffer for record/play 1st half │  <-
;            │                                      │  <-
;            │                                      │
;     1010   │ start of buffer for record/play 2nd half │  <-
;            │                                      │  <-
;            └──────────────────────────────────────┘
;-----------------------------------------------------------------
; See diagram below that represents the code below
;-----------------------------------------------------------------
ABbegin  label byte
    ABuf  DirPlay1,AS_LAST+AS_BMONO,1,AS_8BIT+AS_PLAY,BufDirPlay
    ABuf  DirRec1,AS_LAST+AS_INT+AS_BMONO,1,AS_8BIT+AS_REC,BufDirRec
    ABuf  Play1,AS_STEREO,ADBUF2,AS_PLAY,BufPlayRec
    ABuf  Play2,AS_STEREO,ADBUF2,AS_PLAY,BufPlayRec+ADBUF2
    ABuf  Play3,AS_STEREO,ADBUF2,AS_PLAY,BufPlayRec
    ABuf  Play4,AS_STEREO,ADBUF2,AS_PLAY,BufPlayRec+ADBUF2
    ABuf  Play5,AS_STEREO,ADBUF2,AS_PLAY,BufPlayRec
    ABuf  Rec1,AS_STEREO+AS_INT,ADBUF2,AS_REC,BufPlayRec
    ABuf  Rec2,AS_STEREO+AS_INT,ADBUF2,AS_REC,BufPlayRec+ADBUF2
    ABuf  Rec3,AS_STEREO+AS_INT,ADBUF2,AS_REC,BufPlayRec
    ABuf  Rec4,AS_STEREO+AS_INT,ADBUF2,AS_REC,BufPlayRec+ADBUF2
    ABuf  Rec5,AS_STEREO+AS_INT,ADBUF2,AS_REC,BufPlayRec
ABbegin2 label byte               ;
          dd    4   dup(0)        ; reserved
BufDirPlay dd   0                 ; buffer for direct play
          dd    0                 ; reserved
BufDirRec dd    0                 ; buffer for direct record
          dd    0                 ; reserved
ABend     label byte              ; end of structure and direct data
BufPlayRec label byte             ; buffer for play/record
ADBUF     equ   (08000h-(ABend-ABbegin)) ; size of remaining buffer
ADBUF2    equ   ADBUF shr 1       ; half of remaining buffer
AB_MASKADDR equ 0FFF01FFFh        ; mask out 32k part of addr
;-----------------------------------------------------------------
; Equates for Primary stream reg
;-----------------------------------------------------------------
AP1       equ   08000h            ; offset to start of audio regs
LAsbPadr  equ   dword ptr es:[10h shl 2+AP1]; Legacy audio Primary stream addr
PRI_ST_GO equ   (1 shl 31)        ; primary stream enable
PRI_ST_STOP equ (1 shl 30)        ; primary stream pause
PRI_ST_ECTR equ (1 shl 29)        ; primary stream enable counter
```

H:\HOME\MM6\BRKTREE\701\BRKTREE.R4(5P1)

Attorney Docket No. 11543.701

```
     LAsbPctl equ byte ptr es:[10h shl 2+3+AP1]; Legacy audio Primary stream
                                               ; control
     PRI_ST_ENABLE equ (1 shl 7)               ; primary stream enable
     PRI_ST_PAUSE  equ (1 shl 6)               ; primary stream pause
5    PRI_ST_ENCNT  equ (1 shl 5)               ; primary stream cntr enable
     LAsbPbc equ byte ptr es:[11h shl 2+3+AP1]; Legacy Primary stream buffer
                                               ; counter
     ;---------------------------------------------------------------------
     ; working copy of Primary Stream regs
10   ;---------------------------------------------------------------------
     AR_DirPlay  dd   PRI_ST_GO+PRI_ST_ECTR+(DirPlay1-ABbegin)
     AR_DirRec   dd   PRI_ST_GO+PRI_ST_ECTR+(DirRec1-ABbegin)
     AR_Play     dd   PRI_ST_GO+PRI_ST_ECTR+(Play1-ABbegin)
     AR_Rec      dd   PRI_ST_GO+PRI_ST_ECTR+(Rec1-ABbegin)
15   AR_MASKADDR equ  0FF007FFFh               ; mask out 32k part of addr
     ;*********************************************************************
     ;    more EQUs and data
     ;*********************************************************************
     BTSR_ID    equ   0CE01h                   ; ID for int 2fh handler
20
     VGA_SEQ    equ   03c4h                    ; VGA_SEQ index reg/data
     VGA_GRP    equ   03ceh                    ; VGA_GRP index reg/data ;---------------------------------------------------------------------
25   ; EQUs for data in the top 128 bytes of VRAM
     ;---------------------------------------------------------------------
     SCT_Sig      equ   es:[07F80h]            ; 1st 8 bytes of SCT area
     Signature    db    'BTVBDA',0,0           ; the signature for SCT area
     SCT_ABaddr   equ   dword ptr SCT_Sig+28h; address of audio buffer in bytes
30   SCT_ABlength equ   dword ptr SCT_Sig+2Ch; length of audio buffer in bytes
     SCT_VSBIO    equ   word ptr SCT_Sig+32h  ; Virtual sound board IO port
     SCT_VSBIRQ   equ   byte ptr SCT_Sig+30h  ; Virtual sound board IRQ
     SCT_VSBDMA   equ   byte ptr SCT_Sig+31h  ; Virtual sound board DMA
     SCT_VGAIRQ   equ   byte ptr SCT_Sig+34h  ; Vga IRQ
35   SCT_FILTER   equ   byte ptr SCT_Sig+35h  ; filter divisor (=50 or 100)

ABaddr4   dd   0                         ; address of audio buffer in dwords
     ABaddr    dd   0                         ; address of audio buffer in bytes
     ABlength  dd   0                         ; length of audio buffer in bytes
40   ABgui     db   0                         ; audio buffer GUI aperture 0A000h IFDEF  NEWSCTFIND
     VRAMaddr  db   1fh,3fh,5fh,7fh           ; 32k slot containing SCT (1,2,3,4meg)
     ENDIF
45
     IFDEF  SIMULATE
     VGASEGA   dw   0                         ; simulation seg for fake aper 0
     SIM_page  db   0                         ; simulation page for dma
     SIM_ofs   dw   0                         ; simulation offset for dma
50   LastPR    db   0                         ; last play record command
     LastLEN   dw   0                         ; length to play
     NextReadA db   0                         ; next read from 2xA for direct record
     HEX_TAB   db   '0123456789ABCDEF'        ; convert from decimal to hex
     HexVal    db   '????'                    ; converted hex to ascii
55   ELSE  ;---------------------->NOT SIMULATE
     VGASEGA   equ  0a000h                    ; VGA physical segment...audio regs
     ENDIF ;---------------------->SIMULATE
     ;---------------------------------------------------------------------
     ; used at initialization only
60   ;---------------------------------------------------------------------
     LAsbCMIX equ   word ptr es:[31h shl 2+2+AP1]; Legacy Audio Mix att./mux sel
     INIT_CMIX equ  0241Fh                    ; Initial values
                                              ; Mux Sel=Microphone/mix mute
```

-42-

Attorney Docket No. 11543.701

```
                                                       ; Mixer Atten= 0db
;-----------------------------------------------------------------------
; used to determine what interrupt occurred
;-----------------------------------------------------------------------
LAsbInt   equ   byte ptr es:[0h shl 2+AP1]; Legacy Audio interrupt status reg
INT_SBC   equ   080h                       ; command int
INT_SBM   equ   040h                       ; mixer command int
INT_SBP   equ   020h                       ; primary audio int
INT_SBS   equ   010h                       ; secondary audio int
;-----------------------------------------------------------------------
; used with Halt/Continue DMA commands
;-----------------------------------------------------------------------
; used to determine what passive and other actions took place
;-----------------------------------------------------------------------
LAsbCMD      equ   es:[21h shl 2+AP1]    ; Legacy audio command register
CMD_WarmReset equ  1                     ; Audio reset via 2x6 cmds?
CMD_AIDreset equ   2                     ; AID DMA reset via cmd DAh?
CMD_AIDack   equ   4                     ; AID occurred via read to 2xE?
CMD_BADcmd   equ   8                     ; Unknown command to 2xC?
CMD_LARRx    equ   30h                   ; mask to get index LAsbDMA   equ   es:[24h shl 2+AP1]       ; Legacy audio DMA control register
;-----------------------------------------------------------------------
; used to map time constant to Media Stream Controller clock
;-----------------------------------------------------------------------
LAsbClk   equ   word ptr es:[30h shl 2+AP1] ; Legacy audio clock divisor
SEL17MASK equ   01FFFh                     ; mask out selclk17
Filter50  db    50 shl 1                   ; Filter50 =50 or 100 for on
LAsbFClk  equ   byte ptr es:[30h shl 2+AP1+2]; Legacy audio clock divisor
;-----------------------------------------------------------------------
; used to put in a response data in 2xA reg
;-----------------------------------------------------------------------
LAsbRR    equ   byte ptr es:[022h shl 2+AP1]; Legacy audio read register
SBIRQSET  equ   4                         ; says I have done a sound board IRQ
;***********************************************************************
; DATA (contained in code segment)
;***********************************************************************
;-----------------------------------------------------------------------
; vector addresses and critical save area
;-----------------------------------------------------------------------
IFDEF USESTACK
SaveSS   dw   0                     ; old stack seg at Interrupt
SaveSP   dw   0                     ; old stack ptr at Interrupt
SaveEAX  dd   0                     ; old eax reg
ENDIF ;----------------------->USESTACK
OldBT    dd   0                     ; next Media Stream Controller
                                    ; interrupt routine
VirSB    dd   0                     ; next virtual sound board interrupt
                                    ; routine
Old2F    dd   0                     ; next 2f interrupt routine IFDEF SIMULATE
BT_Int   db   0FEh                  ; Media Stream Controller int vect for
                                    ; simulation
BT_Irq   db   5                     ; real sound board IRQ for sim
VSB_Int  db   0Dh                   ; virtual sound board int vect (IRQ5=
                                    ; default)
VSB_Vect dd   (0Dh shl 2)           ; virtual sound board int vect addr
                                    ; (IRQ5= def)
ELSE ;----------------------->NOT SIMULATE
```

Attorney Docket No. 11543.701

```
         BT_Int     db    71h              ; Media Stream Controller int vect
                                            ; (IRQ9=default)
         BT_Irq     db    9                ; Media Stream Controller IRQ
         VSB_Int    db    0fh              ; virtual sound board int vect (IRQ7=
                                            ; default)
         VSB_Vect   dd    (0fh shl 2)      ; virtual sound board int vect addr
                                            ; (IRQ7= def)
         ENDIF    ;--------------------->SIMULATE
         VSB_DMA    db    1                ; set to one...could be 1 or 3
         VSB_Port   dw    220h             ; set to 220h..could be 240h also
         VSB_Irq    db    7                ; virtual sound board IRQ
         SaveVGA    db    0                ; old VGA seq index reg value
                                            ; NOTE: this is reset by a DSP reset
         ;VGAisrSt  db    0                ; last VGA ISR status reg
;-----------------------------------------------------------------
; switch to say what to do during and at exit from interrupt routine
;-----------------------------------------------------------------
         SWitch     equ   bp               ; logic switches in register
         SWitchMem  dw    0                ; logic switches below in memory
         SW_INT     equ   0                ; bit 0  for doing sound board
                                            ; interrupt
         SW_AID_PLAY equ  1                ; bit 1  play in auto init DMA mode
         SW_AID_REC  equ  2                ; bit 2  record in auto init DMA mode
         SW_HSD      equ  3                ; bit 3  in High Speed DMA mode
         SW_TSR_BUSY equ  4                ; bit 4  if we are in TSR
         SW_RESET_MASK equ 0FFF1h          ; mask to reset bit 1..3
         SW_DMA_HALT equ  5                ; bit 5  DMA halted
         SW_DMA_PROG equ  6                ; bit 6  DMA is in progress
         SW_AID_RESET equ 7                ; bit 7  warm start is received
         SW_INIT_CARD equ 8                ; bit 8 for init of card
         SW_INIT_ADDR equ 9                ; bit 9 for finding Audio Buffer Addr
                                            ; NOTE: this is reset by a DSP reset
         SW_SILENCE  equ  10               ; bit 10 for Silence
         SW_INTF2    equ  11               ; bit 11 is set on F2 command
         SW_MUNGEFF  equ  12               ; bit 12 is flip/flop for E2 cmd
;-----------------------------------------------------------------
; current values in DMA reg (provided by call to GetDMA)
;-----------------------------------------------------------------
         DMAseg     dw    0                ; current DMA segment
         DMAoff     dw    0                ; current DMA offset pointer
         DMAoffx    dw    0                ; next DMA offset for move
         DMAcnt     dw    0                ; current DMA count (0 means 1 byte)
         CMDcnt     dd    0                ; count from command
         CMDcntx    dw    0                ; Amount of count left
;-----------------------------------------------------------------
; switches to only build Direct buffer once
;-----------------------------------------------------------------
         TypeInt    dw    0                ; set equs below
         DirectInt  equ   0                ; bit 0 interrupt from Direct
                                            ; record
         PlayLastInt equ  1                ; bit 1 interrupt from Single play
         PlayMultInt equ  2                ; bit 2 interrupt from Mult play
         RecLastInt  equ  3                ; bit 3 interrupt from Single
                                            ; record
         RecMultInt  equ  4                ; bit 4 interrupt from Mult record
         SilenceInt  equ  5                ; bit 5 interrupt from silence cmd
         F2int       equ  6                ; bit 6 interrupt from F2 cmd
;-----------------------------------------------------------------
; current values from Legacy audio DMA control register
;-----------------------------------------------------------------
         DMAconst   db    0                ; last DMA constant from 40h cmd
         DMAlen     dw    0                ; last DMA length from 48h command
         DMAflag    db    0                ; last DMA control flags
```

H:\HOME\MM6\BRKTREE\701\BRKTREE.R4(5P1)         -44-

Attorney Docket No. 11543.701

```
        RECMODE    equ   0              ; bit 0 is record mode 1=stereo,0=mono
        PLAYMODE   equ   1              ; bit 1 is play mode 1=stereo,0=mono UseCaseX   dw    0              ; which play/record processing to use
                                        ; =0,2,4,6,8
5       MultIntX   db    9              ; which of mult interrupts
        NumbStruc  db    0              ; number of structures used for P/R ;*******************************************************************
10      ;    RESIDENT DATA and EQUS for mixer
        ;*******************************************************************

LAsbPR    equ   word ptr es:[14h shl 2+AP1]  ; Legacy audio Primary left/right
                                                     ; atten
15      LAsbMix   equ   word ptr es:[23h shl 2+AP1]  ; Legacy audio mixer register
        LAsbCMUX  equ   byte ptr es:[31h shl 2+3+AP1]; Legacy audio CMUX selection
        LAsbCD    equ   word ptr es:[32h shl 2+AP1]  ; Legacy audio CD left/right atten
        LAsbLN    equ   word ptr es:[32h shl 2+2+AP1]; Legacy audio LiNe left/right
                                                     ; atten
20      LAsbFM    equ   word ptr es:[33h shl 2+AP1]  ; Legacy audio FM left/right atten
        LAsbMC    equ   word ptr es:[33h shl 2+2+AP1]; Legacy audio MiC left/right
                                                     ; atten
        LAsbMV    equ   word ptr es:[34h shl 2+AP1]  ; Legacy audio Dac left/right
                                                     ; atten
25      MIX_DIRTY equ   7                            ; dirty bit in mixer index CMUXmask  equ   0F8h                         ; mask out input source setting
        ; SB             MIC, CD,MIC,LIN
        CMUXtab   db    4,   1,  4,  2               ; LEGACY CMUX settings from sound
30                                                   ; board settings MixSw       db  0                ; Mixer switch (=0 lower,=2 upper)
        MixCmd1     dw  0                ; 1st Mixer command
        MixCmd2     dw  0                ; Possible 2nd Mixer command
35      OldMix28    db  0                ; Last output value to mix reg 28h
        OldLAsbCD   dw  0                ; Last output value to LAsbCD
        OldLAsbLN   dw  0                ; Last output value to LAsbLN
        OldLAsbPR   dw  0                ; value saved with Speaker=off
        OldLAsbCMD  dd  0                ; cmd reg saved
40
        IFDEF SIMULATE
        ;----------------------------------------------------------------
        ; Table to determine what action to take on a 2c cmd
        ;----------------------------------------------------------------
45      CmdLen2c  db    16 dup(0)
        ;
        ;10h,11h,12h,13h,14h,15h,16h,17h,18h,19h,1Ah,1Bh,1Ch,1Dh,1Eh,1Fh
                  db     2,  0,  0,  0,  3,  0,  3,  3,  0,  0,  0,  0,  2,  0,  0,  1
        ;
50      ;20h,21h,22h,23h,24h,25h,26h,27h,28h,29h,2Ah,2Bh,2Ch,2Dh,2Eh,2Fh
                  db     0,  0,  0,  0,  3,  0,  0,  0,  0,  0,  0,  0,  1,  0,  0,  0
                  db    16 dup(0)
        ;
        ;40h,41h,42h,43h,44h,45h,46h,47h,48h,49h,4Ah,4Bh,4Ch,4Dh,4Eh,4Fh
55                db     2,  0,  0,  0,  0,  0,  0,  0,  3,  0,  0,  0,  0,  0,  0,  0
                  db    2*16 dup(0)
        ;
        ;70h,71h,72h,73h,74h,75h,76h,77h,78h,79h,7Ah,7Bh,7Ch,7Dh,7Eh,7Fh
                  db     0,  0,  0,  0,  3,  3,  3,  3,  0,  0,  0,  0,  0,  1,  0,  1
60      ;
        ;80h,81h,82h,83h,84h,85h,86h,87h,88h,89h,8Ah,8Bh,8Ch,8Dh,8Eh,8Fh
                  db     3,  0,  0,  0,  0,  0,  0,  0,  0,  0,  0,  0,  0,  0,  0,  0
```

H:\HOME\MM6\BRKTREE\701\BRKTREE.R4(5P1)

-45-

Attorney Docket No. 11543.701

```
      ;
      ;90h,91h,92h,93h,94h,95h,96h,97h,98h,99h,9Ah,9Bh,9Ch,9Dh,9Eh,9Fh
            db    1,  1,  0,  0,  0,  0,  0,  0,  1,  1,  0,  0,  0,  0,  0,  0
      ;
 5    ;A0h,A1h,A2h,A3h,A4h,A5h,A6h,A7h,A8h,A9h,AAh,ABh,ACh,ADh,AEh,AFh
            db    0,  0,  0,  0,  0,  0,  0,  0,  0,  0,  0,  0,  0,  0,  0,  0
            db    2*16 dup(0)
      ;
      ;D0h,D1h,D2h,D3h,D4h,D5h,D6h,D7h,D8h,D9h,DAh,DBh,DCh,DDh,DEh,DFh
10          db    1,  1,  0,  1,  1,  0,  0,  0,  0,  0,  1,  0,  0,  0,  0,  0
      ;
      ;E0h,E1h,E2h,E3h,E4h,E5h,E6h,E7h,E8h,E9h,EAh,EBh,ECh,EDh,EEh,EFh
            db    0,  0,  2,  0,  0,  0,  0,  0,  0,  0,  0,  0,  0,  0,  0,  0
      ;
15    ;F0h,F1h,F2h,F3h,F4h,F5h,F6h,F7h,F8h,F9h,FAh,FBh,FCh,FDh,FEh,FFh
            db    0,  0,  1,  0,  0,  0,  0,  0,  0,  0,  0,  0,  0,  0,  0,  0
      ENDIF ;---------------------->SIMULATE
      IFDEF USESTACK
      ;-----------------------------------------------------------------------
20    ; Internal stack
      ;-----------------------------------------------------------------------
      stackbg LABEL WORD
      IFDEF SIMULATE
            db    8196 dup('.')
25    ELSE  ;---------------------->NOT SIMULATE
            db    256 dup('.')
      stacktp LABEL WORD
      ENDIF ;---------------------->SIMULATE
      ENDIF ;---------------------->USESTACK
30    ;@@@@@@@@@@@@@@@@@@@@@@@@@@@@@@@@@@@@@@@@@@@@@@@@@@@@@@@@@@@@@@@@@@@@@@@@
      ;-----------------------------------------------------------------------
      ; Interrupt service routine for interrupt 2f
      ;-----------------------------------------------------------------------
            PUBLIC BTSR2F
35    BTSR2F: cmp   ax,BTSR_ID              ; is this us calling us
              jne   short BTSR2Fa           ; no, see if it is a windows 2f for us
              xor   ax,ax                   ; yes, say we are loaded
              iret                          ; return
      BTSR2Fa: cmp  ax,01608h               ; is it a windows init complete
40            je    short BTSR2Fr           ; yes, go to common reset code
      BTSR2Fb: cmp  ax,01606h               ; is it a windows terminate
              jne   short BTSR2Fx           ; no, go to common exit
      BTSR2fr: btr  cs:SwitchMem,SW_INIT_ADDR; reset so we look for video buffer
      BTSR2Fx: jmp  dword ptr cs:[old2f]    ; go to next 2f int on chain
45    IFDEF NEWSCTFIND
      ;-----------------------------------------------------------------------
      ; Routine to check for the signature at top of VRAM to get address/length
      ; of audio buffer and update some virtual parameters
      ;-----------------------------------------------------------------------
50    CheckSig proc near                    ;
      CS01:   mov   ax,VGASEGA              ; get aperture 1 on 1st pass
              mov   es,ax                   ; and see if this is the SCT table
              mov   ecx,2                   ; number of dwords to compare
              mov   esi,offset Signature    ; get address of signature
55            lea   edi,SCT_Sig             ; offset to signature in SCT table
              repe  cmpsd                   ; see if they match
              je    short CS07              ; yes, got it
      CS06:   stc                           ; say unsuccessful
              ret                           ; return to user
60    ELSE  ;---------------------->NOT NEWSCTFIND
      ;-----------------------------------------------------------------------
      ; Routine to check for the signature at top of VRAM to get address/length
      ; of audio buffer and update some virtual parameters
```

Attorney Docket No. 11543.701

```
;----------------------------------------------------------------
        CheckSig proc    near                    ;
                xor     bx,bx                   ; offset into VGASEGA
        CS01:   mov     ax,VGASEGA              ; get aperture 1 on 1st pass
                add     ax,bx                   ;   and aperture 2 on 2nd pass
                mov     es,ax                   ; and see if this is the SCT table
                mov     ecx,2                   ; number of dwords to compare
                mov     esi,offset Signature    ; get address of signature
                lea     edi,SCT_Sig             ; offset to signature in SCT table
                repe    cmpsd                   ; see if they match
                je      short CS07              ; yes, got it
                or      bx,bx                   ; are we on 2nd pass
                jnz     short CS06              ; yes, go to unsuccessful exit
                add     bx,0800h                ; bump to next 32k chunk
                jmp     short CS01              ; and go see
        CS06:   stc                             ; say unsuccessful
                ret                             ; return to user
        ENDIF   ;---------------------->NOT NEWSCTFIND
;----------------------------------------------------------------
; Get the address and length of Audio buffer and check for goodness
;----------------------------------------------------------------
        CS07:   mov     eax,es:SCT_ABaddr       ; get audio buffer relative to 8meg
                cmp     eax,-1                  ; is there a buffer
                je      short CS06              ; yes, go to error exit
                mov     ABaddr,eax              ; save audio buffer addr rel to 8meg
                shr     eax,2                   ; make it dword relative
                mov     ABaddr4,eax             ; and save
                shr     eax,13                  ; get the GUI base rel to 8meg(32k)
                mov     ABgui,al                ; save for ORing
                mov     eax,es:SCT_ABlength     ; get length of audio buffer in bytes
                or      eax,eax                 ; is it zero
                jz      short CS06              ; yes, go to error exit
                cmp     eax,08000h              ; is it exactly 32k
                jne     short CS06              ; yes, go to error exit
                mov     ABlength,eax            ; save audio buffer length in bytes
;----------------------------------------------------------------
; Update the SCT with data from BTSR2 command line
;----------------------------------------------------------------
                mov     ax,VSB_Port             ; get virtual sound board io port
                mov     SCT_VSBIO,ax            ; save in SCT table
                mov     al,VSB_IRQ              ; get virtual sound board IRQ
                mov     SCT_VSBIRQ,al           ; save in SCT table
                mov     al,VSB_DMA              ; get virtual sound board DMA
                mov     SCT_VSBDMA,al           ; save in SCT table
                mov     al,BT_IRQ               ; get VGA or (real sound board irq)
                mov     SCT_VGAIRQ,al           ; save in SCT table
        IFDEF   HWFILTER
                mov     al,Filter50             ; get the filter divisor
                mov     SCT_FILTER,al           ; save in SCT table
        ENDIF
;----------------------------------------------------------------
; Update working copies of Audio regs that have address relative to VRAM
;----------------------------------------------------------------
                mov     ebx,ABaddr              ; get offset of audio buffer
                mov     edx,AR_MASKADDR         ; get the mask to get rid of 32k addr
                mov     eax,AR_DirPlay          ; get Pri Stream working copy
                and     eax,edx                 ; save all but 32k part of addr
                or      eax,ebx                 ; or in new addr
                mov     AR_DirPlay,eax          ; save new copy
                mov     eax,AR_DirRec           ; get Pri Stream working copy
                and     eax,edx                 ; save all but 32k part of addr
                or      eax,ebx                 ; or in new addr
                mov     AR_DirRec,eax           ; save new copy
```

H:\HOME\MM6\BRKTREE\701\BRKTREE.R4(5P1)

```
                mov     eax,AR_Play              ; get Pri Stream working copy
                and     eax,edx                  ; save all but 32k part of addr
                or      eax,ebx                  ; or in new addr
                mov     AR_Play,eax              ; save new copy
  5             mov     eax,AR_Rec               ; get Pri Stream working copy
                and     eax,edx                  ; save all but 32k part of addr
                or      eax,ebx                  ; or in new addr
                mov     AR_Rec,eax               ; save new copy
        ;----------------------------------------------------------------
 10     ; Reinitialize Audio structures in Audio Buffer and zero rest of buffer
        ;----------------------------------------------------------------
                mov     ebx,ABaddr4              ; get offset of audio buffer dword
                                                 ; based
                mov     edx,AB_MASKADDR          ; get the mask to get rid of 32k addr
 15             lea     esi,DirPlay1             ; get addr of 1st Dword in audio
                                                 ; struct
                xor     edi,edi                  ; point to beginning of buffer
                mov     ecx,(ABbegin2-ABbegin)/8 ; number of address to update
        CS08:   movsd                            ; move a dword 1 of struct to buffer
 20             lodsd                            ; get a 2nd dword of audio structure
                and     eax,edx                  ; mask out the 32k part of addr
                or      eax,ebx                  ; put in new addr
                stosd                            ; save in audio buffer
                loop    CS08                     ; any more to process
 25             xor     eax,eax                  ; zero for storing
        IFDEF SIMULATE
                mov     ecx,(08000h-(ABbegin2-ABbegin)-80h)/4; number of dwords to
                                                 ; zero
        ELSE    ;---------------------->NOT SIMULATE
 30             mov     ecx,(08000h-(ABbegin2-ABbegin))/4; number of dwords to zero
        ENDIF   ;---------------------->SIMULATE
                rep     stosd                    ; zero out the rest of 32k
                clc                              ; set for success
                ret                              ; return to caller
 35     CheckSig endp
        ;----------------------------------------------------------------
        ; Interrupt service routine
        ;----------------------------------------------------------------
        BTSR00: bts     cs:SwitchMem,SW_TSR_BUSY; are we already in TSR
 40             jnc     short BTSR01             ; no, start processing
        IFDEF SIMULATE
                iret
        ELSE    ;---------------------->NOT SIMULATE
                jmp     dword ptr cs:[OldBT]     ; go to next one on chain
 45     ENDIF   ;---------------------->SIMULATE
        BTSR01:
        IFDEF USESTACK
                mov     cs:SaveSS,ss             ; save stack seg
                mov     cs:SaveSP,sp             ; save stack ptr
 50             mov     cs:SaveEAX,eax           ; save eax which we need to use
                push    cs                       ; our stack is in CODE seg
                pop     ss                       ;
                mov     sp,offset stacktp        ; offset of our stack in CODE seg
        ENDIF   ;---------------------->USESTACK
                                                 ; save all regs
 55             pushad
                cld                              ; make sure we are decrmenting
                push    es                       ; save ES
                push    ds                       ; save DS
                push    cs                       ; make DS=CS
 60             pop     ds                       ;
                                                 ; NOTE: DS is always this
                                                 ; unless code temp saves/restores
                mov     bp,cs:SwitchMem          ; get main bank of switches
```

Attorney Docket No. 11543.701

```
           IFDEF   SIMULATE
                   push    ax                          ; save seg on 1st pass
                   cmp     BT_Int,0feh                 ; is this simulation
                   je      short BTSR01b               ; yes, skip EOI
 5         ENDIF   ;---------------------->SIMULATE
                   mov     al,20h                      ; no,
                   cmp     BT_Int,70h                  ; is it a 2nd level Int controller
                   jb      short BTSR01a               ; no
                   out     0A0h,al                     ; do non-specific EOI
10                 jmp     short BTSR01b               ; and continue
           BTSR01a: out    020h,al                     ; do non-specific EOI
           BTSR01b:
           IFDEF   SIMULATE
                   pop     ax                          ; restore seg on 1st pass
15                 cmp     VGASEGA,0                   ; have we got an got GUI apertures
                   je      short BTSR02                ; yes,
                   mov     ax,VGASEGA                  ; no, pick up from last call
                   mov     es,ax                       ;
                   jmp     short BTSR02b               ; and already initialized
20         BTSR02: mov     VGASEGA,ax                  ; 0A000h=audio buffer
                                                       ; 0A800h=audio regs
                   mov     es,ax                       ;
                   movzx   eax,VGASEGA                 ; put in eax with top zero
                   shl     eax,4                       ; make seg an address
25                 add     eax,(BufPlayRec-ABbegin);   offset to buffer in audio buffer
                   mov     SIM_ofs,ax                  ; simulatin offset for DMA
                   shr     eax,16                      ; get page
                   mov     SIM_page,al                 ; simulation page for DMA
           ;-----------------------------------------------------------------------------
30         ;  Get Audio buffer addr, initialize Audio structures, and update SCT table
           ;-----------------------------------------------------------------------------
                   bts     SWitch,SW_INIT_ADDR         ; have we got the latest audio addr
                   jc      short BTSR02b               ; yes
                   and     LAsbPctl,not PRI_ST_ENCNT;  reset primary cntr
35                 call    CheckSig                    ; go look up SCT table
           BTSR02b:
           ELSE    ;---------------------->NOT SIMULATE
                   mov     ax,VGASEGA                  ; get VGA space
                   mov     es,ax                       ; Note: ES is always this
40                                                     ; offset 0 is audio buffers
                                                       ; offset 08000h is audio regs
           ;-----------------------------------------------------------------------------
           ; preamble code for interfacing with Media Stream Controller in REAL mode
           ;-----------------------------------------------------------------------------
45                 mov     dx,VGA_SEQ                  ; get IO port for VGA sequencer regs
                   in      al,dx                       ;
                   mov     SaveVGA,al                  ; save VGA seq index at entry
                   mov     ax,01406h                   ; unlock VGA seq extension reg
                   out     dx,ax                       ;
50                 mov     dx,VGA_GRP                  ; get IO port for VGA group regs
                   bts     SWitch,SW_INIT_ADDR         ; have we got the latest audio addr
                   jc      short BTSR09                ; yes
           IFDEF   NEWSCTFIND
                   mov     al,045h                     ; get size of vram from config reg
55                 out     dx,al                       ;
                   inc     dx                          ;
                   in      al,dx                       ; get size
                   dec     dx                          ; set back to VGA group reg
                   and     al,3                        ; isolate VRAM size in lower 2 bits
60                 movzx   bx,al                       ; put in index reg
                   mov     ah,VRAMaddr[bx]             ; get 32k slot that contains SCT
           ;-----------------------------------------------------------------------------
           ;  Find address/length of audio buffers if in top of 1meg or 2meg region
```

Attorney Docket No. 11543.701

```
;  33222222 22221111 11111100 00000000
;  10987654 32109876 54321098 76543210
;
;  0000000                                = PM_BASE
;         0                               = PM_ENABLE
;          00                             = reserved
;            1                            = 32K_APERTURES
;             1                           = ENABLE_32K_APERTURES
;              0000 000000                = REAL MODE APERTURE 1 (A800H)
;                                           note:high 32k in 9 meg region
;                         01 00011111     = REAL MODE APERTURE 0 (A000H)   1meg
;                         01 00111111     = REAL MODE APERTURE 0 (A000H)   2meg
;                         01 01011111     = REAL MODE APERTURE 0 (A000H)   3meg
;                         01 01111111     = REAL MODE APERTURE 0 (A000H)   4meg
;                                           note:high 32k in 8 meg region
;   0   0   3   0    0   1    1   F       = hex nibbles for top 9/8 megs
;   23      22       21      20           = index into GUI base
;---------------------------------------------------------------------
BTSR03:  mov    al,020h         ; set VGA aperture 0 to A0000
         out    dx,ax           ;
         mov    ax,00121h       ; set VGA aperture 1 to A8000
         out    dx,ax           ;
         mov    ax,03022h       ; set 64k real mode enable bit
         out    dx,ax           ;
         mov    ax,00023h       ; set protected mode base to 0
         out    dx,ax           ;
         in     al,dx           ; propagate
         call   CheckSig        ; see if signature is there
         jnc    short BTSR09    ; yes
ELSE ;----------------------->NOT NEWSCTFIND
;---------------------------------------------------------------------
;  Find address/length of audio buffers if in top of 1meg or 2meg region
;
;  33222222 22221111 11111100 00000000
;  10987654 32109876 54321098 76543210
;
;  0000000                                = PM_BASE
;         0                               = PM_ENABLE
;          00                             = reserved
;            1                            = 32K_APERTURES
;             1                           = ENABLE_32K_APERTURES
;              0100 111111                = REAL MODE APERTURE 1 (A800H)
;                                           note:high 32k in 9 meg region
;                         01 00011111     = REAL MODE APERTURE 0 (A000H)
;                                           note:high 32k in 8 meg region
;   0   0   3   4    F   D    1   F       = hex nibbles for top 9/8 megs
;   23      22       21      20           = index into GUI base
;---------------------------------------------------------------------
BTSR03:  mov    ax,01F20h       ; set VGA aperture 0 to A0000
         out    dx,ax           ;
         mov    ax,0FD21h       ; set VGA aperture 1 to A8000
         out    dx,ax           ;
         mov    ax,03422h       ; set 64k real mode enable bit
         out    dx,ax           ;
         mov    ax,00023h       ; set protected mode base to 0
         out    dx,ax           ;
         in     al,dx           ; propagate
         call   CheckSig        ; see if signature is there
         jnc    short BTSR09    ; yes
;---------------------------------------------------------------------
;  Find address/length of audio buffers if in top of 4meg and 8meg region
;
```

H:\HOME\MM6\BRKTREE\701\BRKTREE.R4(5P1)

Attorney Docket No. 11543.701

```
; 33222222 22221111 11111100 00000000
; 10987654 32109876 54321098 76543210
;
; 0000000                                  = PM_BASE
;        0                                 = PM_ENABLE
;         00                               = reserved
;           1                              = 32K APERTURES
;            1                             = ENABLE_32K_APERTURES
;             0111 111111                  = REAL MODE APERTURE 1 (A800H)
;                                            note:high 32k in 8 meg region
;                        01 01111111       = REAL MODE APERTURE 0 (A000H)
;                                            note:high 32k in 4 meg region
;   0    0    3   7    F   D   7    F      = hex nibbles for top 9/8 megs
;   23        22       21      20          = index into GUI base
;------------------------------------------------------------
        mov     ax,07F20h        ; set VGA aperture 0 to A0000
        out     dx,ax            ;
        mov     ax,0FD21h        ; set VGA aperture 1 to A8000
        out     dx,ax            ;
        mov     ax,03722h        ; set 64k real mode enable bit
        out     dx,ax            ;
        mov     ax,00023h        ; set protected mode base to 0
        out     dx,ax            ;
        in      al,dx            ; propagate
        call    CheckSig         ; see if signature is there
        jnc     short BTSR09     ; yes
ENDIF ;-------------------->NOT NEWSCTFIND
;------------------------------------------------------------
; Error exit...could not find signature or audio buffer is illegal
;------------------------------------------------------------
BTSR06: btr     SWitch,SW_INIT_ADDR   ; reset so we look up next time
        int     3
        jmp     BTSR99           ; get out
;------------------------------------------------------------
;   GUI BASE setting
;
; 33222222 22221111 11111100 00000000
; 10987654 32109876 54321098 76543210
;
; 0000000                                  = PM_BASE
;        0                                 = PM_ENABLE
;         00                               = reserved
;           1                              = 32K APERTURES
;            1                             = ENABLE_32K_APERTURES
;             0010 100000                  = REAL MODE APERTURE 1 (A800H)
;                                            note:high 32k in 8 meg region
;                        01 00000000       = REAL MODE APERTURE 0 (A000H)
;                                            note:high 32k in 4 meg region
;   0    0    3   2    8   1   0    0      = hex nibbles for top 9/8 megs
;   23        22       21      20          = index into GUI base
;------------------------------------------------------------
BTSR09: mov     al,020h          ; set VGA aperture 0 to A0000
        mov     ah,ABgui         ; get base for audio buffers
        out     dx,ax            ;
        mov     ax,08121h        ; set VGA aperture 1 to A8000
        out     dx,ax            ;
        mov     ax,03222h        ; set 64k real mode enable bit
        out     dx,ax            ;
        mov     ax,00023h        ; set protected mode base to 0
        out     dx,ax            ;
        in      al,dx            ; propagate
ENDIF ;-------------------->SIMULATE
;------------------------------------------------------------
```

Attorney Docket No. 11543.701

```
;       initialization code (if any)
;-----------------------------------------------------------------------------
        debug '{'
        bts     SWitch,SW_INIT_CARD     ; is this the 1st pass
        jc      short BTSR10            ; yes
        mov     ax,LAsbPR               ; get Primary level at init
        mov     OldLAsbPR,ax            ; save it (in case of speaker ON)
        call    MixReset                ; reset the mixer
;-----------------------------------------------------------------------------
;       get interrupt type from Media Stream Controller
;-----------------------------------------------------------------------------
BTSR10:
        DEBUG 'a'
        mov     al,LAsbInt+1            ; get int status reg(our part)
        test    al,INT_SBC              ; is it a Sound Board Command
        jnz     short SBC               ; yes,
        test    al,INT_SBM              ; is it a Mixer Command
        jnz     SBM                     ; yes,
        test    al,INT_SBP              ; is it primary audio
        jnz     SBP                     ; yes,
IFDEF   SBS_INT
        test    al,INT_SBS              ; is it secondary audio
        jnz     SBS                     ; yes,
ENDIF ;------------------------>SBS_INT
        jmp     BTSR90                  ; no, get out for now
;*****************************************************************************
;       Sound Board Command processing
;*****************************************************************************
;-----------------------------------------------------------------------------
;       process constant and length changes in the DMA control reg (LADCR)
;-----------------------------------------------------------------------------
SBC:
        DEBUG 'c'
IFDEF SIMULATE
        and     LAsbInt+1,not INT_SBC   ; reset this interrupt
ENDIF ;------------------------>SIMULATE
        mov     al,byte ptr LAsbDMA     ; get dma constant
        mov     dx,word ptr LAsbDMA+1   ; get dma length or size
        mov     word ptr DMAlen,dx      ; save len for 48h cmd
        mov     cl,byte ptr LAsbDMA+3   ; get DMA flags
IFDEF SIMULATE
        and     LAsbDMA+3,0f3h          ; reset DMA const/leng dirty bits
ENDIF ;------------------------>SIMULATE
        mov     byte ptr DMAflag,cl     ; save flags for later
        cmp     DMAconst,al             ; is this in use
        je      short SBC2              ; yes
        mov     DMAconst,al             ; set for new constant
IFDEF USETABLE
        xor     bx,bx                   ;
        mov     bl,al                   ;
        shl     bx,1                    ;
        mov     ax,word ptr ClkTab[bx]  ; get freq constant
        mov     word ptr LAsbClk,ax     ; update Legacy Audio Clk reg
        and     ax,SEL17MASK            ; get rid of selclk17 bit
        mov     dh,Filter50             ; a value of 100 or 200
        div     dh                      ; FD=CDxx/Filter50
        dec     al                      ; FD=(CDxx/Filter50)-1
        mov     LAsbFClk,al             ; set the audio reg
ELSE    ;---------------------->NOT USETABLE
        call    CompClk
ENDIF ;------------------------>USETABLE
;-----------------------------------------------------------------------------
;       process command in the Command data reg (LACR)
```

H:\HOME\MM6\BRKTREE\701\BRKTREE.R4(5P1)

-52-

Attorney Docket No. 11543.701

```
;---------------------------------------------------------------
        SBC2:   mov     eax,LAsbCMD             ; read destroys contents
                mov     OldLAsbCMD,eax          ; save it in case
        IFDEF SIMULATE
                mov     dword ptr LAsbCMD,0     ; destroys contents
        ENDIF ;------------------------->SIMULATE
                ror     eax,8                   ; shift out command byte
                mov     dx,ax                   ; dl/dh contain up to 2 parms
                ror     eax,16                  ;
                movzx   cx,al                   ; CX=VGA ISR bits
                movzx   eax,ah                  ; AL=2xC command code
                mov     di,ax                   ; put in di for cmd processing
        ;       mov     VGAisrSt,cl             ; save VGA ISR status byte
                jcxz    short SBC4              ; no, VGA ISR type processing
        ;---------------------------------------------------------------
        ; processing for VGA ISR data in LARR reg....warm restart via 2x6 cmd
        ;---------------------------------------------------------------
        SBC3:   test    cl,CMD_WarmReset        ; Audio reset via 2x6 cmds?
                jz      short SBC3b             ; no
                bts     SWitch,SW_AID_RESET     ; say a warm start occurred
                mov     ch,LAsbPctl             ; Get Legacy audio Primary stream ctl
                and     ch,not PRI_ST_ENABLE    ; reset enable bit
                mov     LAsbPctl,ch             ; put Legacy audio Primary stream ctl
                and     SWitch,SW_RESET_MASK    ; turn off HDS,AID
                mov     TypeInt,0               ; turn off interrupts immediately
        IFDEF SIMULATE
                mov     al,0aah                 ; get ready value
                mov     LAsbRR,al               ; save in read reg
        ENDIF ;------------------------->SIMULATE
        IFDEF DMAPROBLEM
                call    SetDMA                  ; set our DMA to known value
        ENDIF ;------------------------->DMAPROBLEM
                jmp     CmdRet                  ; go to return
        ;---------------------------------------------------------------
        ; processing for VGA ISR data in LARR reg....Cmd DAh ..AID halt
        ;---------------------------------------------------------------
        SBC3a:  test    cl,CMD_AIDreset         ; Cmd DAh received?
                jz      short SBC3b             ; no
                bts     SWitch,SW_AID_RESET     ; say a warm start occurred
                and     SWitch,SW_RESET_MASK    ; turn off HDS,AID
                jmp     CmdRet                  ; go to return
        ;---------------------------------------------------------------
        ; processing for VGA ISR data in LARR reg....ack via 2xE read
        ;---------------------------------------------------------------
        SBC3b:  test    cl,CMD_AIDack           ; AID occured via read to 2xE?
                jnz     BTSR91                  ; yes, go restart AID play/record
                jmp     CmdRet                  ; go to return
        ;---------------------------------------------------------------
        ; processing for VGA ISR data in LARR reg....bad command processing
        ;---------------------------------------------------------------
        SBC3c:  test    cl,CMD_BADcmd           ; Unknown command to 2xC?
                jz      short SBC3d             ; no
        ;       mov     something to mail box
                jmp     CmdRet                  ; go to return
        SBC3d:
        ;---------------------------------------------------------------
        ; DSP command processing ...determine where to start looking
        ;---------------------------------------------------------------
        SBC4:   cmp     al,080h                 ; with respect to 80h
                je      cmd80                   ; = 80h
                ja      short SBC4a             ; > 80h...90h to F2h
                cmp     al,020h                 ; with respect to 20h
                je      short cmd20             ; = 20h
```

H:\HOME\MM6\BRKTREE\701\BRKTREE.R4(5P1)

-53-

Attorney Docket No. 11543.701

```
                jb      short cmd14             ; < 20h...10h to 1fh
                ja      short cmd2c             ; > 20h...24h to 7fh
        SBC4a:  cmp     al,0D0h                 ; with respect to D0h
                je      cmdD0                   ; = D0h
                jb      cmd91                   ; < D0h...90h to 99h
                                                ; >=D0h...D0h to F2h
                cmp     al,0E2h                 ; with respect to E2h
                jb      CmdD3                   ; < E2h...D1h to DAh
                je      CmdE2                   ; = E2h
                ja      CmdF2                   ; > E2h...F2h
;---------------------------------------------------------------
; DSP Cmd 10h - Direct Mode play
;---------------------------------------------------------------
Cmd10:  call    BldDirPly                       ; build and start direct I/O
        jmp     CmdRet                          ; go to return
;---------------------------------------------------------------
; DSP Cmd 14h -8 bit play
;---------------------------------------------------------------
Cmd14:  cmp     al,014h                         ; DMA 8 bit?
        jb      short Cmd10                     ;   must be direct play
        ja      short Cmd17                     ;   must be >14h
Cmd14b: mov     al,AS_8BIT+AS_PLAY              ; set for 8 bit and play
Cmd14c:
IFDEF DMAPROBLEM
        call    CheckDMA                        ; see if a legal DMA
        jc      short Cmd14d                    ; not legal don't play
ENDIF ;----------------------->DMAPROBLEM
        call    BldPly                          ; build and start silence buf
Cmd14d: jmp     CmdRet                          ; go to return
;---------------------------------------------------------------
; DSP Cmd 16h - 2 bit ADPCM play
;---------------------------------------------------------------
Cmd16:  mov     al,AS_2BIT+AS_PLAY              ; set up top of 2nd Audio Struct DW
        jmp     Cmd14c                          ; go to common code
;---------------------------------------------------------------
; DSP Cmd 17h - 2 bit ADPCM play with reference byte
;---------------------------------------------------------------
Cmd17:  cmp     al,017h                         ; 2bit ADPCM with ref byte?
        jb      short Cmd16                     ;   must be 2bit ADPCM play
        ja      short Cmd1F                     ;   must be >17h
        mov     al,AS_2BIT+AS_REF+AS_PLAY;      set up top of 2nd Audio Struct DW
        jmp     Cmd14c                          ; go to common code
;---------------------------------------------------------------
; DSP Cmd 1Ch - Auto Init DMA play
;---------------------------------------------------------------
Cmd1C:  bts     SWitch,SW_AID_PLAY              ; set auto init DMA mode for exit
        jmp     short Cmd14b                    ; go to common code
;---------------------------------------------------------------
; DSP Cmd 1Fh - 8 bit ADPCM play with reference byte and auto init DMA
;---------------------------------------------------------------
Cmd1F:  mov     dx,DMAlen                       ; assume last cmd 48 size
        cmp     al,01Fh                         ; AID 2bit ADPCM with ref byte?
        jb      short Cmd1C                     ;   must be Auto Init DMA play
        ja      CmdERR                          ;   not a legal 2xC command
        mov     al,AS_2BIT+AS_REF+AS_PLAY;      set up top of 2nd Audio Struct DW
Cmd1Fa: bts     SWitch,SW_AID_PLAY              ; set auto init DMA mode for exit
        jmp     short Cmd14c                    ; go to common code
;---------------------------------------------------------------
; DSP cmd 20h - Direct Record
;---------------------------------------------------------------
Cmd20:  call    BldDirRec                       ; build and start direct I/O
        jmp     CmdRet                          ; go to return
;---------------------------------------------------------------
```

H:\HOME\MM6\BRKTREE\701\BRKTREE.R4(5P1)

-54-

Attorney Docket No. 11543.701

```
; DSP cmd 24h - SCD 8 bit PCM record
; DSP cmd 2Ch - SCD 8 bit PCM record with Auto Init DMA
;------------------------------------------------------------
Cmd2C:    cmp    al,02Ch            ; is it AID record mode?
          jb     short Cmd2Cb       ;   no, must be SCD record
          ja     short Cmd75        ;   must be > 2ch
          bts    SWitch,SW_AID_REC  ; set auto init DMA mode for exit
          mov    dx,DMAlen          ; get last cmd 48 size
Cmd2Cb:   mov    al,AS_8BIT         ; set for 8 bit and record
IFDEF DMAPROBLEM
          call   CheckDMA           ; see if a legal DMA
          jc     short Cmd2Cc       ; not legal don't play
ENDIF ;------------------------>DMAPROBLEM
          call   BldRec             ; build and start buf
Cmd2Cc:   jmp    CmdRet             ; go to return
;------------------------------------------------------------
; DSP cmd 74h -SCD 4-bit ADPCM play
;------------------------------------------------------------
Cmd74:    mov    al,AS_4BIT+AS_PLAY ; set up top of 2nd Audio Struct DW
          jmp    short Cmd14c       ; go to common code
;------------------------------------------------------------
; DSP cmd 75h -SCD 4 bit ADPCM play with ref byte
;------------------------------------------------------------
Cmd75:    cmp    al,075h            ; 4 bit ADPCM w/ref SCD?
          jb     short Cmd74        ;   must be SCD 4bit ADPCM play
          ja     short Cmd77        ;   must be > 75h
          mov    al,AS_4BIT+AS_REF+AS_PLAY; set up top of 2nd Audio Struct DW
          jmp    short Cmd14c       ; go to common code
;------------------------------------------------------------
; DSP cmd 76h -SCD 2.6-bit ADPCM play
;------------------------------------------------------------
Cmd76:    mov    al,AS_3BIT+AS_PLAY ; set up top of 2nd Audio Struct DW
          jmp    short Cmd14c       ; go to common code
;------------------------------------------------------------
; DSP cmd 77h -SCD 2.6-bit ADPCM play with ref byte
;------------------------------------------------------------
Cmd77:    cmp    al,077h            ; 3 bit ADPCM w/ref SCD?
          jb     short Cmd76        ;   must be SCD 2.6 bit ADPCM play
          ja     short Cmd7F        ;   must be > 77h
          mov    al,AS_3BIT+AS_REF+AS_PLAY; set up top of 2nd Audio Struct DW
          jmp    Cmd14c             ; go to common code
;------------------------------------------------------------
; DSP cmd 7Dh -SCD 4 bit ADPCM play with ref byte and auto init DMA
;------------------------------------------------------------
Cmd7D:    mov    al,AS_4BIT+AS_REF+AS_PLAY; set up top of 2nd Audio Struct DW
          jmp    Cmd1Fa             ; go to common code
;------------------------------------------------------------
; DSP cmd 7Fh -SCD 2.6 bit ADPCM play with ref byte and auto init DMA
;------------------------------------------------------------
Cmd7F:    cmp    al,07Fh            ; 3 bit ADPCM w/ref AID?
          jb     short Cmd7D        ;   must be SCD 4bit ADPCM ref/AID
          ja     CmdERR             ;   must be an illegal 2xC command
          mov    al,AS_3BIT+AS_REF+AS_PLAY; set up top of 2nd Audio Struct DW
          jmp    Cmd1Fa             ; go to common code
;------------------------------------------------------------
; DSP cmd 80h - Silence mode
;------------------------------------------------------------
Cmd80:    bts    SWitch,SW_SILENCE  ; set silence on
          mov    al,AS_8BIT+AS_PLAY ; set for 8 bit and play
          call   BldPly             ; build and start silence buf
          btr    SWitch,SW_SILENCE  ; set silence off
          jmp    CmdRet             ; go to return
;------------------------------------------------------------
```

Attorney Docket No. 11543.701

```
; DSP cmd 90h - High Speed Play Mode with Auto Init DMA
;------------------------------------------------------------
Cmd90:     bts      SWitch,SW_AID_PLAY   ; set auto init DMA mode for exit
           bts      SWitch,SW_HSD        ; set auto init DMA mode for exit
           jmp      Cmd14b               ; go to common code
;------------------------------------------------------------
; DSP cmd 91h - High Speed Play Mode
;------------------------------------------------------------
Cmd91:     mov      dx,DMAlen            ; get last cmd 48 size for all 9?h
           cmp      al,091h              ; HSD play Single cycle?
           jb       short Cmd90          ;   must be HSD/AID play
           ja       short Cmd99          ;   must be >91h
           bts      SWitch,SW_HSD        ; set for High speed DMA mode
           btr      SWitch,SW_AID_PLAY   ; reset AID in case
           jmp      Cmd14b               ; go to common code
;------------------------------------------------------------
; DSP cmd 98h - High Speed Record Mode with Auto Init DMA
;------------------------------------------------------------
Cmd98:     bts      SWitch,SW_AID_REC    ; set auto init DMA mode for exit
           bts      SWitch,SW_HSD        ; set auto init DMA mode for exit
           jmp      short Cmd99b         ; go to common code
;------------------------------------------------------------
; DSP cmd 99h - High Speed Record Mode
;------------------------------------------------------------
Cmd99:     cmp      al,099h              ; HSD record single cycle?
           jb       short Cmd98          ;   must be HSD/AID record
           ja       CmdERR               ;   must be an illegal 2xC command
           bts      SWitch,SW_HSD        ; set for High speed DMA mode
           btr      SWitch,SW_AID_REC    ; reset AID in case
Cmd99b:    mov      al,AS_8BIT           ; set for 8 bit and record
           call     BldRec               ; build and start buf
           jmp      CmdRet               ; go to common return
;------------------------------------------------------------
; DSP cmd D0h - Halt DMA
;------------------------------------------------------------
CmdD0:     bts      SWitch,SW_DMA_HALT   ; set dma is halted
           bt       SWitch,SW_DMA_PROG   ; is a dma in progress
IFDEF SIMULATE
           jnc      CmdRet               ; no, no need to pause stream
ELSE   ;----------------------->SIMULATE
           jnc      short CmdRet         ; no, no need to pause stream
ENDIF  ;----------------------->SIMULATE
           or       LAsbPctl,PRI_ST_PAUSE ; set pause bit
           jmp      short CmdRet         ; go to common return
;------------------------------------------------------------
; DSP cmd D1h - Speaker On
;------------------------------------------------------------
CmdD1:     mov      ax,OldLAsbPR         ; get saved last Primary left/right
           mov      LAsbPR,ax            ; put Primary left/right atten.
           jmp      short CmdRet         ; go to common return
;------------------------------------------------------------
; DSP cmd D3h - Speaker Off
;------------------------------------------------------------
CmdD3:     cmp      al,0D3h              ; Speaker Off?
           jb       short CmdD1          ;   must be speaker ON
           ja       short CmdDA          ;   must be > D3h
           mov      ax,LAsbPR            ; get Primary left/right atten.
           mov      OldLAsbPR,ax         ; save for now
           xor      ax,ax                ; set to mute
           mov      LAsbPR,ax            ; put Primary left/right atten.
IFDEF SIMULATE
           jmp      CmdRet               ; go to common return
ELSE   ;----------------------->SIMULATE
```

H:\HOME\MM6\BRKTREE\701\BRKTREE.R4(5P1)

-56-

```
                jmp     short CmdRet            ; go to common return
ENDIF ;-------------------->SIMULATE
;-------------------------------------------------------------------
; DSP cmd D4h - Continue DMA
;-------------------------------------------------------------------
CmdD4:  btr     SWitch,SW_DMA_HALT      ; is dma is halted
        jnc     short CmdRet            ; no, nothing to do
        bt      SWitch,SW_DMA_PROG      ; is a dma in progress
        jnc     short CmdRet            ; no, no need to restart stream
        and     LAsbPctl,not PRI_ST_PAUSE; reset pause bit
        jmp     short CmdRet            ; go to common return
;-------------------------------------------------------------------
; DSP cmd DAh - Exit Auto Init DMA mode
;-------------------------------------------------------------------
CmdDA:  cmp     al,0DAh                 ; Exit Auto Init DMA mode?
        jb      short CmdD4             ;   must be continue DMA
        ja      short CmdERR            ;   must be an illegal 2xC command
        bt      SWitch,SW_HSD           ; are we in HSD mode
        jc      short CmdRet            ; yes, only works for AID mode
        and     SWitch,SW_RESET_MASK    ; turn off HDS,AID
        jmp     short CmdRet            ; go to common return
;-------------------------------------------------------------------
; DSP cmd E2h - Data munge/DMA test
;-------------------------------------------------------------------
CmdE2:  cmp     al,0E2h                 ; Data Munge/DMA test?
        jne     short CmdERR            ; no
        btc     SWitch,SW_MUNGEFF       ; is the 1st pass for E2
        jc      short CmdE2a            ; no, 2nd pass
        call    GetDMA                  ; get DMA count/addr
CmdE2a: push    es                      ; restore reg
        mov     ax,DMAseg               ; set up for addressing DMA area
        mov     es,ax                   ; ES=DMA area
        mov     di,DMAoff               ;
CmdE2b: mov     es:[di],dh              ; save result parm in DMA area
        inc     DMAoff                  ; next DMA location
        dec     DMAcnt                  ; less 1 count
        pop     es                      ; restore reg
        jmp     short CmdRet            ; go to return
;-------------------------------------------------------------------
; DSP cmd F2h - verify Legacy Audio IRQ
;-------------------------------------------------------------------
CmdF2:  cmp     al,0F2h                 ; Verify LA IRQ?
        jne     short CmdERR            ; no
        bts     SWitch,SW_INTF2         ; give app an interrupt
IFDEF SIMULATE
        bts     TypeInt,F2int           ;
ENDIF ;-------------------->SIMULATE
        jmp     short CmdRet            ; go to common return
;-------------------------------------------------------------------
; Error on command
;-------------------------------------------------------------------
CmdErr: int 3
; @not complete@
;-------------------------------------------------------------------
; Return
;-------------------------------------------------------------------
CmdRet: jmp     BTSR90                  ; get out ;*******************************************************************
; Mixer Command processing
;*******************************************************************
;-------------------------------------------------------------------
; Get values in Mixer Registers (up to 2 mixer command sequences)
```

Attorney Docket No. 11543.701

```
;---------------------------------------------------------------------
        SBM:
              DEBUG 'm'
        IFDEF SIMULATE
 5            and      LAsbInt+1,not INT_SBM    ; reset this interrupt
        ENDIF ;--------------------------->SIMULATE
              mov      ax,LAsbMix               ; AX=cmd1, DX=cmd2
              mov      dx,LAsbMix+2             ; AX=cmd1, DX=cmd2
        IFDEF SIMULATE
10            and      LasbMix,0FF7Fh           ; reset dirty bit
              and      LasbMix+2,0FF7Fh         ; reset dirty bit
        ENDIF ;--------------------------->SIMULATE
              xor      MixSw,2                  ; where is current command sequence
              jnz      short SBM1               ; was zero...thus in byte0,1
15            xchg     ax,dx                    ; reverse cmd seq 1 and cmd seq 2
        SBM1: mov      MixCmd2,dx               ; save possible 2nd command
              DEBUGR AX
              DEBUG ' '
              DEBUGR DX
20            DEBUG ' '
              btr      al,MIX_DIRTY             ; is dirty bit set
              jc       short Mix00              ; yes
              jmp      MixErr                   ; go to error
        ;---------------------------------------------------------------------
25      ; Reset the mixer to default values
        ;---------------------------------------------------------------------
        Mix00: mov     MixCmd1,ax               ; save for execution
              cmp      al,00h                   ; mixer reset?
              jne      short Mix02              ; no,
30            call     MixReset                 ; reset the mixer
              jmp      MixRet                   ; go to common return
        ;---------------------------------------------------------------------
        ; Common routine for reset mixer command and initialization code
        ;---------------------------------------------------------------------
35      MixReset proc  near
              mov      ah,099h                  ; voice volume default
              call     BldMix46                 ; convert
              mov      LAsbPR,dx                ; output Primary left/right atten.
              mov      OldLAsbPR,dx             ; save for now
40            mov      ah,11h                   ; microphone mixing default
              call     BldMix35                 ; convert
              mov      LAsbMC,dx                ; output microphone left/right atten.
              mov      ax,INIT_CMIX             ; mixer attenuation
              mov      LAsbCMIX,ax              ; output new Legacy CMIX setting
45            mov      ah,099h                  ; master volume default
              call     BldMix45                 ; convert
              mov      LAsbMV,dx                ; output master volume left/right
                                                ; atten.
              mov      ah,099h                  ; MIDI volume default
50            call     BldMix45                 ; convert
              mov      LAsbFM,dx                ; output FM volume left/right atten.
              mov      ah,11h                   ; CD volume default
              call     BldMix45                 ; convert
              mov      LAsbCD,dx                ; output CD volume left/right atten.
55            mov      OldLAsbCD,dx             ; save for 20h mixer cmd
              mov      ah,11h                   ; Line In volume default
              call     BldMix45                 ; convert
              mov      LAsbLN,dx                ; output Line volume left/right atten.
              mov      OldLAsbLN,dx             ; save for 20h mixer cmd
60            ret
        MixReset endp
        ;---------------------------------------------------------------------
        ; Set master right/left from lower nibble
```

```
;--------------------------------------------------------------------
Mix02:  cmp     al,02h                  ; Master Left/Right
        jne     short Mix04             ; no,
        mov     al,ah                   ; put value in both
        shl     al,4                    ; put bot nibble in top
        and     ah,00fh                 ; zero out to nibble
        or      ah,al                   ; make top=bot nibble
        jmp     Mix22a                  ; go to common routine
;--------------------------------------------------------------------
; Digitized voice volume control
;--------------------------------------------------------------------
Mix04:  cmp     al,04h                  ; digitized voice volume?
        jne     short Mix06             ; no,
        call    BldMix46                ; convert
        mov     LAsbPR,dx               ; output Primary left/right atten.
        jmp     MixRet                  ; go to common return
;--------------------------------------------------------------------
; Set FM left/right from lower nibble with mute left/right
;--------------------------------------------------------------------
Mix06:  cmp     al,06h                  ; Set left/right FM with mute
        jne     short Mix08             ; no,
        mov     si,offset MixTab45      ; use 4 bit to 5 bit conversion
        xor     bx,bx                   ; zero index
        mov     bl,ah                   ; put nibbles in index
        and     bx,0fh                  ; get rid of high nibble
        mov     al,byte ptr ds:[si][bx] ; get corresponding value for high
                                        ; nibble
        xor     dx,dx                   ; zero both left and right for mute
        test    ah,040h                 ; is FM left mute set
        jnz     short Mix06a            ; yes, skip loading reg
        mov     dh,al                   ; set left FM value
Mix06a: test    ah,020h                 ; is FM right mute set
        jnz     Mix26a                  ; yes, already got it mutes
        mov     dl,al                   ; set right FM value
        jmp     Mix26a                  ; go to common routine
;--------------------------------------------------------------------
; Set CD left/right from lower nibble
;--------------------------------------------------------------------
Mix08:  cmp     al,08h                  ; Set CD left/right
        jne     short Mix0A             ; no,
        mov     al,ah                   ; put in both
        shl     al,4                    ; put bot into top
        and     ah,0fh                  ; and out top
        or      ah,al                   ; put in same bits
        mov     al,OldMix28             ; get last value of mix 28h
        or      al,03fh                 ; fix up mask
        and     ah,al                   ; resultant 28 command
        jmp     Mix28a                  ; go to common routine
;--------------------------------------------------------------------
; Microphone mixing register
;--------------------------------------------------------------------
Mix0A:  cmp     al,0Ah                  ; microphone input volume?
        jne     short Mix0C             ; no,
        mov     bl,ah                   ;
        shl     bl,4                    ;
        or      ah,bl                   ; put in top and bot nibble
        call    BldMix35                ; convert
        mov     LAsbMC,dx               ; output microphone left/right atten.
        jmp     MixRet                  ; go to common return
;--------------------------------------------------------------------
; Input source selection
;--------------------------------------------------------------------
Mix0C:  cmp     al,0Ch                  ; input source selection?
```

Attorney Docket No. 11543.701

```
            jne     short Mix0E             ; no,
            mov     al,LAsbCMUX             ; get Legacy CMUX setting
            and     al,CMUXmask             ; get rid of mux selector
            xor     bx,bx                   ; zero index
            mov     bl,ah                   ; put input source in index
            shr     bx,1                    ; put in low order bits
            mov     al,CMUXtab[bx]          ; get CMUX setting
            mov     LAsbCMUX,al             ; output new Legacy CMUX setting
            jmp     MixRet                  ; go to common return
;--------------------------------------------------------------------------
;   stereo control (comes in as bit 1 of DMA control reg status
;--------------------------------------------------------------------------
Mix0E:      cmp     al,0Eh                  ; stereo control?
            jne     short Mix20             ; no,
; NOTE that this should come in via the DMA control Status flag bit 1
;           bt      ah,PlayMode             ; is it stereo
;           jnc     short MixRet            ; no
;           bts     DMAflag,PlayMode        ; set stereo switch
            jmp     short MixRet            ; go to error as it come in via HW
;--------------------------------------------------------------------------
;   Mute control of Line,CD,Mic
;--------------------------------------------------------------------------
Mix20:      cmp     al,20h                  ; mute control?
            jne     short Mix22             ; no,
            xor     dx,dx                   ; set for mute
            test    ah,08h                  ; is line mute set
            jnz     short Mix20a            ; yes
            mov     dx,OldLAsbLN            ; no, get saved 2Eh mixer cmd
Mix20a:     mov     LAsbLN,dx               ; output Line volume left/right atten.
            xor     dx,dx                   ; set for mute
            test    ah,04h                  ; is CD mute set
            jnz     short Mix20b            ; yes
            mov     dx,OldLAsbCD            ; no, get saved 28h mixer cmd
Mix20b:     mov     LAsbCD,dx               ; output Line volume left/right atten.
            test    ah,02h                  ; is Mic mute set
            jnz     short Mix20c            ; yes
            and     LAsbCMUX,0DFh           ; set mic mute OFF
            jmp     short MixRet            ; go to common return
Mix20c:     or      LAsbCMUX,020h           ; set mic mute to ON
            jmp     short MixRet            ; go to common return
;--------------------------------------------------------------------------
;   Master volume control
;--------------------------------------------------------------------------
Mix22:      cmp     al,22h                  ; master volume control?
            jne     short Mix26             ; no,
Mix22a:     call    BldMix45                ; convert
            mov     LAsbMV,dx               ; output master volume left/right
                                            ; atten.
            jmp     short MixRet            ; go to common return
;--------------------------------------------------------------------------
;   MIDI volume control
;--------------------------------------------------------------------------
Mix26:      cmp     al,26h                  ; MIDI volume control?
            jne     short Mix28             ; no,
            call    BldMix45                ; convert
Mix26a:     mov     LAsbFM,dx               ; output FM volume left/right atten.
            jmp     short MixRet            ; go to common return
;--------------------------------------------------------------------------
;   CD volume control
;--------------------------------------------------------------------------
Mix28:      cmp     al,28h                  ; CD volume control?
            jne     short Mix2E             ; no,
            mov     OldMix28,ah             ; save for 08h cmd
```

H:\HOME\MM6\BRKTREE\701\BRKTREE.R4(5P1)

Attorney Docket No. 11543.701

```
Mix28a:  call    BldMix45            ; convert
         mov     OldLAsbCD,dx        ; save for 20h mixer cmd
         mov     LAsbCD,dx           ; output CD volume left/right atten.
         jmp     short MixRet        ; go to common return
;----------------------------------------------------------------
; Line volume control
;----------------------------------------------------------------
Mix2E:   cmp     al,2Eh              ; Line volume control?
         jne     short MixErr        ; no,
         call    BldMix45            ; convert
         mov     OldLAsbLN,dx        ; save for 20h mixer cmd
         mov     LAsbLN,dx           ; output Line volume left/right atten.
         jmp     short MixRet        ; go to common return
;----------------------------------------------------------------
; Error Message
;----------------------------------------------------------------
MixErr:
         int 3
; @not complete@
;----------------------------------------------------------------
; Return
;----------------------------------------------------------------
MixRet:  mov     ax,MixCmd1          ; get command
IFDEF SIMULATE
         call    Do_CmdM             ; output mixer command
ENDIF ;------------------------->SIMULATE
         mov     ax,MixCmd2          ; get possible 2nd command
         btr     al,MIX_DIRTY        ; is dirty bit set
         jnc     short MixRet1       ; no,
         xor     MixSw,2             ; set for next command
         debug   '%'
         jmp     Mix00               ; go process this cmd
MixRet1: jmp     BTSR90              ; get out ;****************************************************************
; Primary processing
;****************************************************************
SBP:
         DEBUG 'p'
IFDEF SIMULATE
         and     LAsbInt+1,not INT_SBP ; reset this interrupt
ENDIF ;------------------------->SIMULATE
         bsf     bx,TypeInt          ; get index of bit
         shl     bx,1                ; double for jump table
         mov     TypeInt,0           ; reset bit that caused this
         jmp     word ptr cs:JmpA[bx] ; jump to proper routine
;----------------------------------------------------------------
; Jump table to go to the right routine base on the type of interrupt
;----------------------------------------------------------------
JmpA:    dw      OFFSET SBP0         ; Direct Record Interrupt
         dw      OFFSET SBP1         ; Last Play Interrupt
         dw      OFFSET SBP2         ; Multiple Buffer of Play
         dw      OFFSET SBP4         ; Last Record Interrupt
         dw      OFFSET SBP4         ; Multiple Buffer of Record
         dw      OFFSET SBP1         ; End of Silence Interrupt
IFDEF SIMULATE
         dw      OFFSET SBP5         ; F2 cmd causes an interrupt
ENDIF ;------------------------->SIMULATE
;----------------------------------------------------------------
; Direct Record processing
;----------------------------------------------------------------
SBP0:    mov     al,es:[BufDirRec-ABbegin]; get direct recorded value
IFDEF SIMULATE
```

Attorney Docket No. 11543.701

```
            inc     NextReadA               ; increment value for testing
            mov     al,NextReadA            ; put in read register
            dec     LAsbPBc                 ; decrement count on interrupt
    ENDIF ;---------------------->SIMULATE
            mov     LAsbRR,al               ; save in read reg
            jmp     BTSR90                  ; restore regs
;------------------------------------------------------------------
; Last Buffer Play interrupt or end of silence
;     Also last buffer processing for record
;------------------------------------------------------------------
    SBP1:   bts     SWitch,SW_INT           ; give app int on exit
            btr     SWitch,SW_DMA_PROG      ; reset DMA in progress bit
    IFDEF ZERODMA1
            call    ZeroDMA                 ; zero the DMA counter
    ENDIF ;---------------------->ZERODMA1
    IFDEF SIMULATE
            mov     LAsbPBc,0               ; zero count on last interrupt
    ENDIF ;---------------------->SIMULATE
            btr     SWitch,SW_AID_RESET     ; did warm start occur
            jnc     short SBP1b             ; no
            and     SWitch,SW_RESET_MASK    ; turn off HSD,AID
    SBP1b:  jmp     BTSR90                  ; go an restore regs
;------------------------------------------------------------------
; Multiple Play processing
;------------------------------------------------------------------
    SBP2:   mov     cx,ADBUF2               ; assume a full half buffer
            mov     di,BufPlayRec-ABbegin   ; assume 1st half of buffer
    IFDEF SIMULATE
            dec     LAsbPBc                 ; decrement count on interrupt
    ENDIF ;---------------------->SIMULATE
            inc     MultIntX                ; count of interrupt
            cmp     UseCaseX,4              ; which case is this
            ja      short SBP2c             ; <= full+full+half buffer
            jb      short SBP2c4            ; <= full+half buffer
                                            ; <= full+full buffer
;------------------------------------------------------------------
; process the case for <= full+full buffer
;------------------------------------------------------------------
    SBP2b:  cmp     MultIntX,1              ; is this the 1st of two
            je      short SBP2c2            ; yes,go to common part
    SBP2b2: mov     di,(BufPlayRec-ABbegin)+ADBUF2; get where to put remaining
                                            ; data
            jmp     short SBP2c4            ; go to common part
;------------------------------------------------------------------
; process the case for <= full+full+half buffer
;------------------------------------------------------------------
    SBP2c:  cmp     MultIntX,2              ; is this the 2nd of three
            ja      short SBP2c4            ; 3rd of 3
            jb      short SBP2c2            ; 1st of 3
                                            ; 2nd of 3
    SBP2c1: mov     di,(BufPlayRec-ABbegin)+ADBUF2; get where to put remaining
                                            ; data
    SBP2c2: bts     TypeInt,PlayMultInt     ; set for another interrupt
            jmp     short SBP2c6            ; go to common part
    SBP2c4: bts     TypeInt,PlayLastInt     ; set for another interrupt
    SBP2c5: mov     cx,CMDcntx              ; get remaining count
    SBP2c6: mov     si,DMAoffx              ; move DMA data to VRAM
    SBP2c7: mov     ax,DMAseg               ;
            push    ds                      ;
            mov     ds,ax                   ;
            mov     dl,cl                   ; save low byte of count
            DEBUG2  '**'
            DEBUG2  '*C'
```

H:\HOME\MM6\BRKTREE\701\BRKTREE.R4(5P1)

Attorney Docket No. 11543.701

```
            DEBUG2  'PF'
            DEBUG2  'T='
            DEBUGR  DS
            DEBUG   ':'
 5          DEBUGR  SI
            DEBUG   ' '
            DEBUGR  ES
            DEBUG   ':'
            DEBUGR  DI
10          DEBUG   ' '
            DEBUGR  CX
            shr     cx,2                    ; make double word
            rep     movsd                   ; move them
            test    dl,2                    ; is there a word to move
15          jz      short SBP2c8            ; no
            movsw                           ; yes, move a word
    SBP2c8: test    dl,1                    ; is there another byte to move
            jz      short SBP2c9            ; no
            movsb                           ; yes move the byte
20  SBP2c9: pop     ds                      ;
            mov     DMAoffx,si              ; save in case
            jmp     BTSR90                  ; go an restore regs
    ;----------------------------------------------------------------
    ; Multiple Record processing
25  ;----------------------------------------------------------------
    SBP4:   mov     cx,ADBUF2               ; assume a full half buffer
            mov     si,BufPlayRec-ABbegin   ; assume 1st half of buffer
    IFDEF   SIMULATE
            dec     LAsbPBc                 ; decrement count on interrupt
30  ENDIF ;-------------------------->SIMULATE
            inc     MultIntX                ; count of interrupt
            mov     al,MultIntX             ; get current count
            test    al,1                    ; is odd number
            jnz     short SBP4a             ; yes, got right SI pointer
35          mov     si,(BufPlayRec-ABbegin)+ADBUF2 ; get where to put remaining
                                            ; data
    SBP4a:  mov     di,UseCaseX             ; get case #
            jmp     word ptr cs:RecI[di]    ; jump to proper routine
    ;----------------------------------------------------------------
40  ; This jmp table branches to a routine for an Action on Record Prim ints
    ;----------------------------------------------------------------
    RecI:   dw      OFFSET SBP4f2           ; <= full buffer
            dw      OFFSET SBP4c            ; <= full+half buffer
            dw      OFFSET SBP4d            ; <= full+full buffer
45          dw      OFFSET SBP4e            ; <= full+full+half buffer
    ;----------------------------------------------------------------
    ; process the case for <= full buffer
    ;----------------------------------------------------------------
    ; note: no need for logic as this is terminal case for all
50  ;----------------------------------------------------------------
    ; process the case for <= full+half buffer
    ;----------------------------------------------------------------
    SBP4c:  cmp     al,3                    ; is this the last of three
            je      short SBP4f2            ; yes,go to common part
55          jmp     short SBP4f1            ; no, go to repeat case
    ;----------------------------------------------------------------
    ; process the case for <= full+full buffer
    ;----------------------------------------------------------------
    SBP4d:  cmp     al,4                    ; is this the last of four
60          je      short SBP4f2            ; yes,go to common part
            jmp     short SBP4f1            ; no, go to repeat case
    ;----------------------------------------------------------------
    ; process the case for <= full+full+half buffer
```

H:\HOME\MM6\BRKTREE\701\BRKTREE.R4(5P1)

Attorney Docket No. 11543.701

```
;-----------------------------------------------------------------
SBP4e:   cmp    al,5                      ; is this the last of five
         je     short SBP4f2              ; yes,go to common part
;        jmp    short SBP4f1              ; no, go to repeat case
;-----------------------------------------------------------------
; common processing for all record cases
;-----------------------------------------------------------------
SBP4f1:  bts    TypeInt,RecMultInt        ; set for another interrupt
         jmp    short SBP4f4              ; go to common part
SBP4f2:  bts    TypeInt,RecLastInt        ; set for another interrupt
SBP4f3:  mov    cx,CMDcntx                ; get remaining count
SBP4f4:  mov    di,DMAoffx                ; move DMA data to VRAM
         mov    ax,DMAseg                 ;
         push   es                        ;
         push   ds                        ;
         push   es                        ;
         pop    ds                        ;
         mov    es,ax                     ;
         mov    dl,cl                     ; save low byte of count
    DEBUG2 '**'
    DEBUG2 '*C'
    DEBUG2 'RF'
    DEBUG2 'T='
    DEBUGR DS
    DEBUG  ':'
    DEBUGR SI
    DEBUG  ' '
    DEBUGR ES
    DEBUG  ':'
    DEBUGR DI
    DEBUG  ' '
    DEBUGR CX
         shr    cx,2                      ; make double word
         rep    movsd                     ; move them
         test   dl,2                      ; is there a word to move
         jz     short SBP4f8              ; no
         movsw                            ; yes, move a word
SBP4f8:  test   dl,1                      ; is there another byte to move
         jz     short SBP4f9              ; no
         movsb                            ; yes move the byte
SBP4f9:  pop    ds                        ;
         pop    es                        ;
         mov    DMAoffx,di                ; save in case
         btr    TypeInt,RecLastInt        ; is this the last
         jnc    short BTSR90              ;
         jmp    SBP1                      ; go to common last buffer
IFDEF SIMULATE
;-----------------------------------------------------------------
; F2 command interrupt
;-----------------------------------------------------------------
SBP5:    bts    SWitch,SW_INT             ; give app int on exit
         jmp    short BTSR90              ; go an restore regs
ENDIF ;---------------------->SIMULATE
IFDEF    SBS_INT
;*****************************************************************
; Secondary processing
; NOTE: shouldn't get here as I only use Primary structure
;*****************************************************************
SBS:
    DEBUG 's'
IFDEF SIMULATE
         and    LAsbInt+1,not INT_SBS     ; reset this interrupt
ENDIF ;---------------------->SIMULATE
```

H:\HOME\MM6\BRKTREE\701\BRKTREE.R4(5P1)

-64-

Attorney Docket No. 11543.701

```
            bts     SWitch,SW_INT           ; give app int on exit
            jmp     BTSR90                  ; get out
    ENDIF   ;----------------------->SBS_INT
    ;*****************************************************************
    ; interrupt return for all types of interrupts
    ;*****************************************************************
    BTSR90:
    IFDEF SIMULATE
            cmp     byte ptr LAsbInt+1,0    ; any interrupt occur
            je      short BTSR90a           ; no
            jmp     BTSR10                  ; go process it for simulation
    BTSR90a:
    ENDIF   ;----------------------->SIMULATE
            btr     SWitch,SW_INTF2         ; should app get interrupt for F2
            jc      short BTSR90c           ; yes,
            btr     SWitch,SW_INT           ; should app get interrupt for DMA
            jnc     short BTSR99            ; no,
            bt      SWitch,SW_AID_PLAY      ; are we in AID mode
            jc      short BTSR90b           ; yes, tell hardware we are doing INT
            bt      SWitch,SW_AID_REC       ; are we in AID mode
            jnc     short BTSR90c           ; no, bypass telling hardware
    BTSR90b:
            bt      SWitch,SW_HSD           ; are we in HSD mode
            jc      short BTSR90c           ; yes
            mov     al,SBIRQSET             ; says I have done a SB IRQ
            mov     byte ptr LAsbRR+3,al    ; update VGA ISR control for SBIRQ
    BTSR90c:
    ;----------------------------------------------------------------
    ; Do sound board interrupt via and reinitiate DMA for play/record
    ;----------------------------------------------------------------
            cli                             ; disable interrupts(make sure)
            pushf                           ; simulate an interrupt
            push    es                      ;
            les     bx,VSB_Vect             ; get current sound board vector addr
            mov     eax,es:[bx]             ;
            mov     VirSB,eax               ;
            pop     es                      ;
            call    dword ptr cs:[VirSB]    ; go to current sound board vector
                                            ; owner
                                            ; via a pseudo INT bt      SWitch,SW_HSD           ; are we in HSD mode
            jnc     short BTSR91b           ; yes, no need to restart in AID mode
    BTSR91:
            bt      SWitch,SW_AID_PLAY      ; are we in AID play mode
            jnc     short BTSR91a           ; no, see if AID rec mode
            call    AIDPly                  ; restart aid play
            jmp     short BTSR91b           ; and get out
    BTSR91a:
            bt      SWitch,SW_AID_REC       ; are we in AID rec mode
            jnc     short BTSR91b           ; no, get out
            call    AIDRec                  ; restart aid record mode
    BTSR91b:
    ;----------------------------------------------------------------
    ; Handle the VGA exit protocol
    ;----------------------------------------------------------------
    BTSR99:
    IFNDEF SIMULATE
            mov     dx,VGA_GRP              ;
            mov     ax,01806h               ; restore VGA context and lock VGA
            out     dx,ax                   ;
            mov     dx,VGA_SEQ              ;
            mov     al,SaveVGA              ; get VGA seq index at entry
```

Attorney Docket No. 11543.701

```
                out     dx,al                           ; restore
        ENDIF   ;---------------------->NOT SIMULATE
        ;-----------------------------------------------------------------------
        ; Restore regs and switch stacks
        ;-----------------------------------------------------------------------
                debug   '}'
                pop     ds                              ;
                pop     es                              ;
                cli                                     ; make sure interrupts are disabled
                btr     SWitch,SW_TSR_BUSY              ; allow other interrupts now after iret
                mov     cs:SwitchMem,bp                 ; save main bank of switches
                popad                                   ;
        IFDEF   USESTACK
                mov     ax,cs:SaveSS                    ; until we restore user stack
                mov     ss,ax                           ;
                mov     sp,cs:SaveSP                    ;
                mov     eax,cs:SaveEAX                  ;
        ENDIF   ;---------------------->USESTACK
        IFDEF   SIMULATE
        IFDEF   USESTACK
                mov     cx,(stacktp-stackbg)/2          ; size of stack in bytes
                xor     bx,bx                           ; index
        BTSR99a:
                cmp     cs:stackbg[bx],'..'             ; has stack been used
                jne     short BTSR99b                   ; yes, cx= bytes used/2
                add     bx,2                            ; no, bump to next location
                loop    BTSR99a                         ; any more
        ENDIF   ;---------------------->USESTACK
        BTSR99b:
                shl     cx,1                            ; cx= amt of stack required
                mov     bx,word ptr cs:SwitchMem        ; get switch settings
                test    cs:typeint,03fh                 ; are any play record interrupt set
                mov     al,0                            ; set to zero if not a play record
                jz      short BTSR99c                   ; no
                mov     al,byte ptr cs:typeint          ; get for simulation
        BTSR99c:
                iret                                    ;
        ELSE    ;---------------------->NOT SIMULATE
                jmp     dword ptr cs:[OldBT]            ; go to next one on chain
        ENDIF   ;---------------------->SIMULATE
        ;-----------------------------------------------------------------------
        ; Get data associated with DMA (i.e. count and address)
        ;-----------------------------------------------------------------------
        GetDMA  proc    near
                push    ax                              ;
                push    dx                              ;
                mov     al,VSB_DMA                      ; get dma
                or      al,4                            ; disable it
                out     0ah,al                          ; mask off either DMA 1 or DMA 3
                xor     ax,ax                           ;
                out     0ch,al                          ; set flip flop
                in      al,03h                          ; get low byte of count
                xchg    al,ah                           ;
                in      al,03h                          ; get hi byte of count
                xchg    al,ah                           ; put in right place
                mov     DMAcnt,ax                       ; save current DMA count
                out     0ch,al                          ; set flip flop
                in      al,083h                         ; get page
                movzx   dx,al                           ; save in dx for now
                in      al,02h                          ; get low byte of addr
                xchg    al,ah                           ; put in top for now
                in      al,02h                          ; get hi byte of addr
                shl     dx,8                            ; make room for part of offset
```

Attorney Docket No. 11543.701

```
            mov     dl,al                    ; put MSB of offset into seg
            mov     al,ah                    ; AL=AL is LSB of offset
            shl     dx,4                     ; make room for 4 more bits
            shr     ah,4                     ; get rid of low nibble
   5        or      dl,ah                    ; but last nibble into seg
            and     ax,0fh                   ; only last 4 bits of offset
            mov     DMAoff,ax                ; save offset of data
            mov     DMAseg,dx                ; save segment of data
            mov     al,VSB_DMA               ; get dma
  10        out     0ah,al                   ; enable DMA 1 or DMA 3
            pop     dx                       ;
            pop     ax                       ;
            ret                              ;
        GetDMA endp
  15    IFDEF ZERODMA1
        ;-----------------------------------------------------------------
        ; Update the DMA counter at end of interrupt
        ;-----------------------------------------------------------------
        ZeroDMA proc near
  20        push    ax                       ; save reg
            mov     al,VSB_DMA               ; get dma
            or      al,4                     ; disable it
            out     0ah,al                   ; mask off either DMA 1 or DMA 3
            xor     ax,ax                    ;
  25        out     0ch,al                   ; set flip flop
            mov     al,-1                    ; set to value
            out     03h,al                   ; set low byte of count
            out     03h,al                   ; set high byte of count
            mov     al,VSB_DMA               ; get dma
  30        out     0ah,al                   ; enable DMA 1 or DMA 3
            pop     ax                       ; restore reg
            ret                              ;
        ZeroDMA endp
        ENDIF ;----------------------->ZERODMA1
  35    IFDEF DMAPROBLEM
        ;-----------------------------------------------------------------
        ; Set data associated with DMA (i.e. count and address)
        ;-----------------------------------------------------------------
        SetDMA proc near
  40        push    ax                       ;
            mov     al,VSB_DMA               ; get dma
            or      al,4                     ; disable it
            out     0ah,al                   ; mask off either DMA 1 or DMA 3
            xor     ax,ax                    ;
  45        out     0ch,al                   ; set flip flop
            mov     al,0ah                   ; set to VGA buffer page
            out     083h,al                  ; set page
            mov     al,VSB_DMA               ; set dma
            out     0ah,al                   ; enable DMA channel
  50        pop     ax                       ;
            ret                              ;
        SetDMA endp
        ;-----------------------------------------------------------------
        ; Check DMA (i.e. count and address)
  55    ;-----------------------------------------------------------------
        CheckDMA proc near
            push    ax                       ;
            mov     al,VSB_DMA               ; get dma
            or      al,4                     ; disable it
  60        out     0ah,al                   ; mask off either DMA 1 or DMA 3
            xor     ax,ax                    ;
            out     0ch,al                   ; set flip flop
            in      al,083h                  ; get page
```

Attorney Docket No. 11543.701

```
                cmp     al,0Ah                  ; has VGA buffer changed
                mov     al,VSB_DMA              ; get dma
                out     0ah,al                  ; enable DMA 1 or DMA 3
                pop     ax                      ;
                jne     short CDMA1             ; yes, get out
                stc                             ; set bad code as APP not using DMA
                ret                             ;
        CDMA1:  clc                             ; say app is using DMA
                ret                             ;
        CheckDMA endp
        ENDIF   ;---------------------->DMAPROBLEM
        IFDEF SIMULATE
        ;--------------------------------------------------------------
        ; Change DMA area to our buffer for simulation
        ;--------------------------------------------------------------
        ChgDMA proc near
                mov     al,VSB_DMA              ; get dma
                or      al,4                    ; disable it
                out     0ah,al                  ; mask off either DMA 1 or DMA 3
                mov     al,0                    ;
                out     0ch,al                  ; set flip flop
                mov     al,SIM_page             ; get sim page
                out     083h,al                 ;
                in      al,083h                 ; get page
                mov     ax,SIM_ofs              ;
                out     02h,al                  ;
                xchg    al,ah                   ;
                out     02h,al                  ;
                mov     al,VSB_DMA              ; get dma
                out     0ah,al                  ; enable DMA 1 or DMA 3
                ret                             ;
        ChgDMA endp
        ;--------------------------------------------------------------
        ; Simulation
        ;--------------------------------------------------------------
        Do_Cmd proc near
                pusha                           ; save regs
                lea     si,OldLAsbCMD           ; get addr of where cmd bytes are
                lodsb                           ; get 1st cmd byte
                xor     bx,bx                   ; zero for indexing
                mov     bl,al                   ; put 1st cmd byte for table lookup
                xor     cx,cx                   ; zero count top for looping
                mov     cl,CmdLen2c[bx]         ; get leng of command
                jcxz    DC4                     ; if zero no command bytes to output
        DC1:    mov     dx,RSB_PORTC            ; get port
                out     dx,al                   ; output a byte
                lodsb                           ; get next cmd byte
                loop    DC1                     ; any more cmd bytes
                mov     bx,5                    ; delay a little
        DC2:    mov     cx,0ffffh               ;
        DC3:    loop    DC3                     ;
                dec     bx                      ;
                jnz     DC2                     ;
        DC4:    popa                            ; no, get out
                ret                             ;
        Do_Cmd  endp
        ;--------------------------------------------------------------
        ; Do the current mixer command
        ;    Input: AX=Mixer cmd
        ;--------------------------------------------------------------
        Do_CmdM proc near
                push    dx                      ; save regs
                mov     dx,RSB_PORT4            ; get real port for simulation
```

Attorney Docket No. 11543.701

```
              out     dx,al                  ; output a byte
              xchg    al,ah                  ; get value
              inc     dx                     ;
              out     dx,al                  ; output a byte
  5           xchg    al,ah                  ; put back right
              pop     dx                     ;
              ret                            ;
      Do_CmdM endp
      ENDIF   ;---------------------->SIMULATE
 10   IFNDEF USETABLE
      ;----------------------------------------------------------------
      ; Compute CDxx and ERRxx
      ;   INPUT: EAX is freq*100 of Media Stream Controller clock
      ;          EBX is freq*100 of conventional clock
 15   ;   OUTPUT: EAX=clock divisor
      ;           EDX=error value
      ;----------------------------------------------------------------
      CompCD  proc    near
              xor     edx,edx                ; zero out dividend
 20           div     ebx                    ; EAX=CDxx=freq*100/sf
              cmp     edx,ecx                ; is remainder less than sf/2
              jl      short CCDx             ; yes,
              inc     eax                    ; no, increment clock divisor
              sub     edx,ebx                ;
 25           neg     edx                    ; approx. ERRxx value
      CCDx:   ret                            ;
      CompCD  endp
      ;----------------------------------------------------------------
      ; Compute the Clock divisor and the Filter clock divisor using the
 30   ; DMA constant in the 24c 40 command
      ;   Input: al=DMA constant in cmd 40h
      ;   Output :updates LAsbClk reg
      ;----------------------------------------------------------------
      CompClk proc    near                   ;
 35           pushad                         ; save all regs
              mov     ebx,256                ;
              movzx   eax,al                 ;
              sub     ebx,eax                ; (256-DMA40)
              mov     eax,100000000          ; 1000000*100
 40           xor     edx,edx                ; zero out dividend
              div     ebx                    ; EAX=sf*100=(1000000*100)/(256-DMA40)
              mov     ebx,eax                ; EBX=sf*100
              mov     ecx,ebx                ;
              shr     ecx,1                  ; ECX=(sf*100)/2
 45           mov     eax,1693440000         ; 16934400*100
              call    CompCD                 ; compute CD17 and ERR17
              push    edx                    ; save ERR17
              mov     esi,eax                ; ESI=CD17
              mov     eax,2457600000         ;
 50           call    CompCD                 ; compute EAX=CD25 and EDX=ERR25
              pop     ebx                    ; EBX=ERR17
              cmp     edx,ebx                ; is abs(ERR25)<abs(ERR17)
              jl      short CC4              ; yes, got the value
              mov     eax,esi                ; make CD=CD17
 55           or      ax,02000h              ; set Select CLK17
      CC4:    mov     word ptr LAsbClk,ax    ; update Legacy Audio Clk reg
              and     ax,SEL17MASK           ; get rid of selclk17
              mov     dh,Filter50            ; a value of 100 or 200
              div     dh                     ; FD=CDxx/Filter50
 60           dec     al                     ; FD=(CDxx/Filter50)-1
              mov     LAsbFClk,al            ; set the audio reg
              popad                          ;
              ret                            ;
```

Attorney Docket No. 11543.701

```
        CompClk  endp
        ENDIF  ;------------------------>USETABLE
        ;---------------------------------------------------------------------
        ; Determine what Play or Record case to use by length
        ; Input: dx=count from command
        ; Output : DI and UseCaseX
        ;            ecx = count +1
        ;---------------------------------------------------------------------
        StrucTab db    1,3,4,5,1
        UseCase  proc  near
                 movzx ecx,dx              ; get command count
                 inc   ecx                 ; bump by one for true count
                 mov   CMDcnt,ecx          ; save for later
                 push  ecx                 ; save
                 mov   di,4                ; case # for silence
                 bt    SWitch,SW_SILENCE   ; is this silence
                 jc    short UC1           ; yes, go number...get out
                 xor   di,di               ; get index
                 sub   ecx,ADBUF2          ; reduce size by a half buffer
        UC0:     sub   ecx,ADBUF2          ; reduce size by a half buffer
                 js    short UC1           ; got last part
                 inc   di                  ; bump to next index
                 jmp   short UC0           ; go look again
        UC1:     mov   cl,cs:StrucTab[di]  ; get number of buffers
                 mov   NumbStruc,cl        ; save it
                 shl   di,1                ; double index
                 mov   UseCaseX,di         ; save for later use
                 mov   MultIntX,0          ; set interrupt number to zero
                 pop   ecx                 ; restore count
                 ret                       ; get out
        UseCase  endp
        ;---------------------------------------------------------------------
        ; Routine to see if DMA is halted before starting play/record
        ;---------------------------------------------------------------------
        StartPR  proc  near
                 bt    SWitch,SW_DMA_HALT  ; is DMA halted
                 jnc   short StartPR1      ; no, don't set pause primary stream
                 or    eax,PRI_ST_STOP     ; set pause bit
        StartPR1:mov   LAsbPadr,eax        ; update primary stream reg
        StartPR2:mov   al,NumbStruc        ; get number for this op
                 mov   byte ptr LAsbPbc,al ; update primary stream buffer count
                                           ; by writing anything to it
                 bts   SWitch,SW_DMA_PROG  ; set DMA in progress bit
                 ret
        StartPR  endp
        ;---------------------------------------------------------------------
        ; Build Play Audio Structure and move data
        ; Input: AL= top byte of dword2 of audio structure
        ;        DX= length from command
        ;---------------------------------------------------------------------
        BldPly   proc  near
                 mov   bx,word ptr Play1+2 ; get top word of 1st audio struct
                                           ; dword
                 bt    DMAflag,PLAYMODE    ; is this stereo
                 jc    short BldPly0a      ; yes, already set to stereo
                 or    bx,AS_BMONO         ; make it left mono
        BldPly0a:call  UseCase             ; which case to use...DI=case*2
                                           ;                     ECX=count+1
                 bt    SWitch,SW_SILENCE   ; is this silence
                 jc    short BldPly0b      ; yes, skip the DMA stuff
                 call  GetDMA              ; get DMA count and address
        BldPly0b:
        IFDEF SIMULATE
```

Attorney Docket No. 11543.701

```
                push    ax
                mov     al,byte ptr OldLAsbCMD
                mov     LastPR,al
                mov     ax,word ptr OldLasbCMD+1
 5              mov     LastLEN,ax
                pop     ax
        ENDIF   ;-------------------->SIMULATE
                jmp     word ptr cs:PlyT[di]        ; jump to proper routine
        ;----------------------------------------------------------------------
10      ; This jmp table branches to a routine for an Action for each DSP cmd
        ; category
        ;----------------------------------------------------------------------
        PlyT:   dw      OFFSET BldPly1              ; <= full buffer
                dw      OFFSET BldPly2              ; <= full+half buffer
                dw      OFFSET BldPly3              ; <= full+full buffer
15              dw      OFFSET BldPly4              ; <= full+full+half buffer
                dw      OFFSET BldPly5              ; <= silence (for 1 less if FFFFh)
        ;----------------------------------------------------------------------
        ; Case 1 : <= full buffer
        ;----------------------------------------------------------------------
20      BldPly1: mov    es:[Play1+7-ABbegin],al     ; save top byte of DW 2
                mov     es:[Play1-ABbegin],cx       ; set length
                or      bx,AS_LAST+AS_INT           ;
                mov     es:[Play1+2-ABbegin],bx     ; save top word of DW 1
25              bts     TypeInt,PlayLastInt         ; say only one interrupt
                jmp     BldPly7                     ; go to common part
        ;----------------------------------------------------------------------
        ; Case 2 : <= full buffer+half buffer
        ;----------------------------------------------------------------------
30      BldPly2: mov    es:[Play1+7-ABbegin],al     ; save top byte of DW 2
                mov     es:[Play2+7-ABbegin],al     ; save top byte of DW 2
                mov     es:[Play3+7-ABbegin],al     ; save top byte of DW 2
                mov     word ptr es:[Play1-ABbegin],ADBUF2; set length
                mov     word ptr es:[Play2-ABbegin],ADBUF2; set length
35              sub     ecx,ADBUF                   ;
                mov     word ptr es:[Play3-ABbegin],cx; set length
                mov     CMDcntx,cx                  ;
                mov     es:[Play2+2-ABbegin],bx     ; save top word of DW 1
                or      bx,AS_INT                   ;
40              mov     es:[Play1+2-ABbegin],bx     ; save top word of DW 1
                or      bx,AS_LAST                  ;
                mov     es:[Play3+2-ABbegin],bx     ; save top word of DW 1
                jmp     BldPly5                     ; go to common part
        ;----------------------------------------------------------------------
45      ; Case 3 : <= full buffer+full buffer
        ;----------------------------------------------------------------------
        BldPly3: mov    es:[Play1+7-ABbegin],al     ; save top byte of DW 2
                mov     es:[Play2+7-ABbegin],al     ; save top byte of DW 2
                mov     es:[Play3+7-ABbegin],al     ; save top byte of DW 2
50              mov     es:[Play4+7-ABbegin],al     ; save top byte of DW 2
                mov     word ptr es:[Play1-ABbegin],ADBUF2; set length
                mov     word ptr es:[Play2-ABbegin],ADBUF2; set length
                mov     word ptr es:[Play3-ABbegin],ADBUF2; set length
                sub     ecx,ADBUF2*3;
55              mov     word ptr es:[Play4-ABbegin],cx; set length
                mov     CMDcntx,cx                  ;
                mov     es:[Play3+2-ABbegin],bx     ; save top word of DW 1
                or      bx,AS_INT                   ;
                mov     es:[Play1+2-ABbegin],bx     ; save top word of DW 1
60              mov     es:[Play2+2-ABbegin],bx     ; save top word of DW 1
                or      bx,AS_LAST                  ;
                mov     es:[Play4+2-ABbegin],bx     ; save top word of DW 1
                jmp     short BldPly5               ; go to common part
```

Attorney Docket No. 11543.701

```
;----------------------------------------------------------------
; Case 4 : <= full+full+half buffer
;----------------------------------------------------------------
BldPly4: mov    es:[Play1+7-ABbegin],al    ; save top byte of DW 2
         mov    es:[Play2+7-ABbegin],al    ; save top byte of DW 2
         mov    es:[Play3+7-ABbegin],al    ; save top byte of DW 2
         mov    es:[Play4+7-ABbegin],al    ; save top byte of DW 2
         mov    es:[Play5+7-ABbegin],al    ; save top byte of DW 2
         mov    word ptr es:[Play1-ABbegin],ADBUF2; set length
         mov    word ptr es:[Play2-ABbegin],ADBUF2; set length
         mov    word ptr es:[Play3-ABbegin],ADBUF2; set length
         mov    word ptr es:[Play4-ABbegin],ADBUF2; set length
         sub    ecx,ADBUF shl 1            ;
         mov    word ptr es:[Play5-ABbegin],cx; set length
         mov    CMDcntx,cx                 ;
         mov    es:[Play4+2-ABbegin],bx    ; save top word of DW 1
         or     bx,AS_INT                  ;
         mov    es:[Play1+2-ABbegin],bx    ; save top word of DW 1
         mov    es:[Play2+2-ABbegin],bx    ; save top word of DW 1
         mov    es:[Play3+2-ABbegin],bx    ; save top word of DW 1
         or     bx,AS_LAST                 ;
         mov    es:[Play5+2-ABbegin],bx    ; save top word of DW 1
BldPly5: bts    TypeInt,PlayMultInt        ; say only one interrupt
BldPly6: mov    cx,ADBUF                   ; fill both buffers
BldPly7: mov    di,BufPlayRec-ABbegin      ; offset in audio buffer
         mov    si,DMAoff                  ; move DMA data to VRAM
         mov    ax,DMAseg                  ;
         push   ds                         ;
         mov    ds,ax                      ;
         mov    dl,cl                      ; save low byte of count
         DEBUG2 '**'
         DEBUG2 '*S'
         DEBUG2 'PF'
         DEBUG2 'T='
         DEBUGR DS
         DEBUG  ':'
         DEBUGR SI
         DEBUG  ' '
         DEBUGR ES
         DEBUG  ':'
         DEBUGR DI
         DEBUG  ' '
         DEBUGR CX
         shr    cx,2                       ; make double word
         rep    movsd                      ; move them
         test   dl,2                       ; is there a word to move
         jz     short BldPly8              ; no
         movsw                             ; yes, move a word
BldPly8: test   dl,1                       ; is there another byte to move
         jz     short BldPly9              ; no
         movsb                             ; yes move the byte
BldPly9: pop    ds                         ;
         mov    DMAoffx,si                 ; save in case
;----------------------------------------------------------------
; Start playing the buffer by updating the Audio regs
;----------------------------------------------------------------
BldPlyX: mov    eax,AR_Play                ; set up Primary Stream addr for play
         call   StartPR                    ; start Play/Rec if it is not halted
         ret                               ;
;----------------------------------------------------------------
; Case 5 : <= silence
;----------------------------------------------------------------
BldPlyS: mov    es:[Play1+7-ABbegin],al    ; save top byte of DW 2
```

Attorney Docket No. 11543.701

```
            or      bx,AS_LAST+AS_INT+AS_MUTE; set up for silence
            mov     es:[Play1+2-ABbegin],bx   ; save top word of DW 1
            bts     TypeInt,SilenceInt        ; say only one interrupt
            mov     word ptr es:[Play1-ABbegin],0ffffh ; set length to max
            jcxz    short BldPlyX             ; if it was zero make one less
            mov     es:[Play1-ABbegin],cx     ; no, use length in command
            jmp     BldPlyX                   ; go to common part
    BldPly endp
;----------------------------------------------------------------------
; AID Play with Audio Structures already built by BldPly
;----------------------------------------------------------------------
    AIDPly  proc near
            mov     MultIntX,0                ; set interrupt number to zero
            call    GetDMA                    ; get DMA count and address
            cmp     UseCaseX,0                ; will it all fit in buffers
            jne     short AIDPly5             ; no,
;----------------------------------------------------------------------
; <= full buffer
;----------------------------------------------------------------------
            bts     TypeInt,PlayLastInt       ; say only one interrupt
            mov     cx,word ptr CMDcnt        ; get amount in buffer
            jmp     short AIDPly7             ; go to common part
;----------------------------------------------------------------------
; > full buffer
;----------------------------------------------------------------------
    AIDPly5: bts    TypeInt,PlayMultInt       ; say only one interrupt
             mov    cx,ADBUF                  ; fill both buffers
    AIDPly7: mov    di,BufPlayRec-ABbegin     ; offset in audio buffer
             mov    si,DMAoff                 ; move DMA data to VRAM
             mov    ax,DMAseg                 ;
             push   ds                        ;
             mov    ds,ax                     ;
             mov    dl,cl                     ; save low byte of count
        DEBUG2  '**'
        DEBUG2  '*A'
        DEBUG2  'PF'
        DEBUG2  'T='
        DEBUGR  DS
        DEBUG   ':'
        DEBUGR  SI
        DEBUG   ' '
        DEBUGR  ES
        DEBUG   ':'
        DEBUGR  DI
        DEBUG   ' '
        DEBUGR  CX
             shr    cx,2                      ; make double word
             rep    movsd                     ; move them
             test   dl,2                      ; is there a word to move
             jz     short AIDPly8             ; no
             movsw                            ; yes, move a word
    AIDPly8: test   dl,1                      ; is there another byte to move
             jz     short AIDPly9             ; no
             movsb                            ; yes move the byte
    AIDPly9: pop    ds                        ;
             mov    DMAoffx,si                ; next buffer
;----------------------------------------------------------------------
; Start playing the buffer by updating the Audio regs
;----------------------------------------------------------------------
             call   StartPR2                  ; start Play/Rec if it is not halted
             ret                              ;
    AIDPly endp
;----------------------------------------------------------------------
```

Attorney Docket No. 11543.701

```
; Build Record Audio Structure and move data
; Input: AL= top byte of dword2 of audio structure
;        DX= length from command
;---------------------------------------------------------------------
BldRec proc near
        mov     bx,word ptr Rec1+2      ; get top word of 1st audio struct
                                        ; dword
        bt      SWitch,SW_SILENCE       ; is this silence
        jnc     short BldRec0a          ; no, normal
        or      bx,AS_MUTE              ; mute it
BldRec0a:bt     DMAflag,RECMODE         ; is this stereo
        jc      short BldRec0b          ; yes, already set to stereo
        or      bx,AS_BMONO             ; make it left mono
BldRec0b:call   UseCase                 ; which case to use...DI=case*2
                                        ;                     ECX=count+1
        call    GetDMA                  ; get DMA count and address
        jmp     word ptr cs:RecT[di]    ; jump to proper routine
;---------------------------------------------------------------------
; This jmp table branches to a routine for an Action for each DSP cmd
; category
;---------------------------------------------------------------------
RecT:   dw      OFFSET BldRec1          ; <= full buffer
        dw      OFFSET BldRec2          ; <= full+half buffer
        dw      OFFSET BldRec3          ; <= full+full buffer
        dw      OFFSET BldRec4          ; <= full+full+half buffer
;---------------------------------------------------------------------
; Case 1 : <= full buffer
;---------------------------------------------------------------------
BldRec1: mov    es:[Rec1+7-ABbegin],al  ; save top byte of DW 2
        mov     es:[Rec1-ABbegin],cx    ; set length
        mov     CMDcntx,cx              ; set amount to process
        or      bx,AS_LAST              ; one and last
        mov     es:[Rec1+2-ABbegin],bx  ; save top word of DW 1
        bts     TypeInt,RecLastInt      ; say only one interrupt
        jmp     BldRec7                 ; go to common part
;---------------------------------------------------------------------
; Case 2 : <= full buffer+half buffer
;---------------------------------------------------------------------
BldRec2: mov    es:[Rec1+7-ABbegin],al  ; save top byte of DW 2
        mov     es:[Rec2+7-ABbegin],al  ; save top byte of DW 2
        mov     es:[Rec3+7-ABbegin],al  ; save top byte of DW 2
        mov     word ptr es:[Rec1-ABbegin],ADBUF2; set length
        mov     word ptr es:[Rec2-ABbegin],ADBUF2; set length
        sub     ecx,ADBUF               ;
        mov     word ptr es:[Rec3-ABbegin],cx; set length
        mov     CMDcntx,cx              ;
        mov     es:[Rec1+2-ABbegin],bx  ; save top word of DW 1
        mov     es:[Rec2+2-ABbegin],bx  ; save top word of DW 1
        or      bx,AS_LAST              ; 3rd is last
        mov     es:[Rec3+2-ABbegin],bx  ; save top word of DW 1
        jmp     BldRec5                 ; go to common part
;---------------------------------------------------------------------
; Case 3 : <= full buffer+full buffer
;---------------------------------------------------------------------
BldRec3: mov    es:[Rec1+7-ABbegin],al  ; save top byte of DW 2
        mov     es:[Rec2+7-ABbegin],al  ; save top byte of DW 2
        mov     es:[Rec3+7-ABbegin],al  ; save top byte of DW 2
        mov     es:[Rec4+7-ABbegin],al  ; save top byte of DW 2
        mov     word ptr es:[Rec1-ABbegin],ADBUF2; set length
        mov     word ptr es:[Rec2-ABbegin],ADBUF2; set length
        mov     word ptr es:[Rec3-ABbegin],ADBUF2; set length
        sub     ecx,ADBUF2*3;
        mov     word ptr es:[Rec4-ABbegin],cx; set length
```

Attorney Docket No. 11543.701

```
            mov     CMDcntx,cx              ;
            mov     es:[Rec1+2-ABbegin],bx  ; save top word of DW 1
            mov     es:[Rec2+2-ABbegin],bx  ; save top word of DW 1
            mov     es:[Rec3+2-ABbegin],bx  ; save top word of DW 1
            or      bx,AS_LAST              ; 4th is last
            mov     es:[Rec4+2-ABbegin],bx  ; save top word of DW 1
            jmp     short BldRec5           ; go to common part
;-------------------------------------------------------------------
; Case 4 : <= full+full+half buffer
;-------------------------------------------------------------------
BldRec4:    mov     es:[Rec1+7-ABbegin],al  ; save top byte of DW 2
            mov     es:[Rec2+7-ABbegin],al  ; save top byte of DW 2
            mov     es:[Rec3+7-ABbegin],al  ; save top byte of DW 2
            mov     es:[Rec4+7-ABbegin],al  ; save top byte of DW 2
            mov     es:[Rec5+7-ABbegin],al  ; save top byte of DW 2
            mov     word ptr es:[Rec1-ABbegin],ADBUF2; set length
            mov     word ptr es:[Rec2-ABbegin],ADBUF2; set length
            mov     word ptr es:[Rec3-ABbegin],ADBUF2; set length
            mov     word ptr es:[Rec4-ABbegin],ADBUF2; set length
            sub     ecx,ADBUF shl 1         ;
            mov     word ptr es:[Rec5-ABbegin],cx; set length
            mov     CMDcntx,cx              ;
            mov     es:[Rec1+2-ABbegin],bx  ; save top word of DW 1
            mov     es:[Rec2+2-ABbegin],bx  ; save top word of DW 1
            mov     es:[Rec3+2-ABbegin],bx  ; save top word of DW 1
            mov     es:[Rec4+2-ABbegin],bx  ; save top word of DW 1
            or      bx,AS_LAST              ; 5th is last
            mov     es:[Rec5+2-ABbegin],bx  ; save top word of DW 1
BldRec5:    bts     TypeInt,RecMultInt      ; say only one interrupt
BldRec7:    mov     ax,DMAoff               ; start DMA offset
            mov     DMAoffx,ax              ; make it next buffer
;-------------------------------------------------------------------
; Start recording a buffer by updating the Audio regs
;-------------------------------------------------------------------
            mov     eax,AR_Rec              ; set up Primary Stream addr for play
            call    StartPR                 ; start Play/Rec if it is not halted
            ret                             ;
BldRec      endp
;*******************************************************************
; AID Record with Audio Structures already built
;*******************************************************************
AIDRec      proc near
            mov     MultIntX,0              ; set interrupt number to zero
            call    GetDMA                  ; get DMA count and address
            bts     TypeInt,RecMultInt      ; start with 1st interrupt
            mov     ax,DMAoff               ; start DMA offset
            mov     DMAoffx,ax              ; make it next buffer
;-------------------------------------------------------------------
; Start recording a buffer by updating the Audio regs
;-------------------------------------------------------------------
            mov     al,NumbStruc            ; get number of structures used
            mov     byte ptr LAsbPbc,al     ; update primary stream buffer count
                                            ; by writing anything to it
            bts     SWitch,SW_DMA_PROG      ; set DMA in progress bit
            ret                             ;
AIDRec      endp
;-------------------------------------------------------------------
; Initiate a Direct play
;-------------------------------------------------------------------
BldDirPly   proc near
            mov     eax,AR_DirPlay          ; set Primary Stream addr for dir
                                            ; play
            mov     LAsbPadr,eax            ;
```

Attorney Docket No. 11543.701

```
                mov     es:[BufDirPlay-ABbegin],dl    ; save in audio buffer for direct
                                                      ; play
                inc     byte ptr LAsbPbc              ; update primary stream buffer count
                                                      ; by writing anything to it
5               ret                                   ;
        BldDIRPly endp
        ;----------------------------------------------------------------------
        ; Build Audio Structure for play 1 byte of Direct Record
        ;----------------------------------------------------------------------
10      BldDirRec proc near
                mov     eax,AR_DirRec                 ; set Primary Stream addr for dir
                                                      ; rec.
                mov     LAsbPadr,eax                  ;
                bts     TypeInt,DirectInt             ; set direct record to interrupt
15              inc     byte ptr LAsbPbc              ; update primary stream buffer count
                                                      ; by writing anything to it
                ret                                   ;
        BldDIRRec endp
        ;----------------------------------------------------------------------
20      ; Routine to build two bytes from the two nibbles
        ;   Input: DL= conventional mixer values
        ;   Output:DX= new mixer values
        ;----------------------------------------------------------------------
        BldMix35 proc near
25              mov     si,offset MixTab35            ; use 3 bit to 5 bit conversion
                jmp     short BldMix                  ; go to common point
        BldMix35 endp
        BldMix46 proc near
                mov     si,offset MixTab46            ; use 4 bit to 6 bit conversion
30              jmp     short BldMix                  ; go to common point
        BldMix46 endp
        BldMix45 proc near
                mov     si,offset MixTab45            ; use 4 bit to 5 bit conversion
        BldMix:xor      bx,bx                         ; zero index
35              mov     bl,ah                         ;
                shr     bx,4                          ; get rid of low nibble
                mov     dh,byte ptr ds:[si][bx]       ; get corresponding value for low
                                                      ; nibble
                                                      ; put nibbles in index
                mov     bl,ah                         ; get rid of high nibble
40              and     bx,0fh                        ; get corresponding value for high
                mov     dl,byte ptr ds:[si][bx]       ; nibble
                ret                                   ;
        BldMix45 endp
45      IFDEF SIMULATE
        ;----------------------------------------------------------------------
        ; Out_Val
        ;       outputs an ascii char in AL to COM1
        ;----------------------------------------------------------------------
50      Out_Val proc    near
                push    edx
        IFDEF COM1
                mov     dx,03f8h
        ELSE
55              mov     dx,02f8h
        ENDIF
                out     dx,al                         ; out to COM1 or COM2
        xx:
        IFDEF COM1
60              mov     dx,03fdh
        ELSE
                mov     dx,02fdh
        ENDIF
```

-76-

Attorney Docket No. 11543.701

```
                in      al,dx                   ;
                test    al,020h                 ; is it ready
                jz      short xx                ; no
                pop     edx
    5           ret
        Out_Val endp
        ;----------------------------------------------------------------
        ;   Reg_Hex
        ;       converts a 16 bit reg in AX to hex in Hexval
    10  ;----------------------------------------------------------------
        Reg_Hex proc    near
                push    ds
                push    cs
                pop     ds
    15          push    ebx
                xor     bx,bx
                mov     bl,ah
                shr     bl,4
                mov     bl,Hex_Tab[bx]
    20          mov     HexVal+3,bl
                mov     bl,ah
                and     bl,0fh
                mov     bl,Hex_Tab[bx]
                mov     HexVal+2,bl
    25          mov     bl,al
                shr     bl,4
                mov     bl,Hex_Tab[bx]
                mov     HexVal+1,bl
                mov     bl,al
    30          and     bl,0fh
                mov     bl,Hex_Tab[bx]
                mov     HexVal,bl
                pop     ebx
                pop     ds
    35          ret
        Reg_Hex endp
        ENDIF ;----------------------->SIMULATE
        ;----------------------------------------------------------------
        ; table to convert SB 3/4 bit mixer values to 5/6 bit values
    40  ;----------------------------------------------------------------
        ; NOTE: computed use FREQ.PAS program
        MixTab46:  db    20,22,24,26,29,31,33,35,37,39,41,43,45,47,49,51
        MixTab45:  db    1,2,4,6,9,11,13,15,17,19,21,23,25,27,29,31
        MixTab35:  db    31,27,22,18,13,9,5,1
    45  IFDEF USETABLE
        ;----------------------------------------------------------------
        ; table to convert conventional constant to clock divisor for best freq
        ; available
        ;----------------------------------------------------------------
    50  ClkTab:    dw    030EFh    ; CD= 4335 Selclk17= 1
                   dw    0187Bh    ; CD= 6267 Selclk17= 0
                   dw    01862h    ; CD= 6242 Selclk17= 0
                   dw    0184Ah    ; CD= 6218 Selclk17= 0
                   dw    01831h    ; CD= 6193 Selclk17= 0
    55             dw    01819h    ; CD= 6169 Selclk17= 0
                   dw    01800h    ; CD= 6144 Selclk17= 0
                   dw    017E7h    ; CD= 6119 Selclk17= 0
                   dw    017CFh    ; CD= 6095 Selclk17= 0
                   dw    017B6h    ; CD= 6070 Selclk17= 0
    60             dw    03046h    ; CD= 4166 Selclk17= 1
                   dw    03035h    ; CD= 4149 Selclk17= 1
                   dw    03024h    ; CD= 4132 Selclk17= 1
                   dw    01754h    ; CD= 5972 Selclk17= 0
```

Attorney Docket No. 11543.701

```
        dw    03002h    ; CD=  4098 Selclk17= 1
        dw    01723h    ; CD=  5923 Selclk17= 0
        dw    0170Ah    ; CD=  5898 Selclk17= 0
        dw    016F2h    ; CD=  5874 Selclk17= 0
        dw    016D9h    ; CD=  5849 Selclk17= 0
        dw    016C1h    ; CD=  5825 Selclk17= 0
        dw    016A8h    ; CD=  5800 Selclk17= 0
        dw    0168Fh    ; CD=  5775 Selclk17= 0
        dw    01677h    ; CD=  5751 Selclk17= 0
        dw    0165Eh    ; CD=  5726 Selclk17= 0
        dw    02F59h    ; CD=  3929 Selclk17= 1
        dw    0162Dh    ; CD=  5677 Selclk17= 0
        dw    02F37h    ; CD=  3895 Selclk17= 1
        dw    02F26h    ; CD=  3878 Selclk17= 1
        dw    02F15h    ; CD=  3861 Selclk17= 1
        dw    02F04h    ; CD=  3844 Selclk17= 1
        dw    015B2h    ; CD=  5554 Selclk17= 0
        dw    02EE2h    ; CD=  3810 Selclk17= 1
        dw    01581h    ; CD=  5505 Selclk17= 0
        dw    01568h    ; CD=  5480 Selclk17= 0
        dw    01550h    ; CD=  5456 Selclk17= 0
        dw    01537h    ; CD=  5431 Selclk17= 0
        dw    0151Fh    ; CD=  5407 Selclk17= 0
        dw    01506h    ; CD=  5382 Selclk17= 0
        dw    014EEh    ; CD=  5358 Selclk17= 0
        dw    014D5h    ; CD=  5333 Selclk17= 0
        dw    02E4Ah    ; CD=  3658 Selclk17= 1
        dw    02E39h    ; CD=  3641 Selclk17= 1
        dw    02E28h    ; CD=  3624 Selclk17= 1
        dw    02E17h    ; CD=  3607 Selclk17= 1
        dw    0145Ah    ; CD=  5210 Selclk17= 0
        dw    02DF5h    ; CD=  3573 Selclk17= 1
        dw    01429h    ; CD=  5161 Selclk17= 0
        dw    01410h    ; CD=  5136 Selclk17= 0
        dw    013F8h    ; CD=  5112 Selclk17= 0
        dw    013DFh    ; CD=  5087 Selclk17= 0
        dw    013C7h    ; CD=  5063 Selclk17= 0
        dw    013AEh    ; CD=  5038 Selclk17= 0
        dw    01396h    ; CD=  5014 Selclk17= 0
        dw    0137Dh    ; CD=  4989 Selclk17= 0
        dw    01364h    ; CD=  4964 Selclk17= 0
        dw    0134Ch    ; CD=  4940 Selclk17= 0
        dw    02D3Bh    ; CD=  3387 Selclk17= 1
        dw    02D2Ah    ; CD=  3370 Selclk17= 1
        dw    02D19h    ; CD=  3353 Selclk17= 1
        dw    02D08h    ; CD=  3336 Selclk17= 1
        dw    012D1h    ; CD=  4817 Selclk17= 0
        dw    02CE6h    ; CD=  3302 Selclk17= 1
        dw    012A0h    ; CD=  4768 Selclk17= 0
        dw    01287h    ; CD=  4743 Selclk17= 0
        dw    0126Fh    ; CD=  4719 Selclk17= 0
        dw    01256h    ; CD=  4694 Selclk17= 0
        dw    0123Dh    ; CD=  4669 Selclk17= 0
        dw    01225h    ; CD=  4645 Selclk17= 0
        dw    0120Ch    ; CD=  4620 Selclk17= 0
        dw    011F4h    ; CD=  4596 Selclk17= 0
        dw    011DBh    ; CD=  4571 Selclk17= 0
        dw    02C3Dh    ; CD=  3133 Selclk17= 1
        dw    011AAh    ; CD=  4522 Selclk17= 0
        dw    02C1Bh    ; CD=  3099 Selclk17= 1
        dw    02C0Ah    ; CD=  3082 Selclk17= 1
        dw    02BF9h    ; CD=  3065 Selclk17= 1
        dw    02BE8h    ; CD=  3048 Selclk17= 1
```

H:\HOME\MM6\BRKTREE\701\BRKTREE.R4(5P1)

Attorney Docket No. 11543.701

```
        dw      0112Fh  ; CD=   4399 Selclk17= 0
        dw      02BC6h  ; CD=   3014 Selclk17= 1
        dw      010FEh  ; CD=   4350 Selclk17= 0
        dw      010E5h  ; CD=   4325 Selclk17= 0
 5      dw      010CDh  ; CD=   4301 Selclk17= 0
        dw      010B4h  ; CD=   4276 Selclk17= 0
        dw      0109Ch  ; CD=   4252 Selclk17= 0
        dw      01083h  ; CD=   4227 Selclk17= 0
        dw      02B50h  ; CD=   2896 Selclk17= 1
10      dw      01052h  ; CD=   4178 Selclk17= 0
        dw      02B2Eh  ; CD=   2862 Selclk17= 1
        dw      02B1Dh  ; CD=   2845 Selclk17= 1
        dw      02B0Ch  ; CD=   2828 Selclk17= 1
        dw      02AFBh  ; CD=   2811 Selclk17= 1
15      dw      00FD7h  ; CD=   4055 Selclk17= 0
        dw      02AD9h  ; CD=   2777 Selclk17= 1
        dw      00FA6h  ; CD=   4006 Selclk17= 0
        dw      00F8Dh  ; CD=   3981 Selclk17= 0
        dw      00F75h  ; CD=   3957 Selclk17= 0
20      dw      00F5Ch  ; CD=   3932 Selclk17= 0
        dw      00F44h  ; CD=   3908 Selclk17= 0
        dw      00F2Bh  ; CD=   3883 Selclk17= 0
        dw      00F12h  ; CD=   3858 Selclk17= 0
        dw      00EFAh  ; CD=   3834 Selclk17= 0
25      dw      02A41h  ; CD=   2625 Selclk17= 1
        dw      02A30h  ; CD=   2608 Selclk17= 1
        dw      02A1Fh  ; CD=   2591 Selclk17= 1
        dw      02A0Eh  ; CD=   2574 Selclk17= 1
        dw      00E7Fh  ; CD=   3711 Selclk17= 0
30      dw      029ECh  ; CD=   2540 Selclk17= 1
        dw      00E4Eh  ; CD=   3662 Selclk17= 0
        dw      00E35h  ; CD=   3637 Selclk17= 0
        dw      00E1Dh  ; CD=   3613 Selclk17= 0
        dw      00E04h  ; CD=   3588 Selclk17= 0
35      dw      00DECh  ; CD=   3564 Selclk17= 0
        dw      00DD3h  ; CD=   3539 Selclk17= 0
        dw      00DBAh  ; CD=   3514 Selclk17= 0
        dw      00DA2h  ; CD=   3490 Selclk17= 0
        dw      00D89h  ; CD=   3465 Selclk17= 0
40      dw      02943h  ; CD=   2371 Selclk17= 1
        dw      00D58h  ; CD=   3416 Selclk17= 0
        dw      02921h  ; CD=   2337 Selclk17= 1
        dw      02910h  ; CD=   2320 Selclk17= 1
        dw      028FFh  ; CD=   2303 Selclk17= 1
45      dw      028EEh  ; CD=   2286 Selclk17= 1
        dw      00CDDh  ; CD=   3293 Selclk17= 0
        dw      00CC5h  ; CD=   3269 Selclk17= 0
        dw      00CACh  ; CD=   3244 Selclk17= 0
        dw      00C93h  ; CD=   3219 Selclk17= 0
50      dw      00C7Bh  ; CD=   3195 Selclk17= 0
        dw      00C62h  ; CD=   3170 Selclk17= 0
        dw      00C4Ah  ; CD=   3146 Selclk17= 0
        dw      00C31h  ; CD=   3121 Selclk17= 0
        dw      02856h  ; CD=   2134 Selclk17= 1
55      dw      00C00h  ; CD=   3072 Selclk17= 0
        dw      02834h  ; CD=   2100 Selclk17= 1
        dw      02823h  ; CD=   2083 Selclk17= 1
        dw      02812h  ; CD=   2066 Selclk17= 1
        dw      02801h  ; CD=   2049 Selclk17= 1
60      dw      00B85h  ; CD=   2949 Selclk17= 0
        dw      027DFh  ; CD=   2015 Selclk17= 1
        dw      00B54h  ; CD=   2900 Selclk17= 0
        dw      00B3Bh  ; CD=   2875 Selclk17= 0
```

H:\HOME\MM6\BRKTREE\701\BRKTREE.R4(5P1)

Attorney Docket No. 11543.701

```
dw    00B23h    ; CD=   2851 Selclk17= 0
dw    00B0Ah    ; CD=   2826 Selclk17= 0
dw    00AF2h    ; CD=   2802 Selclk17= 0
dw    00AD9h    ; CD=   2777 Selclk17= 0
dw    00AC1h    ; CD=   2753 Selclk17= 0
dw    00AA8h    ; CD=   2728 Selclk17= 0
dw    02747h    ; CD=   1863 Selclk17= 1
dw    00A77h    ; CD=   2679 Selclk17= 0
dw    02725h    ; CD=   1829 Selclk17= 1
dw    02714h    ; CD=   1812 Selclk17= 1
dw    00A2Dh    ; CD=   2605 Selclk17= 0
dw    026F2h    ; CD=   1778 Selclk17= 1
dw    009FCh    ; CD=   2556 Selclk17= 0
dw    009E3h    ; CD=   2531 Selclk17= 0
dw    009CBh    ; CD=   2507 Selclk17= 0
dw    009B2h    ; CD=   2482 Selclk17= 0
dw    0099Ah    ; CD=   2458 Selclk17= 0
dw    00981h    ; CD=   2433 Selclk17= 0
dw    00968h    ; CD=   2408 Selclk17= 0
dw    00950h    ; CD=   2384 Selclk17= 0
dw    00937h    ; CD=   2359 Selclk17= 0
dw    0091Fh    ; CD=   2335 Selclk17= 0
dw    00906h    ; CD=   2310 Selclk17= 0
dw    02627h    ; CD=   1575 Selclk17= 1
dw    008D5h    ; CD=   2261 Selclk17= 0
dw    02605h    ; CD=   1541 Selclk17= 1
dw    025F4h    ; CD=   1524 Selclk17= 1
dw    025E3h    ; CD=   1507 Selclk17= 1
dw    00873h    ; CD=   2163 Selclk17= 0
dw    0085Ah    ; CD=   2138 Selclk17= 0
dw    00842h    ; CD=   2114 Selclk17= 0
dw    00829h    ; CD=   2089 Selclk17= 0
dw    00810h    ; CD=   2064 Selclk17= 0
dw    007F8h    ; CD=   2040 Selclk17= 0
dw    007DFh    ; CD=   2015 Selclk17= 0
dw    007C7h    ; CD=   1991 Selclk17= 0
dw    007AEh    ; CD=   1966 Selclk17= 0
dw    0253Ah    ; CD=   1338 Selclk17= 1
dw    0077Dh    ; CD=   1917 Selclk17= 0
dw    02518h    ; CD=   1304 Selclk17= 1
dw    02507h    ; CD=   1287 Selclk17= 1
dw    024F6h    ; CD=   1270 Selclk17= 1
dw    024E5h    ; CD=   1253 Selclk17= 1
dw    00702h    ; CD=   1794 Selclk17= 0
dw    024C3h    ; CD=   1219 Selclk17= 1
dw    006D1h    ; CD=   1745 Selclk17= 0
dw    006B8h    ; CD=   1720 Selclk17= 0
dw    006A0h    ; CD=   1696 Selclk17= 0
dw    00687h    ; CD=   1671 Selclk17= 0
dw    0066Fh    ; CD=   1647 Selclk17= 0
dw    00656h    ; CD=   1622 Selclk17= 0
dw    0244Dh    ; CD=   1101 Selclk17= 1
dw    00625h    ; CD=   1573 Selclk17= 0
dw    0242Bh    ; CD=   1067 Selclk17= 1
dw    0241Ah    ; CD=   1050 Selclk17= 1
dw    02409h    ; CD=   1033 Selclk17= 1
dw    023F8h    ; CD=   1016 Selclk17= 1
dw    005AAh    ; CD=   1450 Selclk17= 0
dw    023D6h    ; CD=    982 Selclk17= 1
dw    00579h    ; CD=   1401 Selclk17= 0
dw    00560h    ; CD=   1376 Selclk17= 0
dw    00548h    ; CD=   1352 Selclk17= 0
dw    0052Fh    ; CD=   1327 Selclk17= 0
```

H:\HOME\MM6\BRKTREE\701\BRKTREE.R4(5P1)

Attorney Docket No. 11543.701

```
            dw      00517h    ; CD=   1303 Selclk17= 0
            dw      004FBh    ; CD=   1278 Selclk17= 0
            dw      004E5h    ; CD=   1253 Selclk17= 0
            dw      004CDh    ; CD=   1229 Selclk17= 0
            dw      004B4h    ; CD=   1204 Selclk17= 0
            dw      0232Dh    ; CD=    813 Selclk17= 1
            dw      00483h    ; CD=   1155 Selclk17= 0
            dw      0230Bh    ; CD=    779 Selclk17= 1
            dw      022FAh    ; CD=    762 Selclk17= 1
            dw      022E9h    ; CD=    745 Selclk17= 1
            dw      00421h    ; CD=   1057 Selclk17= 0
            dw      00408h    ; CD=   1032 Selclk17= 0
            dw      003F0h    ; CD=   1008 Selclk17= 0
            dw      003D7h    ; CD=    983 Selclk17= 0
            dw      003BEh    ; CD=    958 Selclk17= 0
            dw      003A6h    ; CD=    934 Selclk17= 0
            dw      0038Dh    ; CD=    909 Selclk17= 0
            dw      00375h    ; CD=    885 Selclk17= 0
            dw      0035Ch    ; CD=    860 Selclk17= 0
            dw      02240h    ; CD=    576 Selclk17= 1
            dw      0032Bh    ; CD=    811 Selclk17= 0
            dw      0221Eh    ; CD=    542 Selclk17= 1
            dw      0220Dh    ; CD=    525 Selclk17= 1
            dw      021FCh    ; CD=    508 Selclk17= 1
            dw      021EBh    ; CD=    491 Selclk17= 1
            dw      002B0h    ; CD=    688 Selclk17= 0
            dw      021C9h    ; CD=    457 Selclk17= 1
            dw      0027Fh    ; CD=    639 Selclk17= 0
            dw      00266h    ; CD=    614 Selclk17= 0
            dw      0024Eh    ; CD=    590 Selclk17= 0
            dw      00235h    ; CD=    565 Selclk17= 0
            dw      0021Dh    ; CD=    541 Selclk17= 0
            dw      00204h    ; CD=    516 Selclk17= 0
            dw      02153h    ; CD=    339 Selclk17= 1
            dw      001D3h    ; CD=    467 Selclk17= 0
            dw      02131h    ; CD=    305 Selclk17= 1
            dw      02120h    ; CD=    288 Selclk17= 1
            dw      0210Fh    ; CD=    271 Selclk17= 1
            dw      020FEh    ; CD=    254 Selclk17= 1
            dw      00158h    ; CD=    344 Selclk17= 0
            dw      020DCh    ; CD=    220 Selclk17= 1
            dw      00127h    ; CD=    295 Selclk17= 0
            dw      0010Eh    ; CD=    270 Selclk17= 0
            dw      000F6h    ; CD=    246 Selclk17= 0
            dw      000DDh    ; CD=    221 Selclk17= 0
            dw      000C5h    ; CD=    197 Selclk17= 0
            dw      000ACh    ; CD=    172 Selclk17= 0
            dw      00093h    ; CD=    147 Selclk17= 0
            dw      0007Bh    ; CD=    123 Selclk17= 0
            dw      00062h    ; CD=     98 Selclk17= 0
            dw      0004Ah    ; CD=     74 Selclk17= 0
            dw      00031h    ; CD=     49 Selclk17= 0
            dw      02011h    ; CD=     17 Selclk17= 1
ENDIF
;@@@@@@@@@@@@@@@@@@@@@@@@@@@@@@@@@@@@@@@@@@@@@@@@@@@@@@@@@@@@@@@@@@@@@@@@
;************************************************************************
;*
;   INITIALIZATION DATA and CODE is freed up
;************************************************************************
;*
EndC       equ      $                              ; end of code to save
CodeLen    equ      (EndC-BeginC+15)/16
HtoB       db       3*16 dup(255)
```

H:\HOME\MM6\BRKTREE\701\BRKTREE.R4(5P1)

Attorney Docket No. 11543.701

```
                db      0,1,2,3,4,5,6,7,8,9,255,255,255,255,255,255
                db      255,10,11,12,13,14,15,255,255,255,255,255,255,255,255,255
                db      16 dup(255)
                db      255,10,11,12,13,14,15,255,255,255,255,255,255,255,255,255
 5              db      9*16 dup(255)
      CrLf      db      0ah,0dh,'$',0
      Output    db      256 dup(0)
      InputL    dw      0
      Input     db      256 dup(0)
10    TYPEHEX   equ     1
      TYPEDEC   equ     0
      SBIRQ     db      TYPEDEC,6,'SBIRQ='
      SBIO      db      TYPEHEX,5,'SBIO='
      SBDMA     db      TYPEDEC,6,'SBDMA='
15    VGAIRQ    db      TYPEDEC,7,'VGAIRQ='
      FILTER    db      TYPEDEC,7,'FILTER='
      Hlp1:     db      'BTSR2 SBIO=xxx,SBIRQ=nn,SBDMA=n,FILTER=nn,VGAIRQ=nn',0
      Hlp2:     db      '      where xxx are hex values 220 or 240',0
      Hlp3:     db      '            nn are decimal values',0
20    Warn0     db      'WARNING: BTSR2.EXE is already loaded',0
      Warn1:    db      'Warning: SBIO can only be 220 or 240',0
      Warn2:    db      'Warning: Keyword not found; default for SBIO is 220',0
      Warn3:    db      'Warning: Keyword not found; default for SBIRQ is 7',0
      Warn4a:   db      'Warning: Keyword not found; default for SBDMA is 1',0
25    Warn4b:   db      'Warning: SBDMA can only be 1,3, or 0',0
      Warn5a:   db      'Warning: Keyword not found; default for FILTER is 50',0
      Warn5b:   db      'Warning: FILTER can only be 50 or 100',0
      Warn6:    db      'Warning: Keyword not found; default for VGAIRQ is 9',0
      ;------------------------------------------------------------------
30    ; Routine to find a keyword in a line of input
      ;   INPUT: ds:si points to keyword
      ;   OUTPUT : AX= binary value and carry flag clear
      ;          ; carry flag set if keyword not found
      ;------------------------------------------------------------------
35    FindKey   proc    near
                mov     cx,InputL             ; get length of command input
                mov     di,offset Input       ; get addr of command input
                lodsw                         ; get type/size of keyword
                mov     bx,ax                 ; BL=type,BH=size
40              dec     bh                    ; reduce size by 1 for compares
                lodsb                         ; get 1st char
      FK1:      repne   scasb                 ; look for it in command input
                jne     short FKy             ; not even 1st char is there
                push    si                    ; save temp
45              push    di
                push    cx
                movzx   cx,bh                 ; get size of keyword
                repe    cmpsb                 ; is it there
                je      short FK3             ; yes,
50              pop     cx                    ; restore regs
                pop     di
                pop     si
                jmp     short FK1
      FK3:      cmp     bl,TYPEDEC            ; is it decimal
55              jne     short FK5             ; no, must be hex
      ;------------------------------------------------------------------
      ; Convert decimal value
      ;------------------------------------------------------------------
      FK4:      xor     bx,bx                 ;
60              xor     ax,ax                 ;
                xor     cx,cx                 ;
      FK4a:     mov     bl,es:[di]            ; get a decimal code
                cmp     bl,','                ; end of parm
```

H:\HOME\MM6\BRKTREE\701\BRKTREE.R4(5PI)

Attorney Docket No. 11543.701

```
                je      short FK4b          ; yes, get out
                mov     cl,HtoB[bx]         ; get binary
                cmp     cl,9                ; is it nine or less
                ja      short FKx           ; no, get out with value=0
                mov     dx,10               ;
                mul     dx                  ; mult current value by 10
                add     ax,cx               ; add this to it
                inc     di                  ; bump to next char
                jmp     short FK4a          ; go get next one
        FK4b:   pop     cx                  ; restore regs
                pop     di                  ;
                pop     si                  ;
                clc                         ; reg AX contains value
                ret                         ;
;-----------------------------------------------------------------------
; Convert hex value
;-----------------------------------------------------------------------
        FK5:    xor     bx,bx               ;
                xor     ax,ax               ;
                xor     cx,cx               ;
        FK5a:   mov     bl,es:[di]          ; get a decimal code
                cmp     bl,','              ; end of parm
                je      short FK5b          ; yes, get out
                mov     cl,HtoB[bx]         ; get binary
                cmp     cl,15               ; is it 15 or less
                ja      short FKx           ; no, get out with value=0
                shl     ax,4                ; make room for new digit
                or      al,cl               ; or in new one
                inc     di                  ; bump to next char
                jmp     short FK5a          ; go get next one
        FK5b:   pop     cx                  ; restore regs
                pop     di                  ;
                pop     si                  ;
                clc                         ; reg AX contains value
                ret                         ;
        FKx:    pop     cx                  ; restore regs
                pop     di                  ;
                pop     si                  ;
        FKy:    stc                         ;
                ret                         ;
        FindKey endp
;-----------------------------------------------------------------------
; Routine to output a message
;   INPUT: SI has offset to message
;-----------------------------------------------------------------------
        OutputMsg proc  near
                pusha                       ; save all regs
                mov     cx,250              ; leave space for CR/LF
                mov     di,offset Output    ; get start of buffer
                mov     dx,di               ; save for message
        OM1:    lodsb                       ; get a message byte
                cmp     al,0                ; is it the end
                je      short OM2           ; yes
                stosb                       ; no save it
                loop    OM1                 ; and get next one
        OM2:    mov     si,offset CrLf      ; get crlf
                movsd                       ; move it
                mov     ah,9                ; output message via DOS
                int     21h                 ;
                popa                        ; restore regs
                ret
        OutputMsg endp
;-----------------------------------------------------------------------
```

H:\HOME\MM6\BRKTREE\701\BRKTREE.R4(5P1)

Attorney Docket No. 11543.701

```
; initialization code ...see if copy of TSR is already loaded
;----------------------------------------------------------------
INIT:       mov     ax,BTSR_ID              ;
            xor     cx,cx                   ; normal request
            int     02fh                    ;
            or      ax,ax                   ; is it loaded
            jnz     short INIT0             ; no, proceed to load
            push    cs                      ;
            pop     ds                      ; make DS=CS
            push    ds                      ;
            pop     es                      ; make ES=DS=CS
            OutMsg  Warn0                   ; output warning message
            jmp     INIT8                   ; and get out
;----------------------------------------------------------------
; initialization code ...move command line and capitalize it
;----------------------------------------------------------------
INIT0:      push    cs                      ;
            pop     ds                      ; make DS=CS
            mov     ah,51h                  ; get PSP segment address
            int     21h                     ;
            mov     es,bx                   ;
            mov     di,offset Input         ; where to put
            mov     si,080h                 ; Command line is at 080h
            xor     cx,cx                   ;
            mov     cl,es:[si]              ; get length of Command line
            mov     InputL,cx               ; save
            or      cx,cx                   ;
            jnz     short INIT1             ;
            jmp     INIT9                   ; skip if zero to termination process
INIT1:      mov     al,es:[si+1]            ; get a byte
            cmp     al,'?'                  ; is it for help
            je      short INIT1d            ; yes, go output message
            cmp     al,'a'                  ; is it a lower case letter
            jb      short INIT1b            ; no
            cmp     al,'z'                  ;
            ja      short INIT1b            ; no
            sub     al,32                   ; make it upper case
INIT1b:     mov     ds:[di],al              ; save in buffer
            inc     si                      ; next char from command line
INIT1c:     inc     di                      ; next char for input
            loop    INIT1                   ; go get next char
            mov     byte ptr ds:[di],','    ; save end of parm after last one
            inc     InputL                  ; increment length
            push    ds                      ;
            pop     es                      ; make ES=DS=CS
            jmp     short INIT2             ;
;----------------------------------------------------------------
; Output help message if ? found in input
;----------------------------------------------------------------
INIT1d:     push    cs                      ;
            pop     ds                      ; make DS=CS
            push    ds                      ;
            pop     es                      ; make ES=DS=CS
            OutMsg  Hlp1                    ; output help messages
            OutMsg  Hlp2                    ;
            OutMsg  Hlp3                    ;
            jmp     INIT8                   ; get out with staying in memory
;----------------------------------------------------------------
; ...find SBIO= and convert to binary word
;----------------------------------------------------------------
INIT2:      mov     si,offset SBIO          ; get keyword
            call    FindKey                 ; does it exist
            jnc     short INIT2c            ; yes, found a value
```

H:\HOME\MM6\BRKTREE\701\BRKTREE.R4(5P1)

-84-

Attorney Docket No. 11543.701

```
            jmp     short INIT2b          ; no, not found
    INIT2b: OutMsg  Warn2                 ; output warning message
            jmp     short INIT3           ;
    INIT2c: cmp     ax,220h               ; is it 220h
            je      short INIT2d          ; yes, go save value
            cmp     ax,0240h              ; is it 240h
            jne     short INIT2e          ; no, get out
    INIT2d: mov     VSB_Port,ax           ; yes, save port for later use
            jmp     short INIT3           ; and go to next keyword
    INIT2e: OutMsg  Warn1                 ; output warning message
    ;----------------------------------------------------------------
    ;  ...find SBIRQ= and convert to INT vector number
    ;----------------------------------------------------------------
    INIT3:  mov     si,offset SBIRQ       ; get keyword
            call    FindKey               ; does it exist
            jnc     short INIT3c          ; yes, found a value
            jmp     short INIT3b          ; no, not found
    INIT3b: OutMsg  Warn3                 ; output warning message
            jmp     short INIT4           ; and skip to next keyword
    INIT3c: mov     VSB_IRQ,al            ; save IRQ number
            cmp     ax,8                  ; is it a lower IRQ
            jb      short INIT3d          ; yes,
            add     ax,70h-8              ; no, must be a higher vector
            jmp     short INIT3e          ; go save int vect number
    INIT3d: add     ax,8                  ; make IRQ a vector number
    INIT3e: mov     VSB_Int,al            ; save int vector number
            shl     ax,2                  ; compute addr in vector table
            mov     word ptr VSB_Vect,ax  ; save virtual SB int vect addr
    ;----------------------------------------------------------------
    ;  ...find SBDMA= and convert to binary DMA byte number
    ;----------------------------------------------------------------
    INIT4:  mov     si,offset SBDMA       ; get keyword
            call    FindKey               ; does it exist
            jnc     short INIT4c          ; yes, found a value
            jmp     short INIT4b          ; no, not found
    INIT4b: OutMsg  Warn4a                ; output warning message
            jmp     short INIT5           ; and skip to next keyword
    INIT4c: cmp     al,1                  ; is it a legal value
            je      short INIT4d          ; yes
            cmp     al,3                  ; is it a legal value
            je      short INIT4d          ; yes
            cmp     al,0                  ; is it a legal value
            jne     short INIT4e          ; no, go output warning
    INIT4d: mov     VSB_DMA,al            ; yes, save value for later use
            jmp     short INIT5           ; and skip to next keyword
    INIT4e: OutMsg  Warn4b                ; output warning message
    ;----------------------------------------------------------------
    ;  ...find FILTER= should be 50 or 100...double it for value used
    ;----------------------------------------------------------------
    INIT5:
    IFDEF HWFILTER
            mov     dx,VGA_GRP            ; VGA ext to find filter value
            mov     al,046h               ; index with filter value
            out     dx,al                 ;
            inc     dx                    ;
            in      al,dx                 ; get byte with filter value
            mov     ah,50                 ; assume value of 50
            test    al,08h                ; is bit 3 set
            jz      short INIT5a          ; no, got value
            mov     ah,100                ; no must be 1 thus value of 100
    INIT5a: mov     Filter50,ah           ; and save
    ELSE
            mov     si,offset FILTER      ; get keyword
```

Attorney Docket No. 11543.701

```
                call    FindKey                     ; does it exist
                jnc     short INIT5c                ; yes, found a value
                jmp     short INIT5b                ; no, not found
        INIT5b: OutMsg  Warn5a                      ; output warning message
                jmp     short INIT6                 ; and skip to next keyword
        INIT5c: cmp     ax,50                       ; is it a legal value
                je      short INIT5d                ; yes,
                cmp     ax,100                      ; is it a legal value
                jne     short INIT5e                ; no, output warning message
        INIT5d: shl     ax,1                        ; double value for later computations
                mov     Filter50,al                 ; and save
                jmp     short INIT6                 ; and skip to next keyword
        INIT5e: OutMsg  Warn5b                      ; output warning message
        ENDIF
;-------------------------------------------------------------------------
; ...find VGAIRQ= and convert to INT vector number
;-------------------------------------------------------------------------
        INIT6:  mov     si,offset VGAIRQ            ; get keyword
                call    FindKey                     ; does it exist
                jnc     short INIT6c                ; yes, found a value
                jmp     short INIT6b                ; no, not found
        INIT6b: OutMsg  Warn6                       ; output warning message
                jmp     short INIT9                 ; go do termination processing
        INIT6c: mov     BT_IRQ,al                   ; save for SCT
                cmp     al,8                        ; is it a lower IRQ
                jb      short INIT6d                ; yes,
                add     al,70h-8                    ; no, must be a higher vector  number
                jmp     short INIT6e                ; go save int vect number
        INIT6d: add     al,8                        ; make IRQ a vector number
        INIT6e:
        IFNDEF  SIMULATE
                mov     BT_Int,al                   ; save it
        ENDIF ;------------------------->NOT SIMULATE
                jmp     short INIT9                 ; go do termination processing
;-------------------------------------------------------------------------
; terminate because of being already loaded
;-------------------------------------------------------------------------
        INIT8:  mov     ah,04ch                     ; DOS terminate
                int     21h                         ;
;-------------------------------------------------------------------------
; chain into the 2fh interrupt
;-------------------------------------------------------------------------
        INIT9:  mov     ax,0352fh                   ; get old 2f interrupt routine
                int     21h                         ;
                mov     word ptr cs:[Old2f],bx      ;
                mov     word ptr cs:[Old2f+2],es;
                mov     dx,offset BTSR2f            ;
                push    cs                          ;
                pop     ds                          ;
                mov     ax,0252fh                   ; set to our interrupt routine
                int     21h                         ;
;-------------------------------------------------------------------------
; chain into the Media Stream Controller interrupt vector
;-------------------------------------------------------------------------
                mov     ah,035h
                mov     al,cs:BT_Int                ; get old XX interrupt routine
                int     21h                         ;
                mov     word ptr cs:[OldBT],bx      ; save for chaining
                mov     word ptr cs:[OldBT+2],es;
                mov     dx,offset BTSR00            ; set interrupt vector to ours
                push    cs                          ;
                pop     ds                          ;
                mov     ah,025h                     ;
```

Attorney Docket No. 11543.701

```
            mov     al,cs:BT_Int            ;
            int     21h                     ;
    ;---------------------------------------------------------------
    ; Terminate program
    ;---------------------------------------------------------------
            mov     dx,16+CodeLen           ; paragraphs to keep
            mov     ax,03100h               ; DOS terminate and stay resident
            int     21h                     ;
    CODE    ENDS
            END     INIT
```

We claim:

1. A system for transferring sound related data comprising:
   a main memory for storing a block of the sound related data;
   a central processing unit (CPU);
   a bus system operatively coupling said CPU to said main memory;
   a sound processing device operatively coupled to said bus system;
   an interrupt service routine capable of being executed by said CPU in response to an interrupt request from said sound processing device;
   said sound processing device receiving a request to transfer the block of the sound related data;
   said sound processing device generating an interrupt request in response to said request to transfer the block of the sound related data causing said interrupt service routine to be executed by said CPU; and
   said interrupt service routine causing said CPU to transfer the block of the sound related data across said bus system using a type of data transfer initiated by said CPU.

2. The system of claim 1, wherein said bus system comprises a high speed I/O bus across which the block of the sound related data is transferred and wherein the type of data transfer is burst mode data transfer.

3. The system of claim 1 further comprising a display memory for storing graphics related data, video related data and the block of the sound related data, said display memory being coupled to said sound processing device;
   wherein the block of the sound related data is transferred between said main memory and the display memory.

4. The system of claim 3 further comprising a sound I/O device;
   wherein the sound processing device transfers the block of the sound related data between said display memory and the sound I/O device at a desired frequency for inputting or outputting sound.

5. The system of claim 3 wherein at least two buffers are provided in the display memory for storing the block of the sound related data, said system further comprising means for alternatively providing for the transfer of a portion of the block of the sound related data between each individual one of the two buffers in the display memory and the main memory and for providing the simultaneous processing of a different portion of the block of the sound related data in the other one of the two buffers in the display memory.

6. The system of claim 1 further comprising a secondary memory coupled to said sound processing device; and
   wherein the block of the sound related data is transferred between said main memory and the secondary memory.

7. The system of claim 6 further comprising a sound I/O device;
   wherein the sound processing device transfers the block of the sound related data between said secondary memory and the sound I/O device at a desired frequency for inputting or outputting sound.

8. The system of claim 6 wherein at least two buffers are provided in the secondary memory for storing the block of the sound related data, said system further comprising means for alternatively providing for the transfer of a portion of the block of the sound related data between each individual one of the two buffers in the secondary memory and the main memory and for providing the simultaneous processing of a different portion of the block of the sound related data in the other one of the two buffers in the secondary memory.

9. A system for processing commands for a bus device in a computer, said system comprising:
   a central processing unit (CPU);
   a bus system operatively coupled to said CPU;
   a bus device operatively coupled to said bus system, said bus device including at least one register for storing data;
   an interrupt service routine capable of being executed by the CPU in response to an interrupt request from the bus device;
   the bus device receiving at least a first device related command from said CPU containing information to be used for processing at least one subsequent device related command;
   the bus device storing the information from the first device related command in the register;
   the bus device receiving the at least one subsequent device related command requesting that device related processing be performed;
   the bus device generating an interrupt request in response to the subsequent device related command;
   the interrupt service routine being executed in response to the interrupt request from the bus device; and
   the interrupt service routine recovering the information from the register of the bus device and using said information to perform device related processing in response to said subsequent device related command, wherein the subsequent device related command comprises a request for sound processing using direct memory access (DMA) data transfer and wherein said interrupt service routine processes said subsequent device related command using a data transfer technique other than DMA data transfer.

10. The system of claim 9 wherein the bus device is a sound device for processing digitized sound I/O commands.

11. The system of claim 10 wherein the first device related command contains format or control information for the transfer of sound related data to the sound device, and the subsequent device related command requests that said sound related data be transferred to the sound device.

12. The system of claim 10 wherein the first device related command contains information indicative of a frequency for playing or recording the sound related data.

13. The system of claim 9 wherein said bus system comprises a high speed I/O bus capable of transferring data using burst mode transfer initiated by the CPU, and wherein the data transfer technique used by the interrupt service routine is the burst mode transfer initiated by the CPU.

14. The system of claim 9 wherein the interrupt service routine generates a signal indicating that the DMA data transfer has been performed.

15. A system for processing a command in a computer, wherein the command requests that a requested result be achieved, said system comprising:
   a central processing unit (CPU) for providing the command;
   a bus system operatively coupled to said CPU;
   an interrupt controller operatively coupled to said bus system, said interrupt controller having at least first and second interrupt request lines;
   a bus device operatively coupled to said bus system and said first interrupt request line, said bus device having means for receiving the command from the CPU;

a first interrupt service routine capable of being executed by the CPU in response to an interrupt request on the first interrupt request line;

the bus device and the first interrupt service routine cooperatively having means for processing the command to produce a second result;

a second interrupt service routine capable of being executed by the CPU in response to an interrupt request on the second interrupt request line, said second interrupt service routine being configured to perform processing after said command has been processed to produce the requested result; and said first interrupt service routine having means for converting said second result into said requested result and for causing the second interrupt service routine to be executed.

16. The system of claim 15 wherein the means for executing said second interrupt service routine is an interrupt request generated by the first interrupt service routine.

17. The system of claim 15 wherein the means for executing said second interrupt service routine is a simulated interrupt executed by said CPU according to executable instructions in said first interrupt service routine.

18. The system of claim 15 wherein the second result is the completed transfer of data across said bus using a type of data transfer initiated by said CPU, and wherein the requested result is the completed transfer of data using direct memory access (DMA) data transfer.

19. The system of claim 18 wherein the bus comprises a high speed I/O bus across which the data is transferred.

20. A system for emulating a direct memory access (DMA), data transfer between a memory device and a bus device in a computer system having a CPU, an interrupt controller capable of accepting interrupt signals and generating interrupts for the CPU in response to the interrupt signals and a DMA controller capable of being programmed with at least one parameter for the DMA data transfer, said bus device providing a first interrupt signal to the interrupt controller in response to a command to perform the DMA data transfer and the interrupt controller generating a first interrupt for the CPU in response to the first interrupt signal, said system comprising:

a first interrupt routine executable by said CPU in response to the first interrupt, said first interrupt routine comprising:

a first routine for obtaining a value for the at least one parameter from the DMA controller;

a second routine for causing said CPU to control a transfer of data between said bus device and said memory device in accordance with the value for the at least one parameter; and a third routine for programming the DMA controller with an updated value for the at least one parameter consistent with a value for the parameter that would have been contained in the DMA controller had the DMA data transfer actually been performed by the DMA controller.

21. The system of claim 20 wherein said data transfer controlled by said CPU is a burst mode transfer initiated by said CPU.

22. The system of claim 20 wherein said command originates from a software program.

23. A computer system comprising:

a CPU;

an interrupt controller capable of accepting interrupt signals;

a memory device;

a bus device;

a direct memory access (DMA) controller capable of being programmed for a DMA data transfer, said DMA controller having a first register for storing a base address and a second register for storing a value associated with the number of bytes of said DMA data transfer;

a first routine executable by said CPU in response to a first interrupt signal being provided to said interrupt controller, said first routine obtaining said base address from said first register and said value from said second register;

a second routine responsive to said first routine for causing said CPU to control a transfer of data indicated by said base address and said value between said bus device and said memory device;

a third routine for generating a second interrupt signal to said interrupt controller upon completing execution of said second routine;

a fourth routine executable by said CPU in response to said second interrupt signal for resetting said DMA controller to a state it would have been had a DMA transfer actually been performed by said DMA controller; and a circuit for generating said first interrupt signal in response to a command requesting said DMA data transfer.

24. The computer system of claim 23 wherein said transfer controlled by said CPU is a burst mode transfer initiated by said CPU.

25. The computer system of claim 23 wherein said bus device is operatively coupled to an audio buffer.

26. The computer system of claim 25 further comprising a sound processing device; and a circuit for controlling data transfer from said audio buffer to said sound processing device.

27. The computer system of claim 26 wherein said audio buffer is organized into at least a first portion and a second portion, said first portion capable of accepting data from said memory device under control of said second routine simultaneous with said second portion delivering data to said sound processing device.

28. The computer system of claim 25 wherein said audio buffer is located in a display memory containing graphic or video data.

29. The computer system of claim 23 wherein said command originates from a software program.

30. The system of claim 1 wherein the request comprises a command for sound processing involving direct memory access (DMA) data transfer.

31. The system of claim 1 further comprising a direct memory access (DMA) controller, wherein:

the DMA controller is programmed with at least one parameter for the requested transfer of the block of the sound related data; and the interrupt service routine obtains a value for the at least one parameter from the DMA controller for the transfer of the block of the sound related data.

32. The system of claim 31 wherein the interrupt service routine provides an updated value for the at least one parameter to the DMA controller after at least a portion of the block of the sound related data has been transferred.

33. The system of claim 31, wherein the at least one parameter is a count indicative of the amount of data to be transferred.

34. The system of claim 32, wherein the at least one parameter is a count indicative of the amount of data to be transferred.

35. The system of claim 34 wherein the updated value is provided to the DMA controller to modify the at least one parameter to substantially reflect the amount of the sound related data that has been transferred.

36. The system of claim 31 wherein the interrupt service routine provides multiple incremental updated values for the at least one parameter to the DMA controller during the transfer of the block of the sound related data to reflect the progress of the transfer.

37. The system of claim 11 wherein the interrupt service routine uses a data transfer technique other than that for which the device related command was designed.

38. The system of claim 9 further comprising a DMA controller wherein the interrupt service routine provides a value to the DMA controller indicative of an amount of data transferred by the interrupt service routine using the data transfer technique.

39. The system of claim 9 further comprising a DMA controller wherein the interrupt service routine transfers a plurality of blocks of data using the data transfer technique and provides a value to the DMA controller after each of the blocks of data is transferred.

40. The system of claim 20 further comprising a fourth routine for generating an interrupt indicating that the requested DMA transfer has been completed.

41. A method for emulating direct memory access (DMA) transfer of data between a first device and a second device in a system wherein a DMA controller is programmed with at least one parameter for the DMA transfer of the data, the method comprising the steps of:

receiving a request for the DMA transfer of the data;

generating at least one interrupt such that an interrupt service routine is executed;

causing at least a portion of the data to be transferred between the first device and the second device under the control of the interrupt service routine and independently of the control of the DMA controller; and providing an updated value for the at least one parameter to the DMA controller to reflect the transfer of at least the portion of the data between the first device and the second device.

42. The method of claim 41 further comprising the step of obtaining an initial value for the parameter from the DMA controller.

43. The method of claim 41 wherein the at least one parameter is a count indicative of an amount of data to be transferred.

44. The method of claim 41 wherein the first device is a system memory, the second device is a sound processing device, and the data is transferred across a high speed I/O bus.

45. The method of claim 41 further comprising the step of causing the interrupt service routine to provide multiple incremental updated values for the at least one parameter to the DMA controller during the transfer of the portion of the data to reflect the progress of the transfer.

46. The method of claim 41 further comprising the step of generating a second interrupt indicating that the DMA transfer of the data has been completed.

* * * * *